US011661915B2

(12) United States Patent
Crain et al.

(10) Patent No.: US 11,661,915 B2
(45) Date of Patent: May 30, 2023

(54) BATTERY KEY, STARTER AND IMPROVED CRANK

(71) Applicant: Polaris Industries Inc., Medina, MN (US)

(72) Inventors: Stephen J. Crain, Wyoming, MN (US); Trevor F. Rhodes, Badger, MN (US)

(73) Assignee: Polaris Industries Inc., Medina, MN (US)

( * ) Notice: Subject to any disclaimer, the term of this patent is extended or adjusted under 35 U.S.C. 154(b) by 309 days.

(21) Appl. No.: 16/930,713

(22) Filed: Jul. 16, 2020

(65) Prior Publication Data

US 2020/0347814 A1 Nov. 5, 2020

Related U.S. Application Data

(62) Division of application No. 16/145,475, filed on Sep. 28, 2018, now Pat. No. 10,731,620.

(Continued)

(51) Int. Cl.
*F02N 11/00* (2006.01)
*F02N 11/08* (2006.01)
(Continued)

(52) U.S. Cl.
CPC ......... *F02N 11/0862* (2013.01); *B62M 27/02* (2013.01); *F02N 11/08* (2013.01);
(Continued)

(58) Field of Classification Search
CPC .. F02N 11/0862; F02N 11/08; F02N 11/0837; F02N 19/005; F02N 3/02;
(Continued)

(56) References Cited

U.S. PATENT DOCUMENTS 5,713,320 A 2/1998 Pfaff et al.
6,380,842 B1 * 4/2002 Mattes ................. B60R 25/257
340/5.6

(Continued)

FOREIGN PATENT DOCUMENTS

DE 4117547 A1 12/1992
DE 19855605 A1 6/2000
(Continued)

OTHER PUBLICATIONS

International Search Report and Written Opion for Corresponding PCT Application PCT/US2018/053858 (International Filing Date Oct. 2, 2018) dated Apr. 25, 2019.

(Continued)

*Primary Examiner* — Jacob M Amick
*Assistant Examiner* — Sherman D Manley
(74) *Attorney, Agent, or Firm* — Harness, Dickey & Pierce, P.L.C.

(57) ABSTRACT

A system for starting an engine of a vehicle has a fuel injector injecting fuel into a closed intake port to form an air fuel mixture. The system also includes an actuator rotating a crankshaft in a first direction to open the intake port by moving a piston within a cylinder coupled to the crankshaft. A combustion chamber defines between the cylinder and the port receiving the air fuel mixture through the intake port. The actuator rotates the crankshaft in a second direction to close the intake port. A spark plug ignites the air fuel mixture to start the engine. The engine also includes many other disclosed features.

10 Claims, 45 Drawing Sheets

Related U.S. Application Data

(60) Provisional application No. 62/567,512, filed on Oct. 3, 2017.

(51) Int. Cl.

| | | |
|---|---|---|
| *F02N 19/00* | (2010.01) | |
| *G07C 9/00* | (2020.01) | |
| *B62M 27/02* | (2006.01) | |
| *F02B 75/02* | (2006.01) | |
| *F02D 41/00* | (2006.01) | |
| *F02N 3/02* | (2006.01) | |

(52) U.S. Cl.
CPC ........ *F02N 11/0837* (2013.01); *F02N 19/005* (2013.01); *G07C 9/00309* (2013.01); *F02B 2075/025* (2013.01); *F02D 2041/0092* (2013.01); *F02D 2400/04* (2013.01); *F02N 3/02* (2013.01); *F02N 2019/007* (2013.01); *F02N 2200/023* (2013.01); *F02N 2250/04* (2013.01); *F02N 2300/2002* (2013.01); *G07C 2009/00547* (2013.01)

(58) Field of Classification Search
CPC ......... F02N 2019/007; F02N 2200/023; F02N 2050/04; F02N 2300/2002; F02B 2075/025; F02D 2041/0092; F02D 2400/04; G07C 9/00309; G07C 2009/00547
See application file for complete search history.

(56) References Cited

U.S. PATENT DOCUMENTS

| | | | |
|---|---|---|---|
| 6,944,528 B2* | 9/2005 | Nagano | G07C 9/00309 340/426.36 |
| 7,633,381 B2* | 12/2009 | Yoshitake | G07C 9/00309 340/426.36 |
| 9,845,782 B1 | 12/2017 | Bernier | |
| 2005/0109302 A1 | 5/2005 | Tetsuno et al. | |
| 2005/0242929 A1* | 11/2005 | Onishi | B60R 25/24 340/432 |
| 2006/0181409 A1* | 8/2006 | Yamamoto | B60R 25/04 340/532 |
| 2006/0254564 A1 | 11/2006 | Lewis et al. | |
| 2007/0204827 A1 | 9/2007 | Kishibata et al. | |
| 2008/0074243 A1* | 3/2008 | Yoshitake | G07C 9/00309 340/425.5 |
| 2008/0105230 A1 | 5/2008 | Kishibata et al. | |
| 2009/0145181 A1* | 6/2009 | Pecoul | E05B 81/86 70/237 |
| 2009/0265085 A1 | 10/2009 | Hori | |
| 2010/0253535 A1* | 10/2010 | Thomas | H04B 1/082 340/4.37 |
| 2014/0240086 A1* | 8/2014 | Van Wiemeersch | B60R 25/25 340/5.51 |
| 2015/0025780 A1 | 1/2015 | Gibson et al. | |
| 2015/0240774 A1* | 8/2015 | Zeiler | H02J 7/0016 37/259 |
| 2016/0003207 A1 | 1/2016 | Kojima | |
| 2017/0306916 A1* | 10/2017 | Zeiler | H02J 7/0045 |
| 2017/0356356 A1 | 12/2017 | Matsushita | |
| 2018/0202407 A1* | 7/2018 | Harvey | H01M 10/425 |
| 2019/0136818 A1* | 5/2019 | Blake | F02N 11/08 |
| 2019/0178220 A1* | 6/2019 | Zeiler | F02N 11/0862 |
| 2019/0353128 A1* | 11/2019 | Harvey | H04W 4/48 |
| 2021/0009235 A1* | 1/2021 | Okada | B62J 50/225 |
| 2021/0054816 A1* | 2/2021 | Harvey | F02N 11/0862 |
| 2021/0054817 A1* | 2/2021 | Koenen | F02N 11/087 |

FOREIGN PATENT DOCUMENTS

| | | |
|---|---|---|
| EP | 0685707 A1 | 12/1995 |
| EP | 0825420 A1 | 2/1998 |
| EP | 1055816 A1 | 11/2000 |
| WO | WO-02092402 A1 | 11/2002 |

OTHER PUBLICATIONS

U.S. Appl. No. 16/145,475, filed Sep. 28, 2018.

* cited by examiner

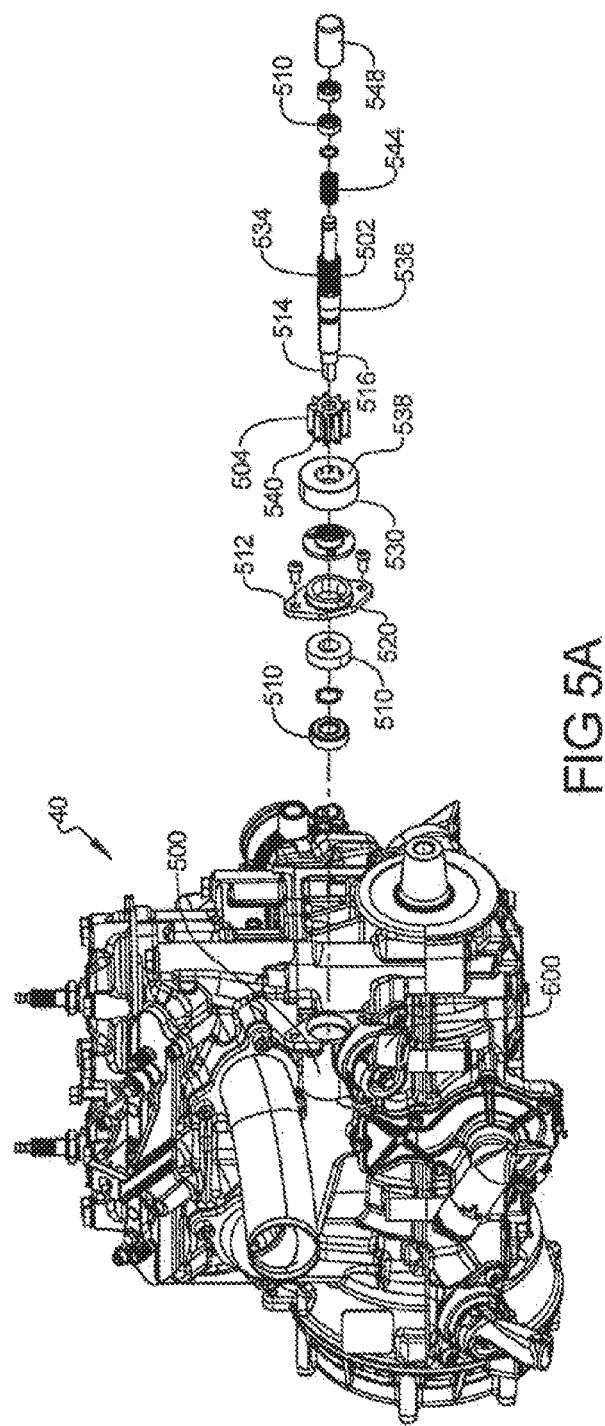

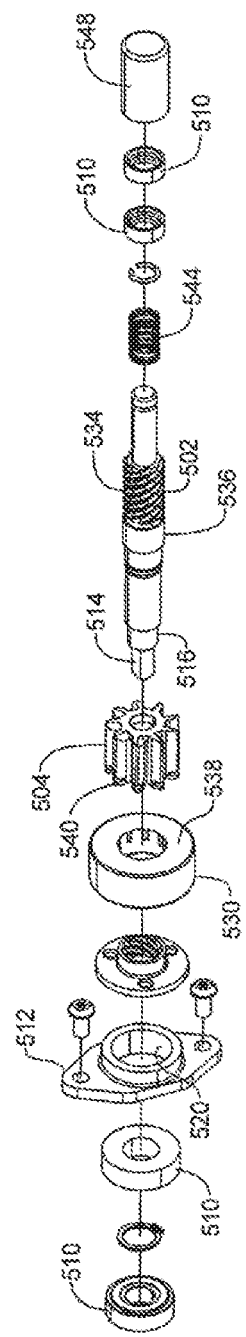

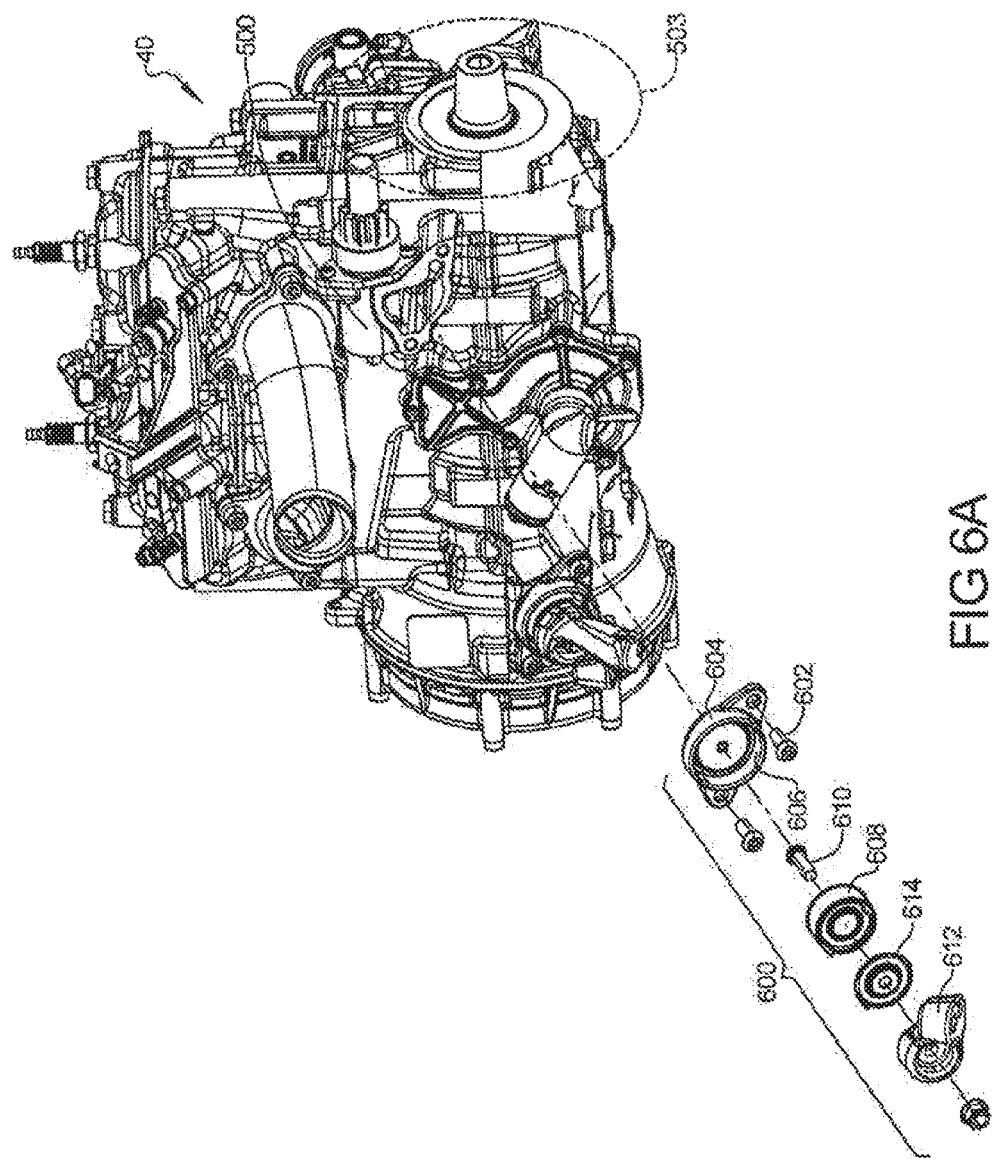

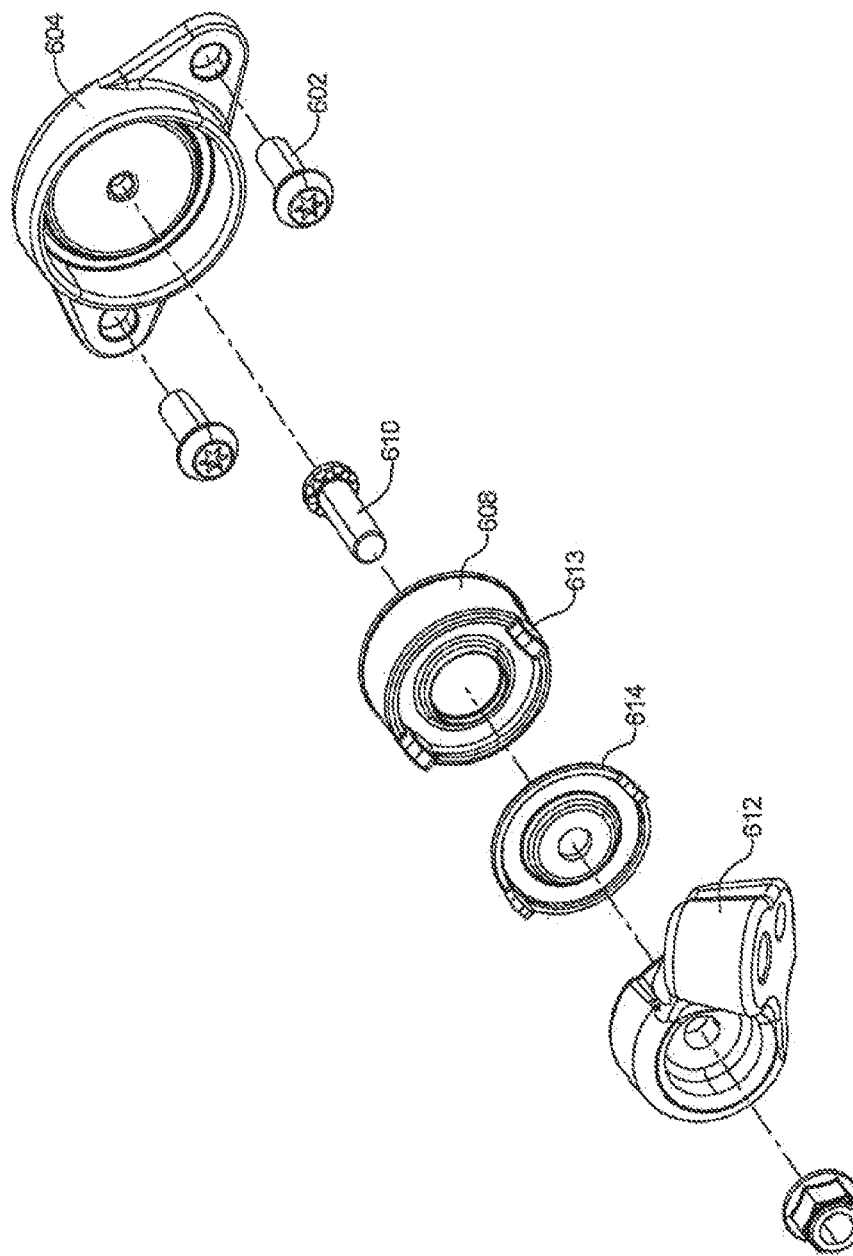

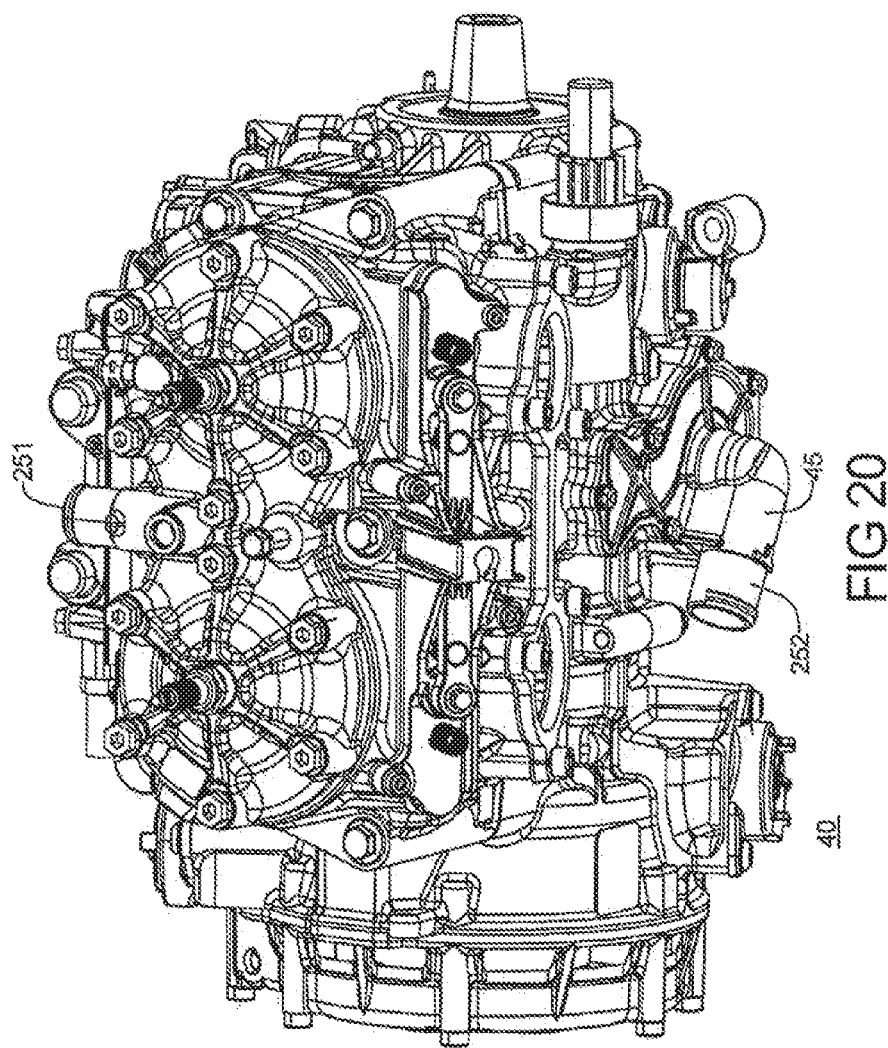

BATTERY KEY, STARTER AND IMPROVED CRANK

CROSS-REFERENCE TO RELATED APPLICATIONS

This application is a divisional of U.S. application Ser. No. 16/145,475, filed Sep. 28, 2018, which claims the benefit of U.S. Provisional Application No. 62/567,512 filed on Oct. 3, 2017. The entire disclosures of the above applications are incorporated herein by reference.

FIELD

The present disclosure relates to a vehicle engine and, more particularly, to a method and apparatus for starting an engine of a vehicle and associated engine features.

BACKGROUND

This section provides background information related to the present disclosure which is not necessarily prior art.

A vehicle, such as a snowmobile, generally includes an engine assembly. The engine assembly is operated with the use of fuel to generate power to drive the vehicle. The power to drive a snowmobile is generally generated by a combustion engine that drives pistons and a connected crank shaft. Two-stroke snowmobile engines are highly tuned, high output, and high specific power output engines that operate under a wide variety of conditions.

Vehicles such as snowmobiles can be difficult to start in cold weather. This is true especially for two-stroke engines. Many snowmobiles are pull start. Pull starting a snowmobile can be difficult. There is much resistance to a pull as the pistons move over top dead center.

Adding vehicle components to start the vehicle add complexity and operability issues in extreme temperatures. Typically, starting systems require a battery. Due to the extreme cold temperatures snowmobiles face, the battery has to be sized very large to start the vehicle reliably. Oftentimes, recreational vehicles are used sporadically and maintaining a charge on a fixed vehicle battery is inconvenient. Further the weight of a battery and start can detract from the ride. Reduce weight is typically a goal to increase fuel economy.

SUMMARY

This section provides a general summary of the disclosures, and is not a comprehensive disclosure of its full scope or all of its features.

A. Engine and Starter Mounting Assembly and Method

According the present teachings, an engine is disclosed having a starter flywheel, and a crank case having an integral starter pinion accepting member defining a through bore, and a gear assembly having an exterior surface configured to engage the flywheel and a surface engaging the shaft. A starter pinion shaft is disposed through the through bore, and has a first end projecting from a first side of the integral starter pinion accepting member. The first end is configured to be coupled to a starter motor. The starter pinion shaft has a second end projecting from a second side of the integral starter pinion accepting member, and defines a drive surface supporting the gear assembly. The pinion shaft is supported by a bearing disposed between the shaft and the through bore integral surface.

According to an alternate teaching, the aforementioned paragraphs or the following paragraphs, the engine further has the second end of the pinion shaft defines a worm gear configured to bias the gear assembly in a first direction when the shaft is rotated.

According to an alternate teaching, the aforementioned paragraphs or the following paragraphs, the gear assembly has a gear defining an internally threaded bore and an externally threaded surface, the internally threaded bore being configured to engage the worm gear defined on the shaft.

According to an alternate teaching, the aforementioned paragraphs or the following paragraphs, the gear assembly has a return spring configured to bias the gear assembly exterior surface away from the flywheel when the shaft is not rotating.

According to an alternate teaching, the aforementioned paragraphs or the following paragraphs, the engine further has a locking flange annularly disposed about the shaft configured to couple the shaft to the starter pinion accepting member.

According to an alternate teaching, the aforementioned paragraphs or the following paragraphs, wherein the shaft has a first end defining a flat configured to engage a flexible drive member.

According to an alternate teaching, the aforementioned paragraphs or the following paragraphs, wherein the gear assembly has a dust cover disposed over a return spring.

According the present teachings, an engine is disclosed having engine crankcase having an integral starter pinion accepting member defining a through bore and an external bearing surface and a force transmitting member having an exterior fly wheel engaging surface and an interior surface configured a worm gear engaging surface. A shaft which is disposed through the through bore is provided. The shaft has worm gear coupled to the worm gear engaging surface. An engine mount coupled to the external bearing surface.

According to an alternate teaching, the aforementioned paragraphs or the following paragraphs, the gear assembly has a return spring configured to bias the gear assembly exterior surface away from the flywheel when the shaft is not rotating.

According to an alternate teaching, the aforementioned paragraphs or the following paragraphs, the engine further has further has a locking flange annularly disposed about the shaft configured to couple the shaft to starter pinion accepting member.

According to an alternate teaching, the aforementioned paragraphs or the following paragraphs, the gear assembly has a dust cover disposed over a return spring.

According to an alternate teaching, the aforementioned paragraphs or the following paragraphs, the engine mount has a cylindrical rubber bushing member and a support bracket having a raised lip which annularly surrounds a cylindrical rubber bushing member.

According to an alternate teaching, the aforementioned paragraphs or the following paragraphs, the engine further has the engine mount bracket has a threaded pin disposed through the rubber bushing which is used to couple the engine mount to the vehicle frame engaging member.

According to an alternate teaching, the aforementioned paragraphs or the following paragraphs, the rubber bushing member has an integrated plate member, the plate and bushing member each having a pair of projecting flanges which are aligned with a pair of flange accepting apertures defined in the vehicle frame engaging member.

According to the present teachings, an engine mount is disclosed having a cylindrical rubber bushing member having a first pair of projecting flanges. The engine mount has an integrated plate member having a second pair of projecting flanges, the integrated plate member being at least partially disposed within the cylindrical rubber bushing member. A support bracket having a raised lip annularly surrounding the cylindrical rubber bushing member.

According to an alternate teaching, the aforementioned paragraphs or the following paragraphs, the engine mount bracket has a threaded pin disposed through the rubber bushing which is used to couple the engine mount to the vehicle frame engaging member.

According to an alternate teaching, the aforementioned paragraphs or the following paragraphs, the second pair of projecting flanges are at least partially disposed within the first pair of projecting flanges, wherein at least one of the first or second projecting flanges are aligned with a pair of flange accepting apertures defined in the vehicle frame.

B. Combustion Chamber and Exhaust Manifold Assembly and Method

According to the present teachings, a two-cycle engine for a vehicle is disclosed. The engine has a block defining an exhaust port and a cylinder, a head, and a piston defining a combustion chamber. The engine is configured to run at variable speeds that are determined by the rate fuel is being added to the combustion chamber. The exhaust port has a resonant frequency that, when not timed with the engine speed, causes a portion of the combusted and uncombusted exhaust gasses to flow from the exhaust system back into the combustion chamber. At a plurality of engine speeds below a predetermined engine speed, a majority of a portion of the combusted and uncombusted exhaust gasses flow from the exhaust system and impinge on the piston skirt before flowing back into the combustion chamber. At a speed above the predetermined speed, a majority of the portion of the combusted and uncombusted exhaust gasses flows from the exhaust system and back into the combustion chamber without engaging the skirt of the piston.

According to the aforementioned paragraph and the following paragraphs, the exhaust port includes an exhaust valve which selectively changes an aperture size of the exhaust port depending on the engine speed.

According to the aforementioned paragraphs and the following paragraphs, the exhaust port has a resonant frequency that depends on the position of the exhaust valve.

According to the aforementioned paragraphs and the following paragraphs, the exhaust port is an elongated passage fluidly coupled to the combustion chamber. The elongated fluid passage being angled and having a flow direction away from the engine head.

According to the aforementioned paragraphs and the following paragraphs, the head of the engine has a surface representing a portion of a cutaway of a horn torus that defines a portion of the combustion chamber.

According to the aforementioned paragraphs and the following paragraphs, the head of the engine has a surface representing a portion of a cutaway of a torus which defines a portion of the combustion chamber and the engine further has a sparkplug which positions a spark initiating member centrally within the torus.

According to the aforementioned paragraphs and the following paragraphs, the head of the engine has a surface representing a cutaway portion of a torus which defines a volume of greater than about 9% percent of the combustion chamber volume when the piston is at top dead center.

According to the present teachings, and the previous and following paragraphs, presented is an engine having an engine block, cylinder wall, piston having a skirt, and head defining a combustion chamber. Defined within the cylinder wall is an exhaust port having resonant frequency that causes a portion of combusted and uncombusted exhaust gasses to flow from the exhaust system and back into the combustion chamber. At a plurality of engine speeds a majority of a portion of the combusted and uncombusted exhaust gasses flows from the exhaust system and back into the combustion chamber after impinging on to the piston skirt. At a speed above the predetermined speed, a majority of the portion of the combusted and uncombusted exhaust gasses flows from the exhaust system and back into the combustion chamber without significantly engaging the skirt of the piston.

According to the present teachings, and the previous and following paragraphs, presented is an engine having an exhaust port defining an elongated channel, flow from said combustion chamber into the exhaust port flows at an angle obtuse to a centerline of the piston travel and away from the cylinder head.

C. Vehicle Cooling Assembly and Method

The present disclosure teaches an improved system and method for reliably managing two cycle engine heat, and particularly two cycle engine heat snowmobile. The system moves the cooling system bypass check valve out of the engine and into a location in a cooling system which is subjected to significantly lower vibrational energy.

According to the present teachings, presented is coolant reservoir configured to be placed within a vehicle cooling system. The coolant reservoir has a bottle that defines a first chamber and a second chamber fluidly coupled to the first chamber through an aperture having a valve seat. The first chamber is fluidly coupled to a source of heated engine cooling fluid, while the second chamber is fluidly coupled to an engine water pump. A thermally responsive actuator having a sliding member and a valve seat engaging surface is disposed within the first chamber. The sliding member is movable from a first open position to a second closed position when the coolant is above a first temperature.

According to the aforementioned paragraph and the following paragraphs, a first spring can be engaged between the sliding member and the coolant bottle and is operative to urge the sliding member in a first direction relative to the valve seat. A second spring can be engaged between the sliding member and the coolant bottle and operative to urge the valve seal in a second direction relative to the valve seat.

According to the aforementioned paragraphs and the following paragraphs, the coolant reservoir can have a first member defining a first portion of the first chamber and a first portion of the second chamber.

According to the aforementioned paragraphs and the following paragraphs, the coolant reservoir can have a second member defining a second portion of the first chamber, and wherein the thermally responsive actuator has a flange member couple to the second member.

According to the aforementioned paragraphs and the following paragraphs, the coolant reservoir can have a first member defines a first portion of the first chamber and a first portion of the second chamber.

According to the aforementioned paragraphs and the following paragraphs, the coolant reservoir can have a first member defining a first chamber first aperture fluidly coupled to the engine water pump.

According to the aforementioned paragraphs and the following paragraphs, the coolant reservoir can have a first member defining a first chamber first aperture fluidly coupled to the source of heated engine cooling fluid.

According to the aforementioned paragraphs and the following paragraphs, the coolant reservoir can have first member defining a bypass aperture between the first and second chambers having the valve seat, whereby the valve seat engaging surface is positioned adjacent the bypass aperture.

According to the aforementioned paragraphs and the following paragraphs, the coolant reservoir can have the thermally responsive actuator axially coupled to the bottle.

According to the aforementioned paragraphs and the following paragraphs, the coolant reservoir first member defines a first chamber second aperture fluidly coupled to a cooling chamber.

According to the aforementioned paragraphs and the second member defines a first chamber second aperture fluidly coupled to the cooling chamber.

According to the present teachings, and the previously mentioned and following paragraphs, presented is coolant reservoir configured to be placed within a vehicle cooling system. A coolant bottle formed of at least first and second members. The first and second members define a first chamber, and the first member further forms a portion of a second chamber. The first and second chambers are fluidly coupled through an aperture having a valve seat. The first chamber is fluidly coupled to a source of heated engine cooling fluid, and the second chamber is fluidly coupled to an engine water pump. The bottle has a thermally responsive actuator disposed within the first chamber that has a sliding member having a valve seat engaging surface. The sliding member is movable from a first open position when the coolant is below a first temperature to a second position when the coolant is above the a first temperature.

According to the present teachings, and the previously mentioned and following paragraphs wherein the first member defines a second chamber first aperture fluidly coupled to the engine water pump.

According to the present teachings, and the previously mentioned and following paragraphs wherein the first member further defines a second chamber first aperture fluidly coupled to the source of heated engine cooling fluid.

According to the present teachings, and the previously mentioned and following paragraphs wherein the first member defines a second chamber second aperture fluidly coupled to a heat exchange chamber.

According to the present teachings, and the previously mentioned and following paragraphs wherein the second member defines a first chamber second aperture fluidly coupled to the heat exchange chamber.

According to the present teachings, and the previously mentioned and following paragraphs further comprising a third member defining a closable third coolant accepting aperture.

According to the present teachings, and the previously mentioned and following paragraphs further having a conical swirl plate member disposed between the third chamber and second chamber, the conical swirl plate member defines a plurality of coupling apertures fluidly coupling the second and third chambers.

According to the present teachings, and the previously mentioned and following paragraphs where the sliding valve element has a second exterior bearing surface which is configured to engage a first end of the second intermediate spring.

According to the present teachings, and the previously mentioned and following paragraphs wherein the sliding valve element bearing surface slidably supports the valve seal and regulates the movement of the valve seal toward and away from the valve seat.

According to the present teachings, and the previously mentioned and following paragraphs wherein the thermally responsive actuator includes a retractable piston, the thermally responsive actuator is configured to retract the piston and thereby position the sliding valve element in an open position.

According to the present teachings, and the previously mentioned and following paragraphs where the thermally responsive actuator includes a retractable piston, the thermally responsive actuator is configured to retract the piston and thereby position a valve seal stop on the sliding valve element in an open position.

According to the present teachings, and the previously mentioned and following paragraphs, presented is coolant reservoir configured to be placed within a vehicle cooling system. The coolant reservoir has a first member defining first and second chambers and a first bypass passage having a first valve seat there between. The first chamber is fluidly coupled to a heated engine fluid supply and the second chamber is fluidly coupled to an engine fluid return. The bottle includes a thermally responsive actuator that moves a valve bearing element between an open and closed positions. The thermally responsive actuator includes a sliding valve element disposed within the first chamber and a valve seal which is configured to engage the first valve seat. The sliding valve element has a second exterior bearing surface which is configured to fixably engage the first member. The thermally responsive actuator is operably engaged between the sliding valve element and the bottle and operative to urge the sliding valve element away the valve seat and wherein the second spring is engaged between the sliding valve element and the valve seal and operative to urge the valve seal toward the valve seat.

According to the present teachings, and the previously mentioned and following paragraphs where the first member defines a second chamber first aperture fluidly coupled to the engine water pump.

According to the present teachings, and the previously mentioned and following paragraphs where the first member further defines a second chamber first aperture fluidly coupled to the source of heated engine cooling fluid.

According to the present teachings, and the previously mentioned and following paragraphs where the first member defines a second chamber second aperture fluidly coupled to a heat exchange chamber.

According to the present teachings, and the previously mentioned and following paragraphs where the second member defines a first chamber second aperture fluidly coupled to the heat exchange chamber.

D. Stator Cooling Assembly and Method

An alternator that is powered by an engine may generally include at least two components including a stator unit and a moving rotor component. In various embodiments, the rotor component rotates by being driven by a crank shaft. For example, the crank shaft is connected to a fly wheel component that moves relative to a stator. In various embodiments, the fly wheel moving relative to the stator may be referred to as a generator or an alternator flywheel.

Because of movement of the rotor relative to the stator, a current is generated through coils or windings of the stator. In addition to the current, resistance to the current in the windings may generate thermal energy. Movement of the rotor, with or due to the fly wheel, may also generate thermal energy. An increase of temperature may occur due to the presence of the thermal energy. A fan assembly may, therefore, be associated with the rotating component, such as the fly wheel, to assist in removing or dissipating the thermal energy and reducing the lowering of temperature of the stator or alternator assembly.

E. Vehicle Starter System and Method

The present disclosure also provides an improved method for reliably starting a vehicle, particularly a snowmobile.

In one aspect of the disclosure, a system for starting an engine comprises a fuel injector that injects fuel into a closed intake port to form an air fuel mixture, an actuator rotating a crankshaft in a first direction to open the intake port by moving a piston within a cylinder coupled to the crankshaft and a combustion chamber defined between the cylinder and the port receiving the air fuel mixture through the intake port. The actuator rotates the crankshaft in a second direction to close the intake port and compress the fuel mixture. A spark plug ignites the air fuel mixture to start the engine.

In another aspect of the disclosure, a method of starting an engine of a vehicle comprises injecting fuel into a closed intake port to form an air fuel mixture, rotating a crankshaft in a first direction to open the intake port by moving a piston within a cylinder coupled to the crankshaft, receiving the air fuel mixture through the intake port in a combustion chamber defined between the cylinder and the port, rotating the crankshaft in a second direction to close the port and igniting the air fuel mixture to start the engine.

In yet another aspect of the disclosure, a method of starting an engine of a vehicle comprising coupling a battery key to a controller of the vehicle, said battery key comprising a key identifier, communicating a key identifier from the battery key to a controller of the vehicle, said controller having a stored identifier, comparing the stored identifier and the key identifier, and, in response to comparing, providing power from the battery key to an actuator to rotate a crankshaft of the engine.

In yet another aspect of the disclosure, a system for starting an engine of a vehicle comprises a controller disposed within the vehicle and a battery key coupled to the controller of the vehicle. The battery key communicates a key identifier to the controller of the vehicle. The controller has a stored identifier therein. The controller compares the stored identifier and the key identifier. The controller, in response to comparing, provides power from the battery key to an actuator to rotate a crankshaft of the engine.

F. Fuel Management System and Method

The present disclosure also provides an improved method for operating an engine, particularly a two-stroke engine for a snowmobile.

In one aspect of the disclosure, a system of operating the same includes a fuel injector, a fuel pressure sensor generating a fuel pressure signal, and a controller coupled to the fuel pressure sensor and the fuel injector. The controller prevents a fuel injector from injecting fuel into the engine when the fuel pressure is below a fuel pressure threshold. The controller injects fuel into the engine when the fuel pressure is above the fuel pressure threshold.

In another aspect of the disclosure, a method of initiating starting of a two-stroke engine, determining fuel pressure, when the fuel pressure is below a fuel pressure threshold, preventing a fuel injector from injecting fuel into the engine, and when the fuel pressure is above the fuel pressure threshold, injecting fuel into the engine.

In yet another aspect of the disclosure, a method operating an engine includes determining a first pulse width duration for a fuel injector based on engine speed and throttle position, determining a barometric pressure, when the first pulse width duration is less than a minimum duration, determining a second pulse width duration as a function of barometric pressure, and operating the fuel injector with the second pulse width duration.

In yet another aspect of the disclosure, a system for operating an engine includes a fuel injector, an engine speed sensor, a barometric pressure sensor generating a barometric pressure signal corresponding to a barometric sensor and a controller coupled to the fuel injector, engine speed sensor, the barometric pressure sensor and the fuel injector. The controller determines a first pulse width duration for operating the fuel injector based on engine speed and throttle position, said controller determining a second pulse width duration as a function of barometric pressure when the first pulse width duration is less than a minimum duration, and communicating a pulse having a second pulse width duration. The fuel injector operates with the second pulse width duration.

In yet another aspect of the disclosure, a method of operating an engine comprises determining a first pulse width duration for a fuel injector based on engine speed and throttle position, determining at least one of a fuel pressure and a fuel temperature, and determining a pulse width correction factor as a function of at least one of a fuel pressure and a fuel temperature. The method further comprises determining a second pulse duration based on the pulse width correction factor and operating the fuel injector with the second pulse width duration.

In yet another aspect of the disclosure, a system of operating an engine comprises a fuel injector, an engine speed sensor generating an engine speed signal corresponding to an engine speed, a throttle position sensor generating a throttle position signal corresponding to a throttle position, a sensor module comprising at least one of a fuel pressure sensor generating a fuel pressure signal corresponding to a fuel pressure into the engine and a fuel temperature sensor generating a fuel pressure signal corresponding to a fuel pressure into the engine. A controller is coupled to the fuel injector, the engine speed sensor and the sensor module. The controller determines a pulse width duration for the fuel injector based on engine speed and throttle position, determining a pulse width correction factor as a function of at least one of the fuel temperature signal and the fuel pressure signal, determining a second pulse width duration based on the first pulse width, and operating the fuel injector with the second pulse width duration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A-5C are views of an engine components of an integral starter pinion and engine mount.

FIGS. 6A and 6B represent sectional and exploded views of the integral starter pinion and engine mount shown in FIG. 5A.

FIG. 20 is a perspective view of an engine having improved cooling fluid flow according to the present teachings.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1:
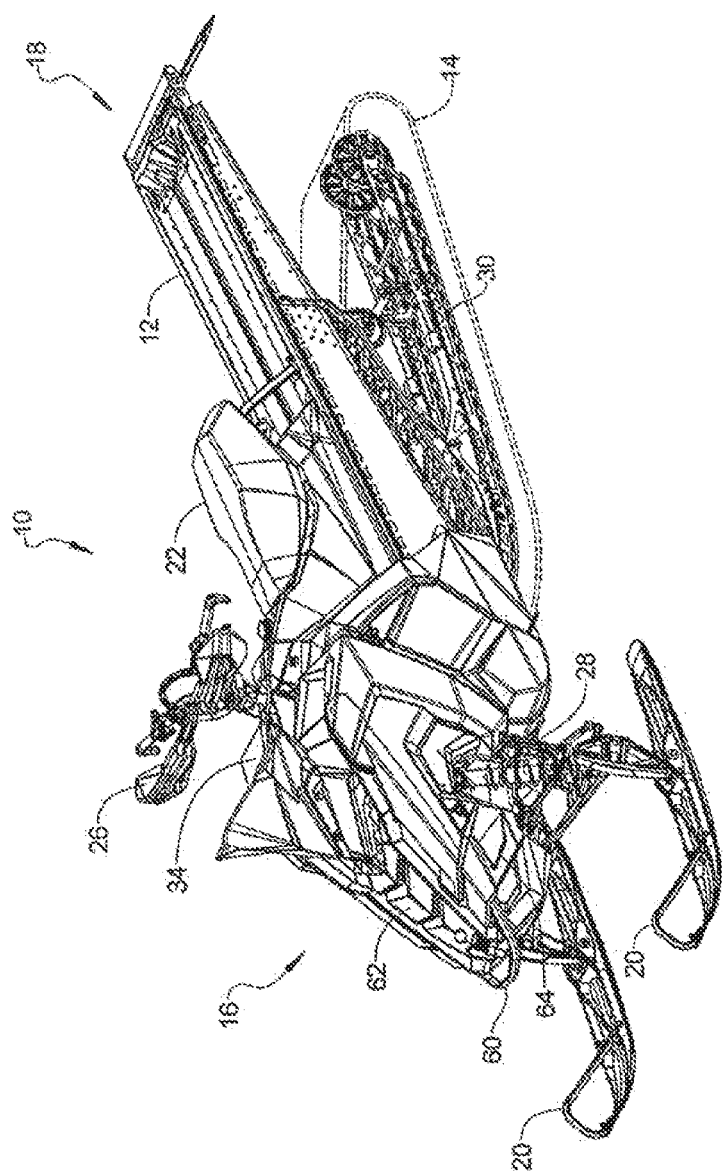
FIG. 1 is a perspective view of a snowmobile.
Figure 2:
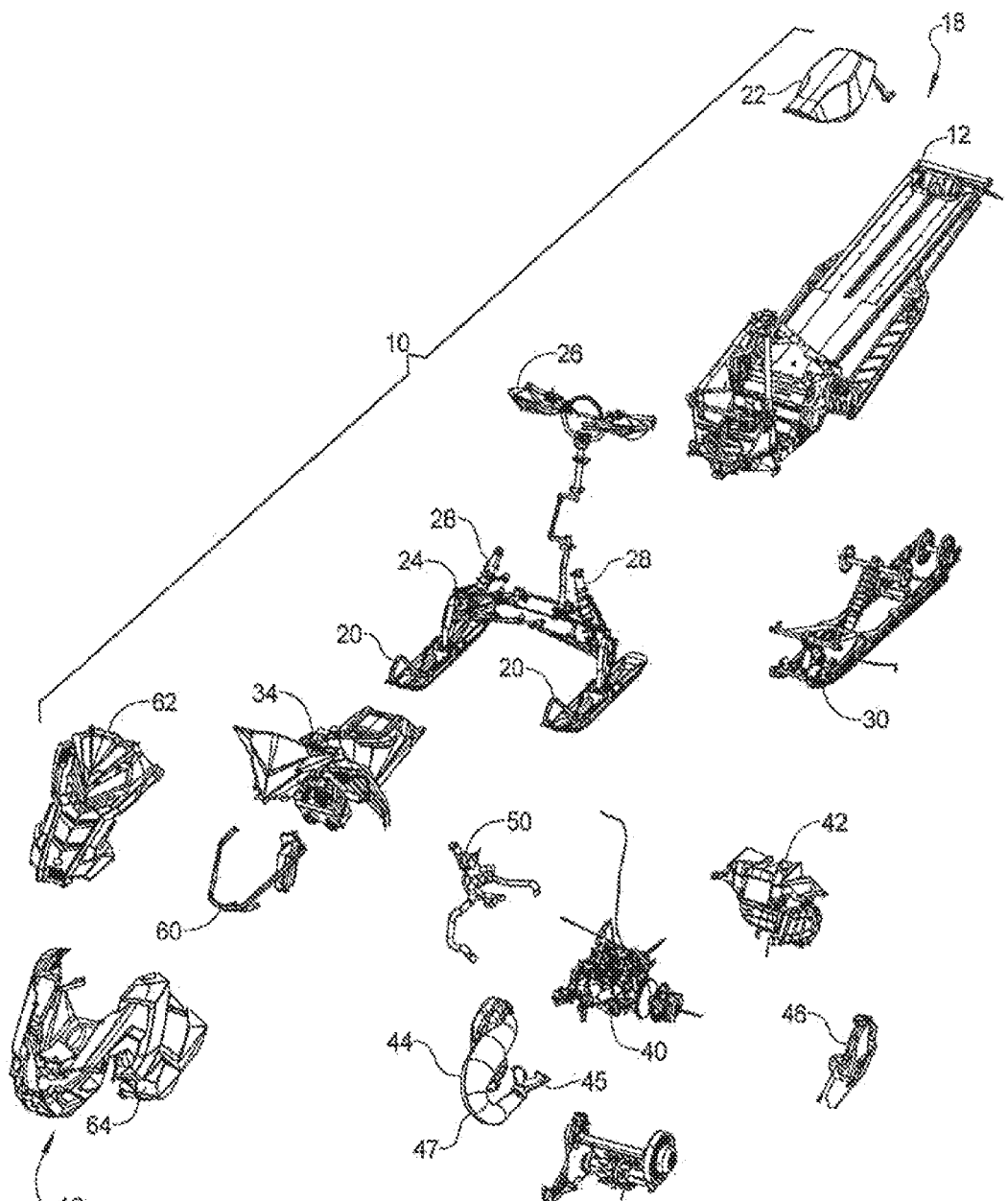
FIG. 2 is an exploded view of the snowmobile of FIG. 1.
Figure 2A:
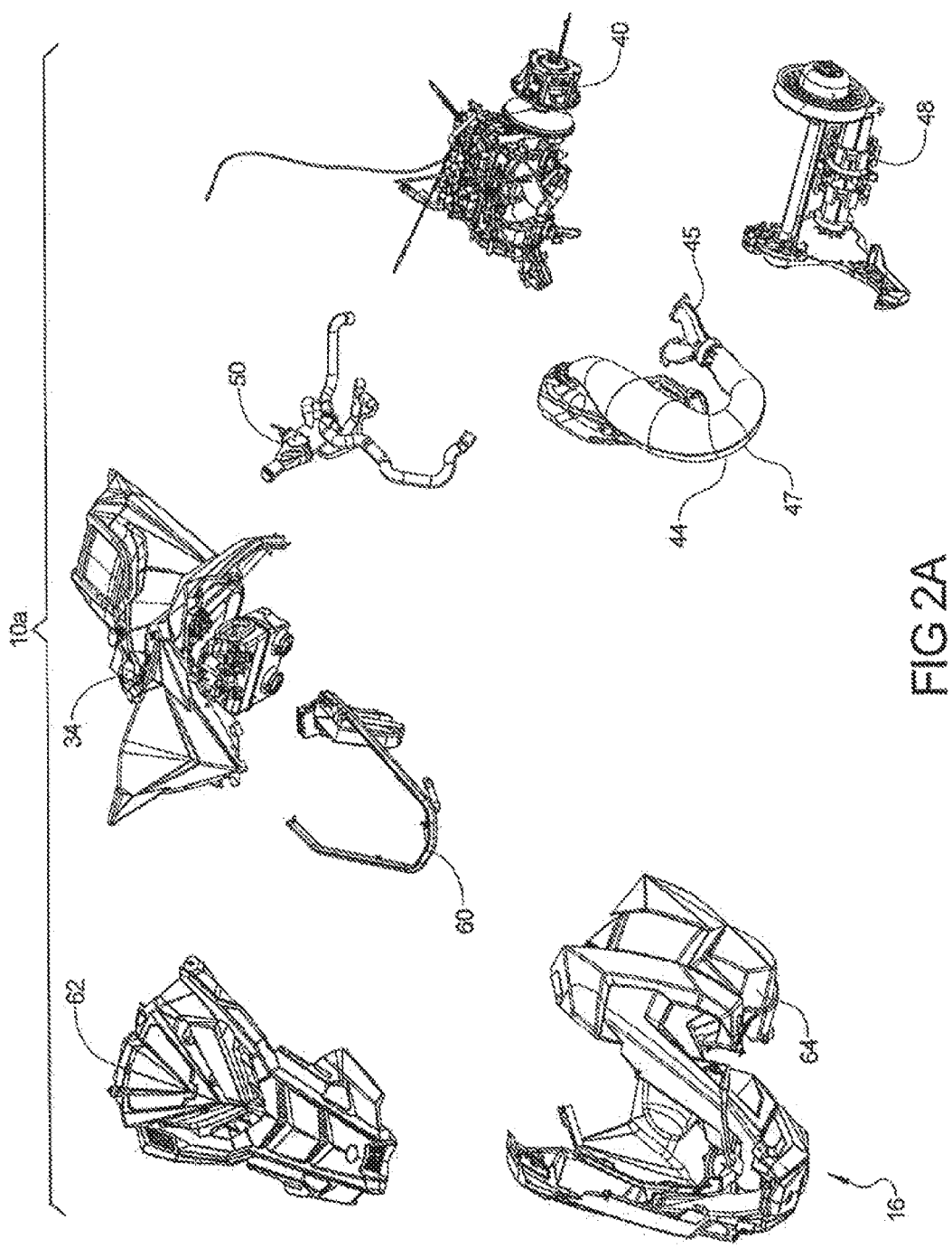
FIGS. 2A and 2B are enlarged exploded views of FIG. 2.
Figure 2B:
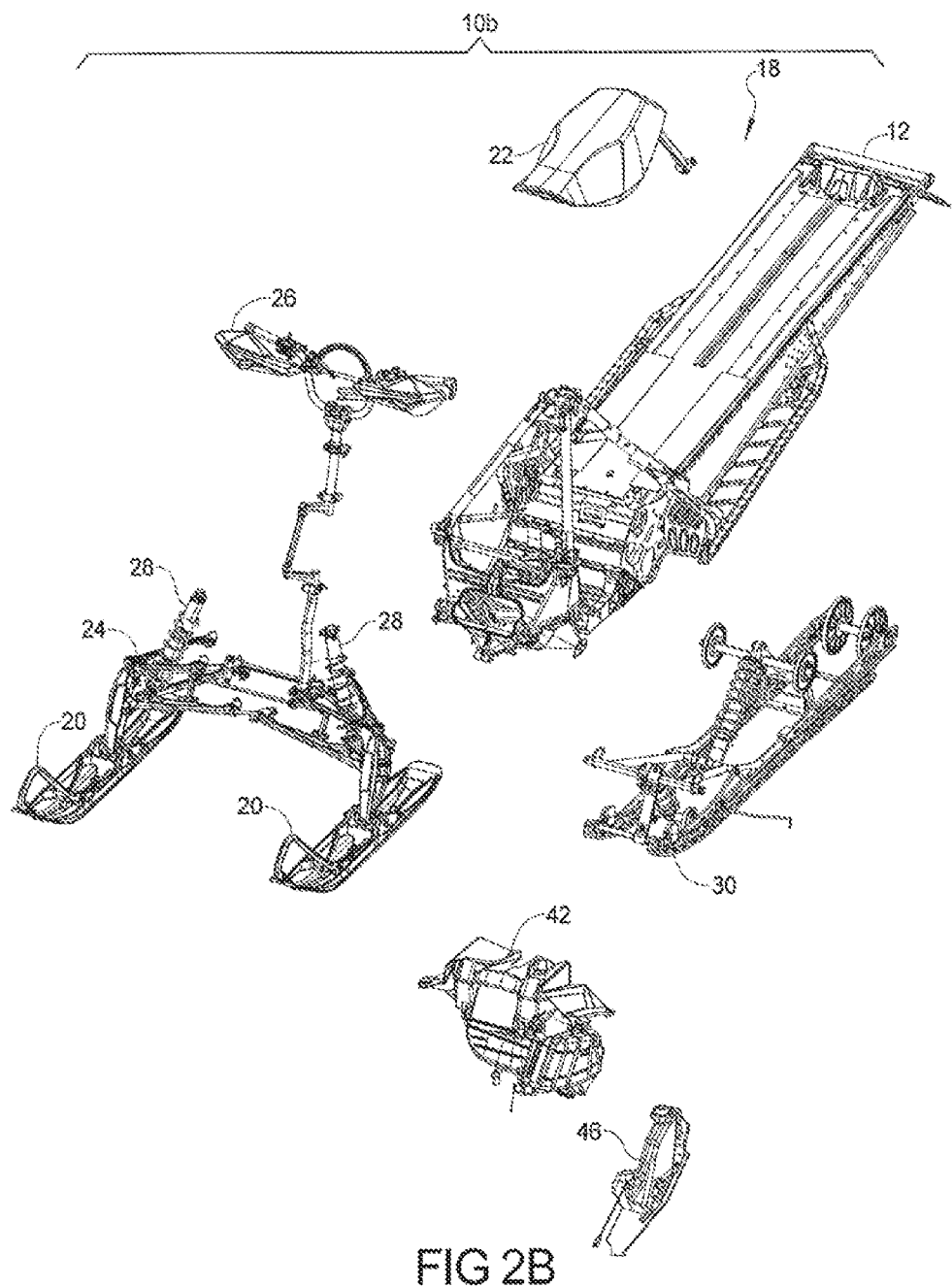

Referring now to FIGS. 1 and 2, one embodiment of an exemplary snowmobile 10 is shown. Snowmobile 10 includes a chassis 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include handlebars 26 for steering, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for displaying engine conditions (i.e., gauges) and for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. An oil tank assembly 46 is used for providing oil to the engine for lubrication and for mixing with the fuel in the intake assembly 42. A drivetrain assembly 48 is used for converting the rotating crankshaft assembly from the engine assembly 40 into a potential force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3A:
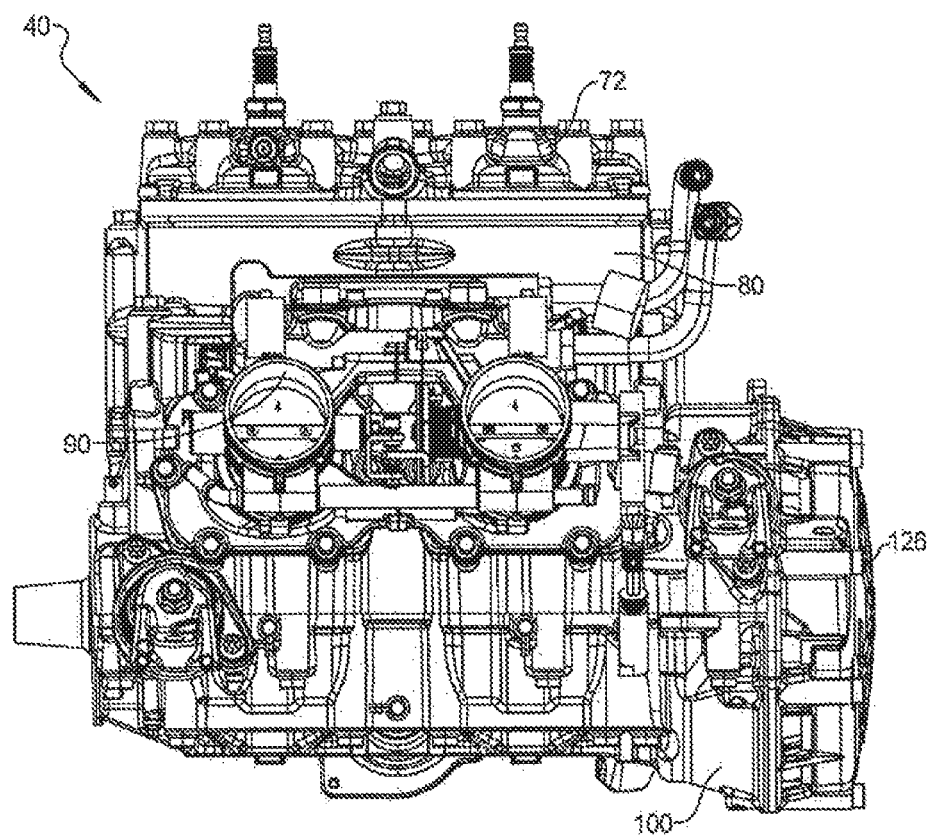
FIGS. 3A and 3B are opposite side views of the engine of FIG. 2.
Figure 3B:
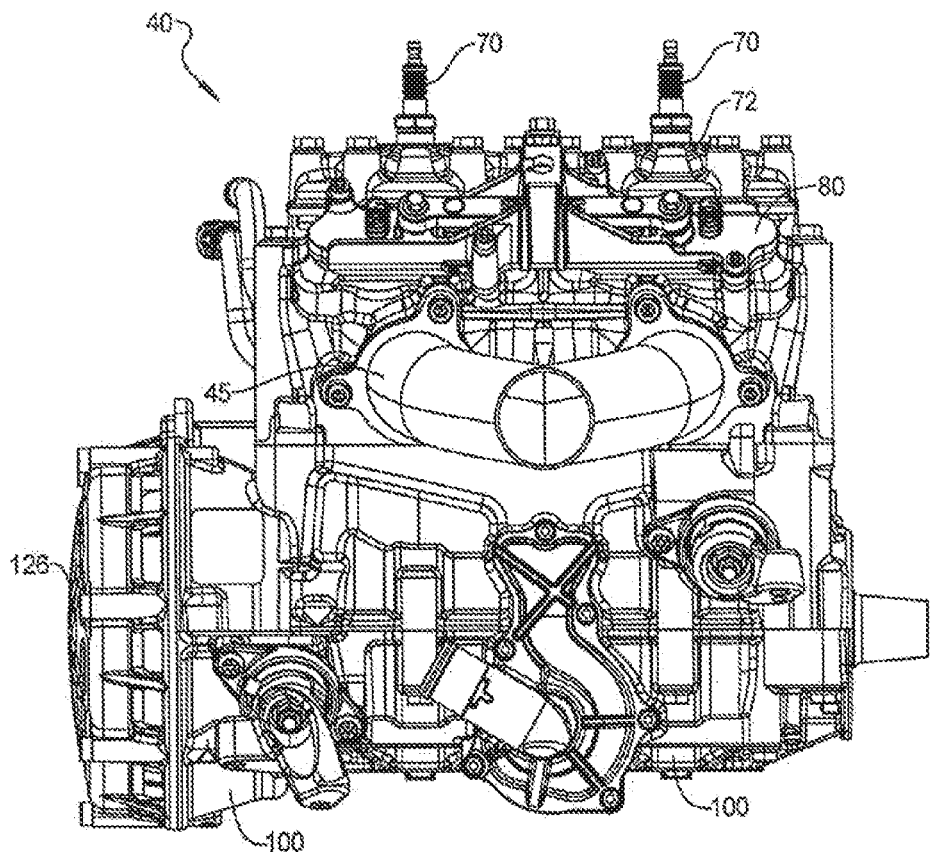
Figure 4:
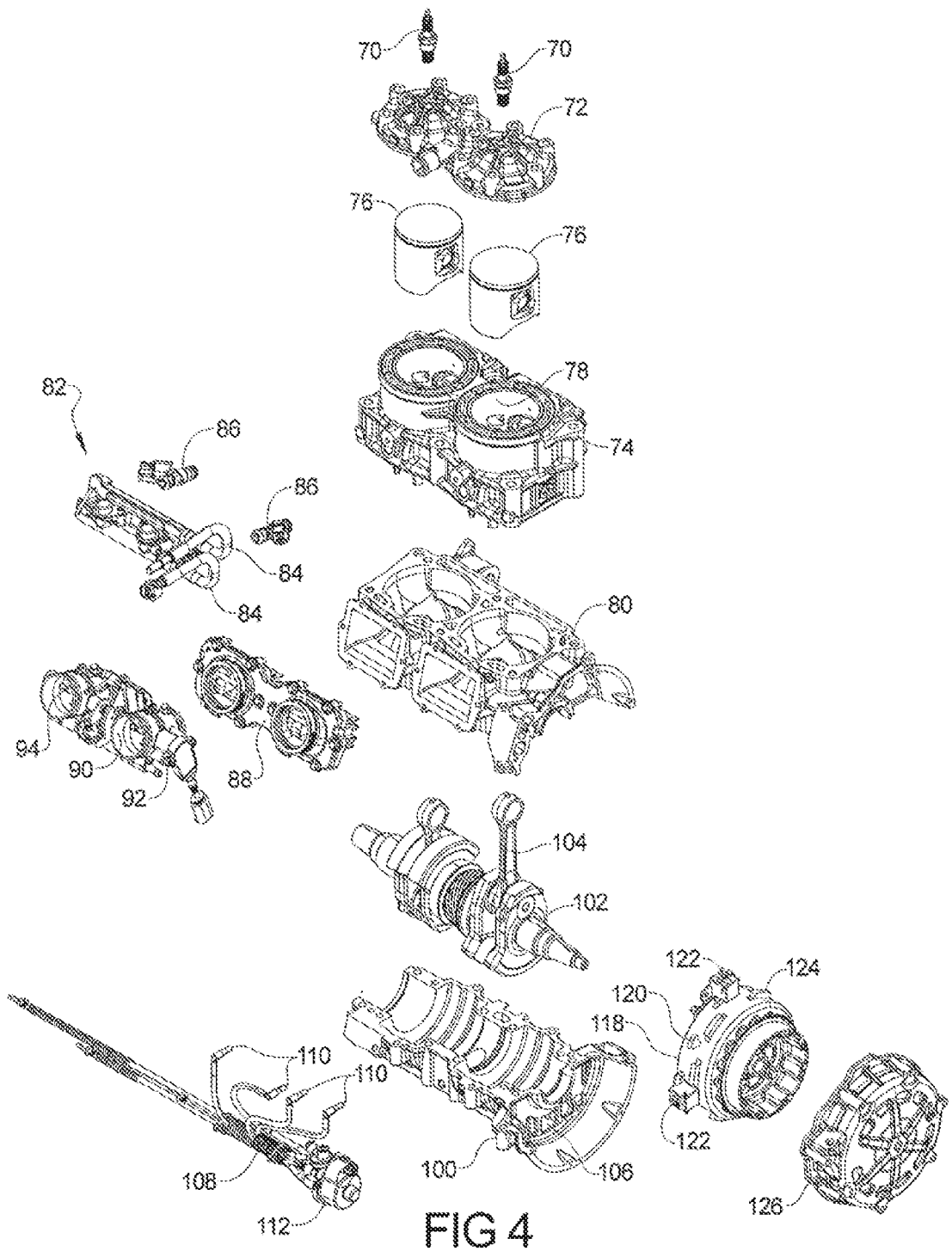
FIG. 4 is an exploded view of the engine of FIG. 3.

Referring now to FIGS. 3A, 3B and 4, the engine assembly 40 is illustrated in further detail. The engine assembly 40 is a two-stroke engine that includes the exhaust assembly 44 that includes an exhaust manifold 45 and an exhaust pipe 47.

The engine assembly 40 may include spark plugs 70 which are coupled to a one-piece cylinder head cover 72.

The cylinder head cover 72 is coupled to the cylinder head 74 with six bolts which is used for housing the single-ring pistons 76 to form a combustion chamber 78 therein. The cylinder head 74 is mounted to the engine block 80.

The fuel system 82 that forms part of the intake assembly 42, includes fuel lines 84 and fuel injectors 86. The fuel lines 84 provide fuel to the fuel injectors 86 which inject fuel, in this case, into a port adjacent to the pistons 76. An intake manifold 88 is coupled to the engine block 80. The intake manifold 88 is in fluidic communication with the throttle body 90. Air for the combustion processes is admitted into the engine through the throttle body 90 which may be controlled directly through the use of an accelerator pedal or hand operated switch. A throttle position sensor 92 is coupled to the throttle to provide a throttle position signal corresponding to the position of a throttle valve of throttle plate 94 to an engine controller discussed further herein.

The engine block 80 is coupled to crankcase 100 and forms a cavity for housing the crankshaft 102. The crankshaft 102 has connecting rods 104 which are ultimately coupled to the pistons 76. The movement of the pistons 76 within the engine chamber 78 causes a rotational movement at the crankshaft 102 by way of the connecting rods 104. The crankcase may have openings or vents 106 therethrough.

The system is lubricated using oil lines 108 which are coupled to the oil injectors 110 and an oil pump 112.

The crankshaft 102 is coupled to a generator flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine, as well as being used to time the operation of the injection of fuel during the combustion process. A stator cover 126 covers the stator 120 and flywheel 118.

Discussed below are various features of the engine assembly 40 used in the snowmobile 10. Each of the features relate to the noted section headings set forth below. It should be noted that each of these features can be employed either individually or in any combination with the engine assembly 40. Moreover, the features discussed below will utilize the reference numerals identified above, when appropriate, or other corresponding reference numerals as needed. Again, as noted above, while the engine assembly 40 is a two-stroke engine that can be used with the snowmobile 10, the engine assembly 40 can be used with any appropriate vehicles and the features discussed below may be applied to four-stroke engine assemblies as well.

A. Engine and Starter Mounting Assembly and Method

Figure 5B:
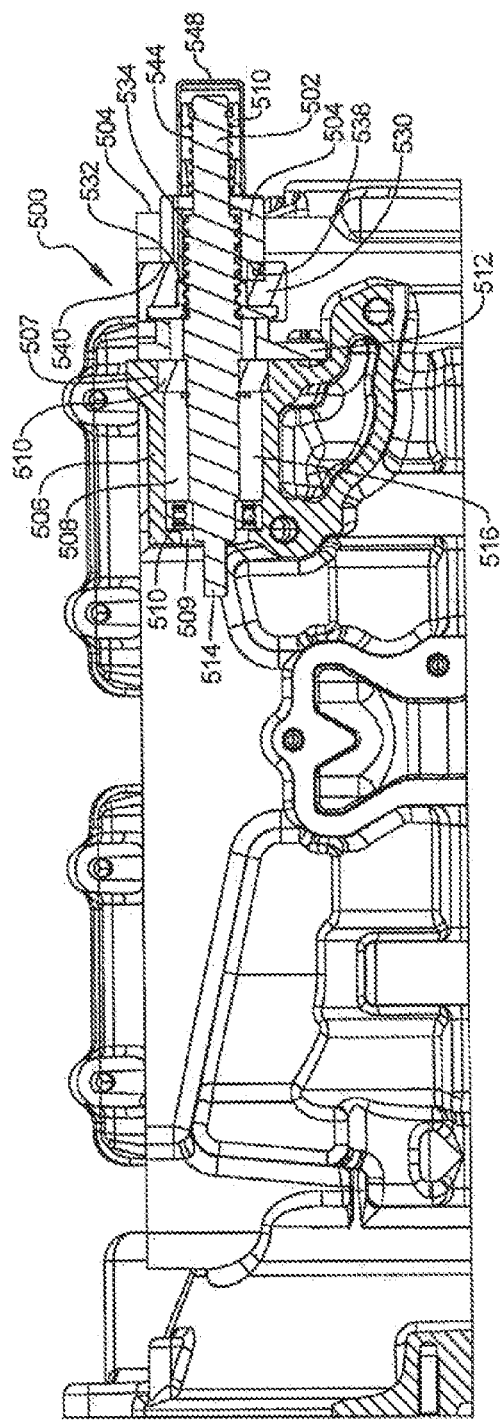

As best seen in FIGS. 5A-5C, the engine assembly 40 has a starter pinion assembly 500 having an integrated engine mount 600. The starter pinion assembly 500 has a pinion shaft 502 having a displaceable gear assembly 504 which engages an engine starter fly wheel 503. The starter pinion assembly 500, has an integrated monolithic starter pinion support member 506 that is cast and machined into the crankshaft case body.

FIGS. 5B and 5C represent sectional and exploded views of the pinion assembly 502. The starter pinion assembly 500 is integral formed into the crankcase at the integrated starter pinion support member 506. The integral starter pinion accepting member 506 defines a through bore 508 which annually supports the shaft 502 using a pair of bearings 510. The integral starter pinion accepting member 506 has first and second ends defining first and second apertures 507 and 509, with first aperture 507 having a larger diameter than the second aperture 509. The shaft 502 and displaceable gear assembly 504 are held to the integral starter pinion member 506 by a bracket 512 which defines a through aperture annularly disposed about the shaft 502. The shaft 502 has a first end 514 which projects from a first end of the integral starter pinion accepting member 506 and through the aperture 508. The first end 514 has an engaging surface which allows the coupling of the shaft 502 to a flexible starter cable (not shown).

The shaft 502 further has a medial portion 516 which is annularly supported by the bearings 510. The bracket 512 defines a through bore 520 which is annularly disposed about the shaft 502, and functions to hold the bearings 510 within the through aperture 508.

Outside of the through aperture 508 is the displaceable gear assembly 504. The displaceable gear assembly 504 has a shaft engaging member 530 which has an interior thread 532 that engages a worm thread 534 defined on an exterior surface 536 on the shaft 502. The shaft engaging member 530 has a surface 538 which apply axial force onto a surface 540 of a gear 542 which during engagement of the starter axially displaces the gear 542 along a longitudinal axis of the shaft into engagement with the starter fly wheel 503.

After the starter is disengaged, power to the displaceable gear assembly 504 is removed, stopping rotation of the shaft 502. Return spring 544 applies return axial forces to the gear 542, disengaging the gear 542 from the fly wheel 503. Associated with the return spring is a pair of bearings 510 and a dust cover 548.

As best seen in FIGS. 6A-6B, immediately adjacent the starter pinion assembly 500 and coupled thereto is the engine mount 600. The engine mount 600 is coupled to the integral starter pinion accepting member 506 with a pair of fasteners 602.

In this regard, the engine mount 600 has a bracket 604 having a raised lip 606 which annularly surrounds a cylindrical rubber bushing member 608. Disposed through the bracket 604 and cylindrical rubber bushing member 608 is a threaded pin 610 which is used to couple the engine mount 600 to a vehicle from engaging member 612.

Figure 7A:
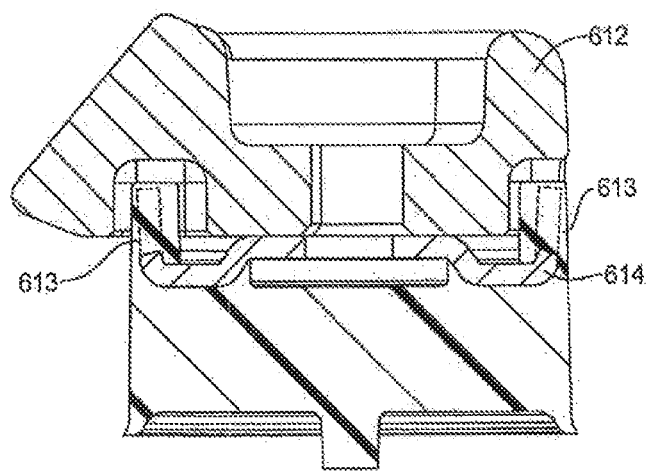
FIGS. 7A and 7B represent sectional and perspective views of the engine mount according to the present teachings.
Figure 7B:
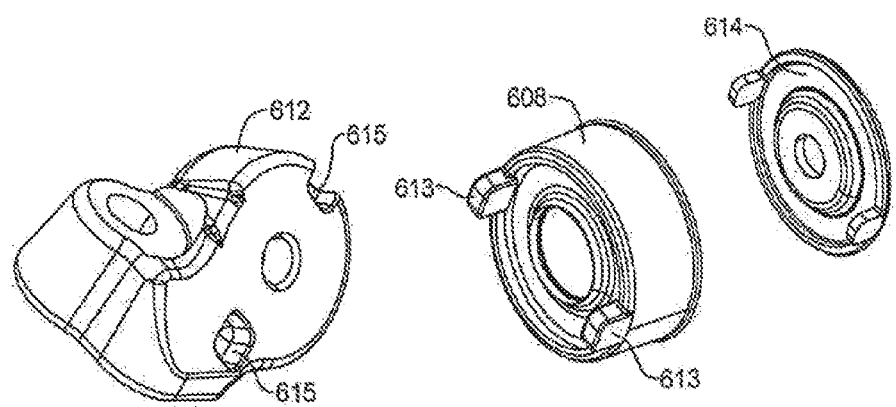

As best seen in FIGS. 7A and 7B, the rubber bushing member 608 has an integrated plate member 614. The integrated plate member 614 and bushing member 608 have a pair of projecting ears or flanges 612 disposed at the bushing periphery 616 and off of a bushing top surface 618 which are aligned with a pair of square flange accepting apertures 614 defined in the vehicle frame engaging member 612. The pair of projecting ears or flanges 612 disposed at the bushing periphery 616 and off of a bushing top surface 618 project along a line parallel to and displaced from an axis formed by the support pin. The pair of projecting ears or flanges 612 function as additional cushion and support along the force vectors most likely to induce damage to the bushing material. These apertures 612 and flanges align with the highest vibration loading vectors in the vehicle, thus increasing the expected life of the rubber bushing member 608. In this regard, the pair of projecting flanges are positioned on a first surface of the rubber member and are radially displaced about a rubber bushing periphery at between 10 and 180 degrees to accept loading.

B. Combustion Chamber and Exhaust Manifold Assembly and Method

FIGS. 8-13 represent cross sectional views of the engine assembly 40 which are shown at various times of an engine piston rotation. The engine assembly 40 has a block 300, such as block 80 defining an exhaust port 310 and a cylinder 312 defining the combustion chamber 324, the engine head 74, and the piston 76. The engine assembly 40 is configured to run at variable speeds which changes as a fuel/air mixture is being added to the combustion chamber 324. The exhaust port 310 has a resonant frequency that causes a portion of the combusted and uncombusted exhaust gasses to flow from the exhaust assembly 44 back into the combustion chamber 324. At a plurality of engine speeds below a predetermined engine speed (about 6500), a majority of a portion and preferably more that 30% of the combusted and uncombusted exhaust gasses flow from the exhaust port 310 impinges on the piston skirt 315 prior to returning to the combustion chamber 324 with the remainder greater than 70% flowing past the skirt into the combustion chamber.

Preferably, at max torque and power output RPM of the engine, more than 70% of the returned exhaust gas from the exhaust port will bypass the piston skirt. At a speed above the predetermined speed (RPM?), a majority of the portion of the combusted and uncombusted exhaust gasses flowing from the exhaust port 310 and back into the combustion chamber 324 occurs without substantially engaging the skirt 315 of the piston 76. The exhaust port 310 includes an exhaust valve 320 which moves within the exhaust port 310 to change the cross sectional area and shape of an aperture 322 in response to changing engine conditions such as engine speed.

The exhaust port 310 is an elongated passage 325 fluidly coupled to the combustion chamber 324 and to the exhaust assembly 44. The elongated passage 325 is angled down at an obtuse angle with respect to the piston centerline, and is configured to direct hot exhaust gasses in a direction away from the engine head 74.

Figure 8:
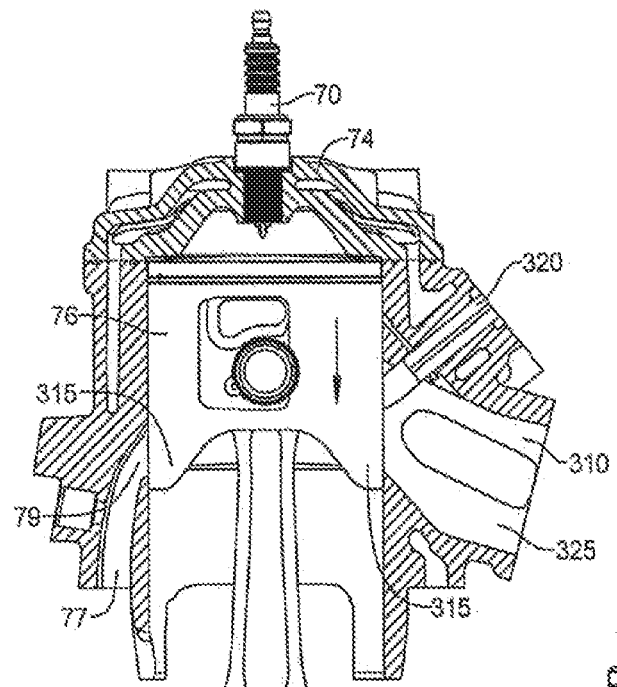
FIGS. 8-13 represent cross sectional views of the engine shown in figure at various times of the engine rotation.
Figure 9:
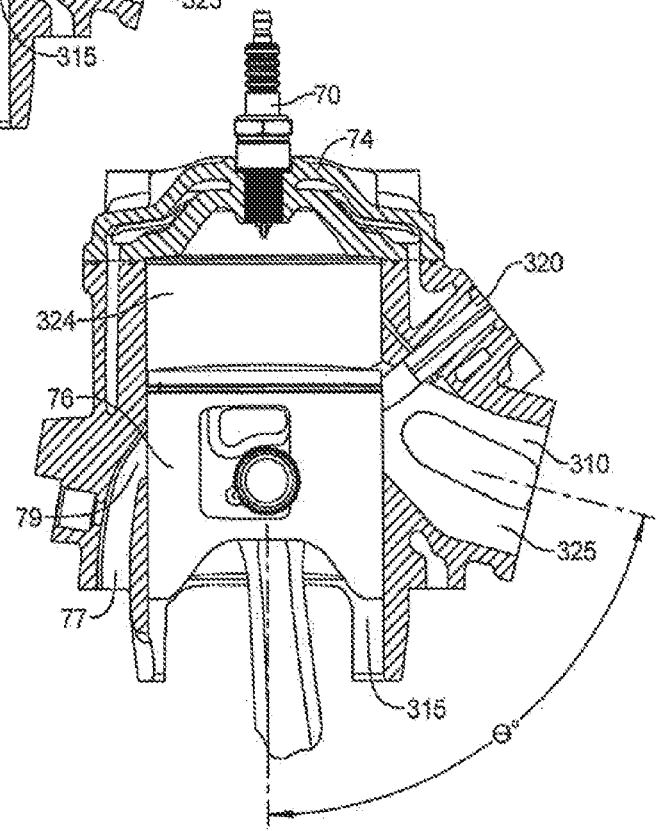
Figure 10:
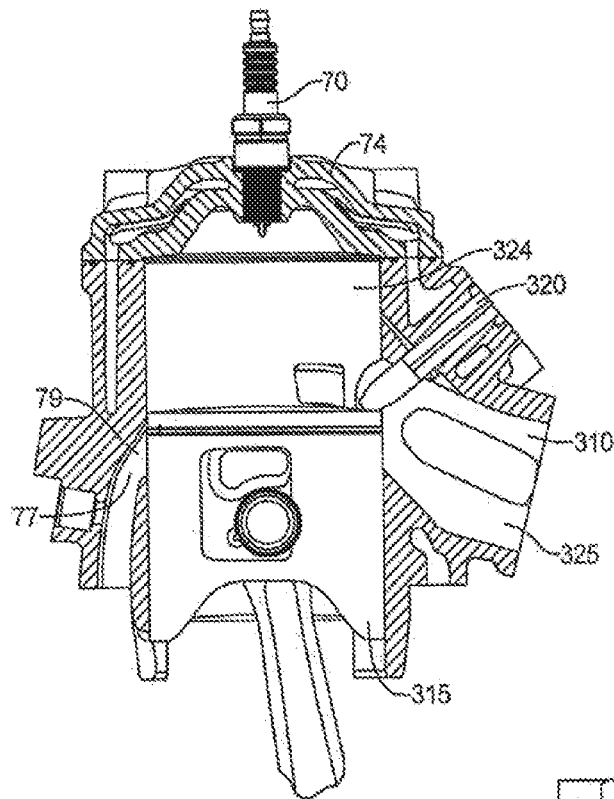
Figure 11:
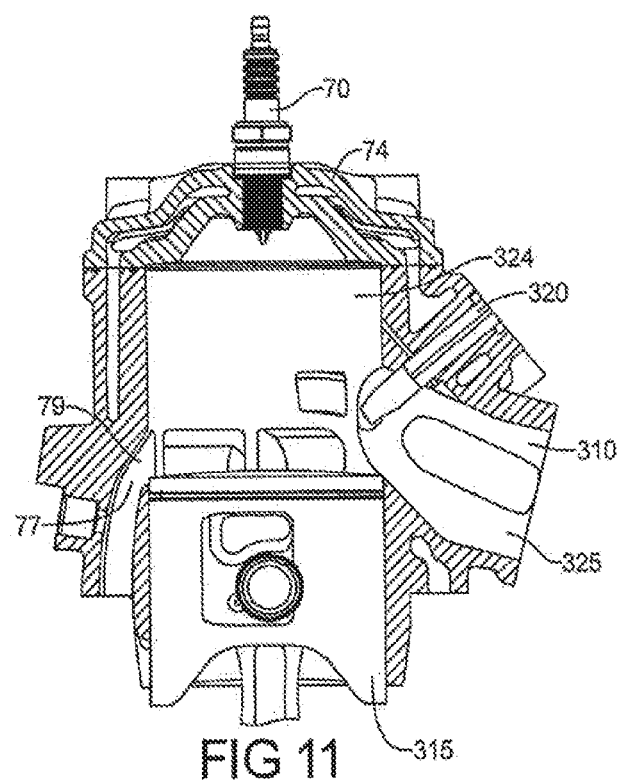

FIG. 8-13 represent the movement of the piston 76 from its top dead center position in FIG. 8 to a compression position in FIG. 10. As is normal in a two stroke engine, at top dead center, compressed fuel air mixture is initiated with a spark, thus driving the piston 76 down. In FIGS. 6 and 7, the piston reaches a point when the piston 67 engages and then passes the exhaust port 310 allowing compressed exhaust gasses to flow through the port 310. In FIG. 7, the piston 76 reaches a fuel/air intake 77 which supplies the fuel/air mixture to the engine for the next engine stroke. The continued movement of the piston down in FIG. 8 draws air and fuel from the fuel/air intake 77 as well as previously expelled exhaust gas and unburned fuel from the exhaust port 310.

In FIGS. 6 and 7, the piston begins to move up toward top dead center placing the piston skirt 315 adjacent to the exhaust port 310. Because the exhaust port 310 has a resonant frequency, a compressed wave of exhaust gas and unburned fuel travels in a direction toward the combustion chamber. At certain engine speeds, this compressed wave of exhaust gas hits the piston skirt 315 before the wave enters the combustion chamber. In this regard, below an engine RPM of about 6500 more than 30% of this compressed wave of exhaust gas hits the skirt 315 before entering the combustion chamber. Above this engine speed, more than 50% and preferably more than 70% of compressed wave of exhaust gas passes into the combustion chamber 324 without impinging on the piston skirt 315.

The exhaust port 310 defines an elongated passage at an angle obtuse between 45 and 60 degrees to a centerline of the piston travel that directs flow of exhaust gasses away from the cylinder head 74. The transfer port 79 fluidly coupled to the fuel/air cylinder intake 77, said transfer port 79 having a fuel injector configured to provide fuel into the transfer port 79. The exhaust port 310 has an exhaust valve 320 which is actuatable to change an exhaust port aperture size.

Figure 12:
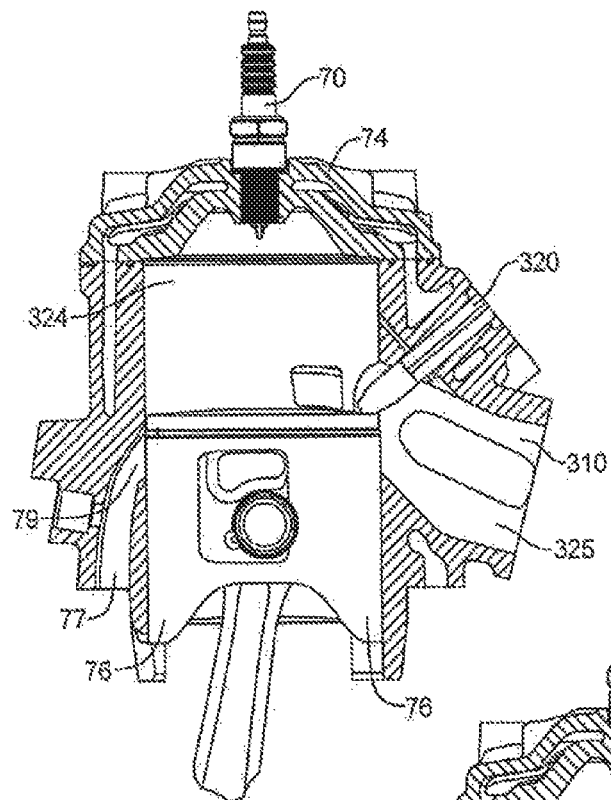
Figure 13:
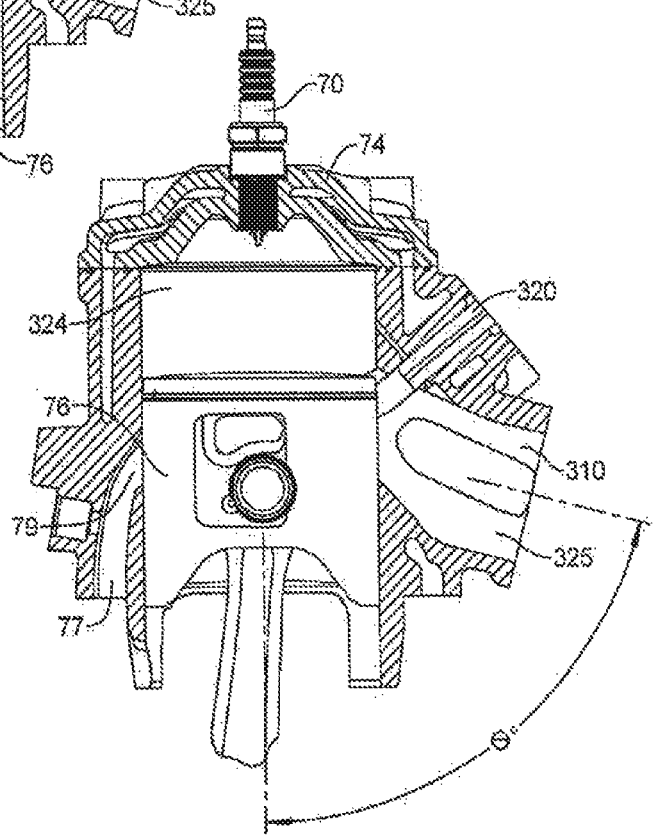
Figure 14:
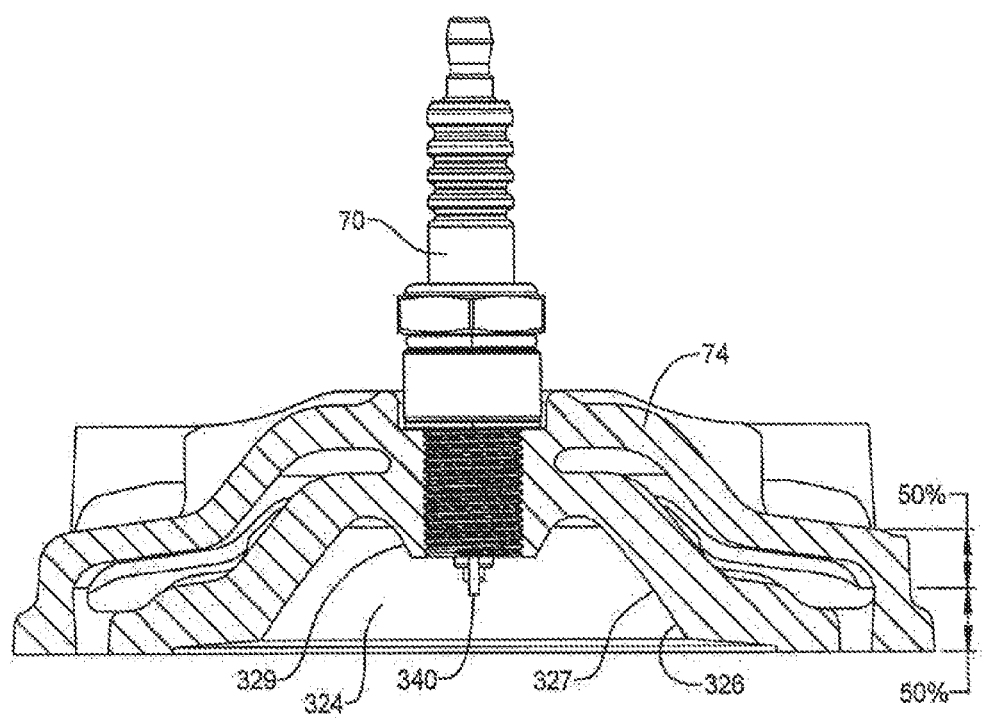
FIG. 14 represents a cross section of the head shown in FIGS. 8-13.
Figure 15:
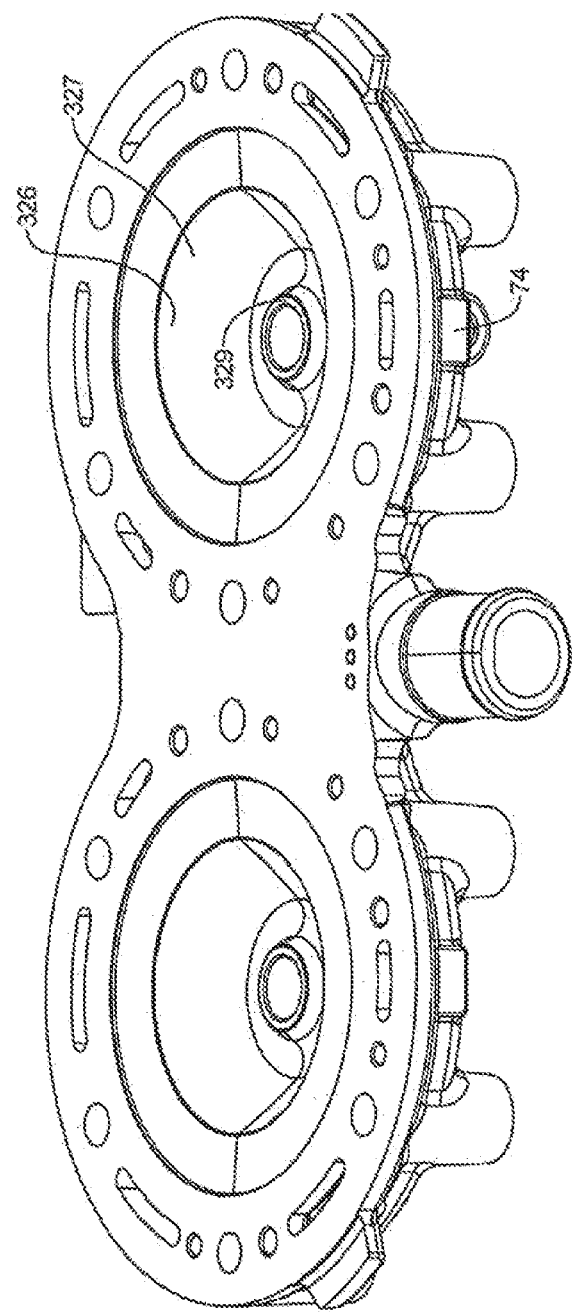
FIG. 15 represents a perspective view of the head shown in FIGS. 8-14.

FIG. 14 represents a cross section of the head 74 shown in FIGS. 5-10. FIG. 12 represents a perspective view of the head shown in FIGS. 8-14. The engine head 74 has a concave interior surface 326 representing a portion of a cutaway of a horn torus. This surface 326 defines a portion of the combustion chamber 324. The engine Assembly 40 has a sparkplug 70 centrally located in the horn torus which positions a spark initiating member 340 at a position between 35 and 40% of the from the piston 76 to the crown of the head surface.

The concave interior surface 326 (horn torus surface) has squish band surface area 330 which represents less than about 50% of the cylinder bore and preferably 48% of bore area. A major radius of curvature which leads to a second portion 327 having a radius of curvature that together define a portion of the combustion chamber 324. Defined on the concave interior surface 326 is a projected member 329 that is annularly disposed about the spark plug 70. The spark plug 70 is positioned 7.5 mm above piston dome, which can be about 35-45% and preferably 45% of combustion dome height, which represents about 10% of engine stroke.

The surface area of the concave portion represents about 705 of the bore area and 146% of the bore surface area. In this regard, the volume of the concave interior surface 326. The concave region represents about 9.1% of cylinder displacement and the system has a Compression ratio 6.45:1. The smooth contours of the surface 326 allow for improved air fuel mixture within the piston draw down. In this regard, the smooth corners reduce null zones within the fuel/air mixture flow, thus improving combustion chamber efficiency.

C. Vehicle Cooling Assembly and Method

Figure 16:
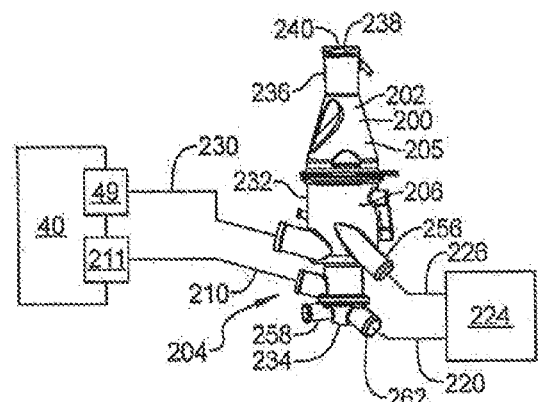
FIG. 16 is a block diagrammatic view of a cooling system for a vehicle.

FIG. 16 is a block diagrammatic view of a cooling system for a vehicle. As described further below, the engine assembly 40 is water cooled, having a water pump 49 configured to push coolant fluid into the engine block 80 and through the engine assembly 40. The heated coolant fluid leaves a source of heated engine cooling fluid 211 in the engine assembly 40, which in this case originates from the cylinder head 74 of the engine assembly 40, and travels to a coolant reservoir 200. The coolant reservoir 200 has a bottle 202 configured to be placed within the vehicle cooling system. The bottle 202 defines first and second chambers 204 and 206 which are fluidly coupled together through an aperture 207. Defined about the aperture 207 is a valve seat 208. The first chamber 204 is fluidly coupled to the source of heated engine cooling fluid 211, while the second chamber 206 is fluidly coupled to the engine water pump 49 which returns the coolant fluid back to the engine assembly 40.

Upon exposure to heated fluid from the source of heated engine cooling fluid 211, a thermally responsive actuator 212 closes the aperture 207 between the first and second chambers 204 and 206, inducing the heated fluid from the engine assembly 40 to pass from the first chamber 204, through a first chamber exit port 222 to a heat exchange chamber 262. The heat exchanger 262 is configured to be cooled by moving snow that removes heat from the cooling fluid. This heat reduced cooling fluid is then returned to the second chamber 206 through an inlet port 226 where bubbles are allowed to escape into the third chamber 205. The fluid is then transferred from the second chamber 206 through a second chamber exit port 228 to a hose 230 coupled to the water pump 49.

Figure 17:
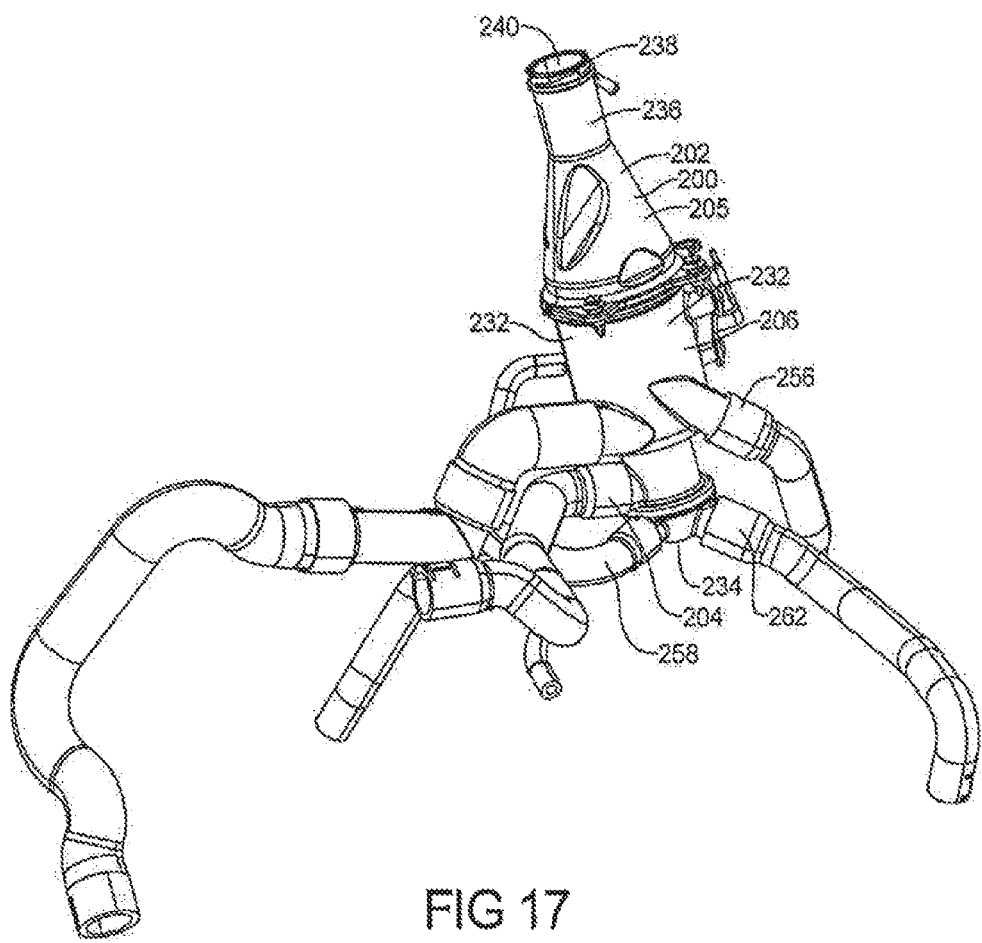
FIG. 17 is a view of a coolant reservoir bottle configured to be placed within a vehicle cooling system in FIG. 16.

FIG. 17 is an exterior view of the bottle 202 within the vehicle cooling system shown in FIG. 5 with an interior valve element (not shown). The bottle 202 is formed of first, second, and third exterior members (232, 234, 236) which define the first, second and third chambers 204, 206, 205. The first and second members 232 and 234 define the first chamber 204, and the first member 232 further forms a portion of a second chamber 206. The third chamber 205 which is fluidly coupled to the second chamber 234 is formed of the third funnel shaped exterior member 236, which has a closable filling port 242 that allows the filling of the cooling system with coolant as needed. The first chamber 204 is fluidly coupled to the source of heated engine cooling fluid 211, and the second chamber is fluidly coupled to the engine water pump 49 as described above.

Figure 18A:
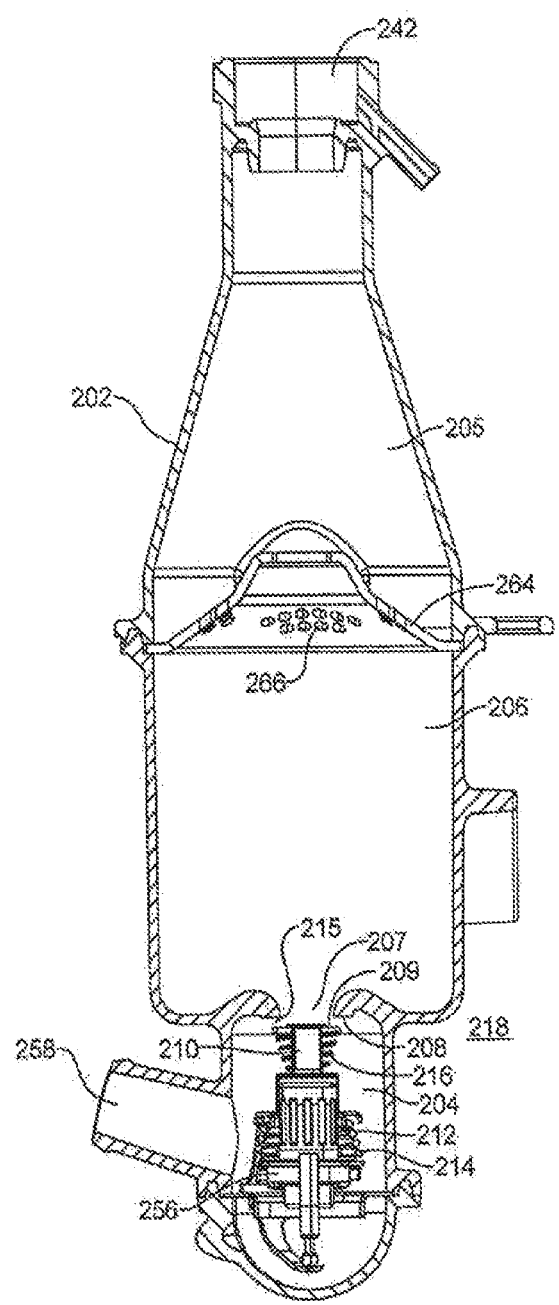
FIGS. 18A and 18B are cross sectional views of a coolant reservoir configured to be placed within the vehicle cooling system shown in FIG. 16 with a valve elements in opened and closed positions respectfully.
Figure 18B:
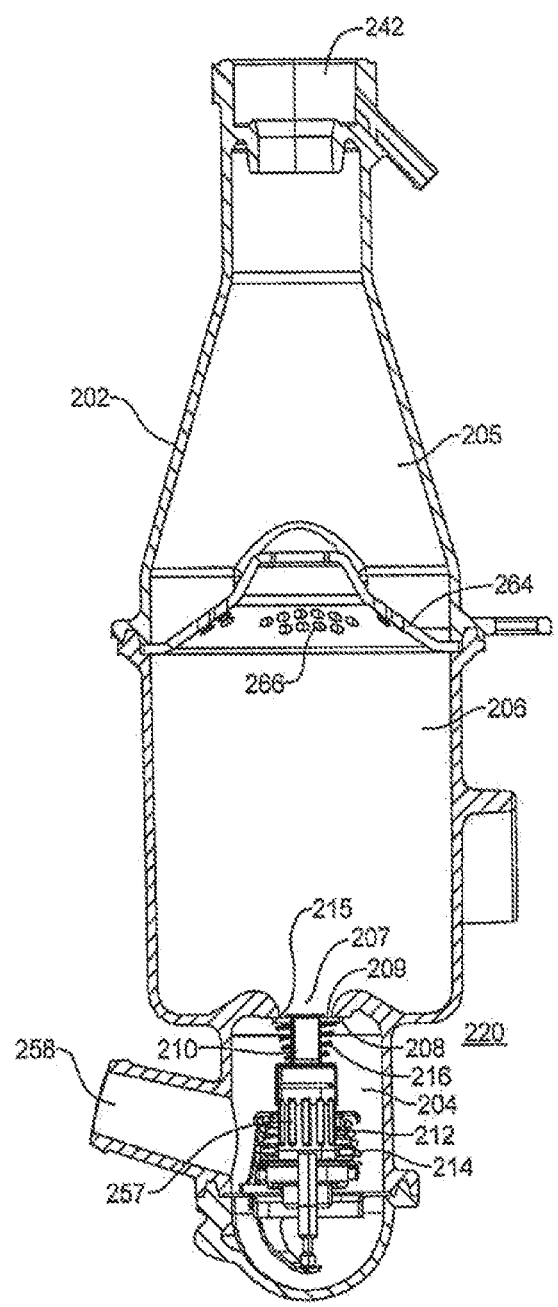

As shown in FIGS. 18A and 18B, the bottle 202 has a thermally responsive actuator 212 disposed within the first chamber 204, and configured to move a thermally actuated sliding valve element 210 having the valve seat engaging surface or seal 208. The thermally actuated sliding member 210 is movable from a first open position where the valve seal 209 engages the valve seat 208 that is displaced from the valve seat 208 to a second position when the coolant is below a first temperature.

As shown in FIG. 18A, when functioning, such as during vehicle startup, the thermally responsive actuator 212 is in an open position within the first chamber 204. Fluid from the heated engine fluid supply 211 flows in to the first chamber 204, past the thermally responsive actuator 212, and valve seat 208 through the aperture 207 and into the second chamber 206. The fluid then is returned directly to the water pump 49. The sliding valve element 210 has a second exterior bearing flange 252 which is configured to engage the first member 232 to fixably couple the element to the bottle 202. At temperatures below a first predetermined temperature cooling fluid is allowed to circulate directly into the engine at startup.

FIG. 18B is a cross sectional view of the bottle 202 with the thermally responsive actuator 212 in a closed position. When subjected to heated engine fluid, the thermally responsive actuator 212 thermal element 256 expands and thus translates the sliding valve element 210 and associated seal member 209 into engagement with the valve seat 208. This closes the aperture 207 between the first and second chambers 204 and 206 which directs the heated fluid through the heat exchange chamber 262.

The bottle 202 first member 232 defines the first chamber first aperture 258 fluidly coupled to a source of heated engine cooling fluid 211 (in this case the cylinder head 74). The second member 234 defines a first chamber second aperture 260 fluidly coupled to a cooling chamber 262. The coolant reservoir first member 232 defines the second chamber second aperture 256 fluidly coupled to the cooling chamber 262 configured to receive cooled fluid from the cooling chamber 262.

Disposed between the second and third chambers 206 and 205 is a conical swirl plate member 264. The conical swirl plate member 264 defines a plurality of coupling apertures 266 fluidly coupling the second and third chambers 206 and 205. These apertures 266 are configured to allow trapped gasses within the cooling system to escape from the second chamber 206 into the third chamber 205 as well as to allow coolant poured into the third chamber 205 through the closable filling port 242 to flow down into the second and third chambers 204 and 206 where it is incorporated into the cooling system.

Figure 19A:
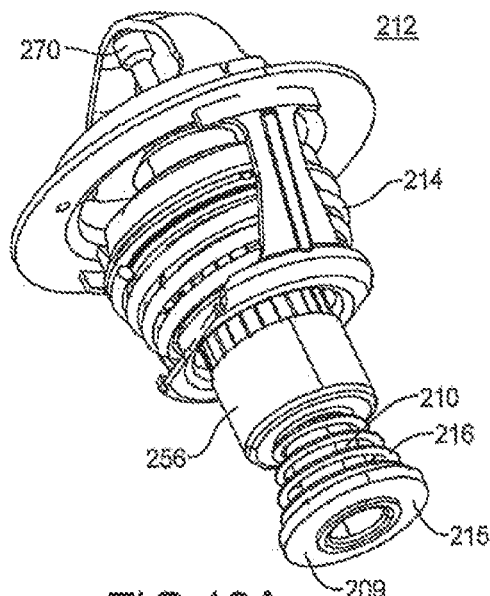
FIGS. 19A and 19B are perspective views of a thermally activated valve according to the present teachings.
Figure 19B:
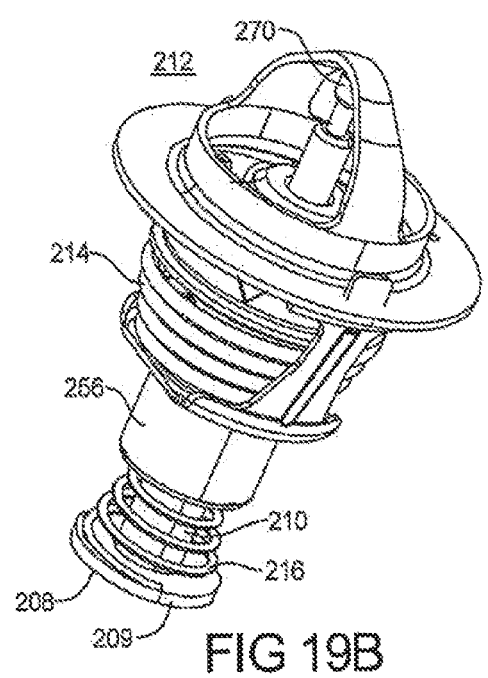

FIGS. 19A and 19B is a perspective view of the thermally responsive actuator 212 according to the present teachings. The thermally responsive actuator 212 is configured to retract the piston 270 and thereby position the valve seal member 209 away from the valve seat 208 when the thermally responsive actuator 212 is exposed to fluid temperatures below a predetermined value, in an open position (see FIG. 7A above). The first and second springs 214 and 216 function to pull the thermally responsive actuator 212 way from the valve seat 208, when the piston 270 is retracted. Similarly, the thermally responsive actuator 212 is configured to expel the piston 270 and thereby position the valve seal member 209 on the valve seat 208 when the thermally responsive actuator 212 is exposed to fluid temperatures above a predetermined value, in a closed position (see FIG. 7B above). The sliding valve element 210 bearing surface slidably supports the valve seal member 209 and regulates the movement of the valve seal member 209 toward and away from the valve seat 208.

Figure 21B:
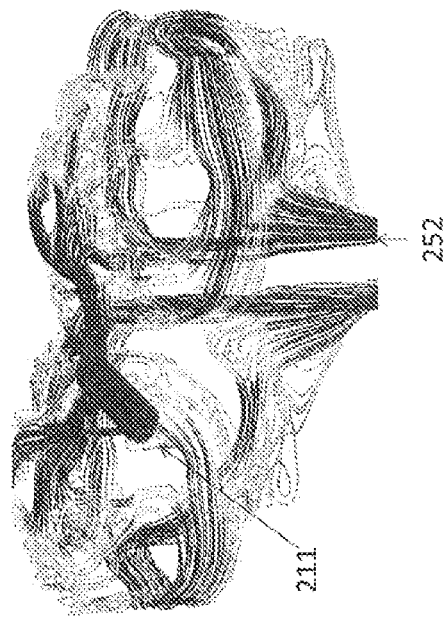
FIGS. 21A and 21B represent front and rear views of the flow of cooling fluid through an engine according to the present teachings.
Figure 21A:
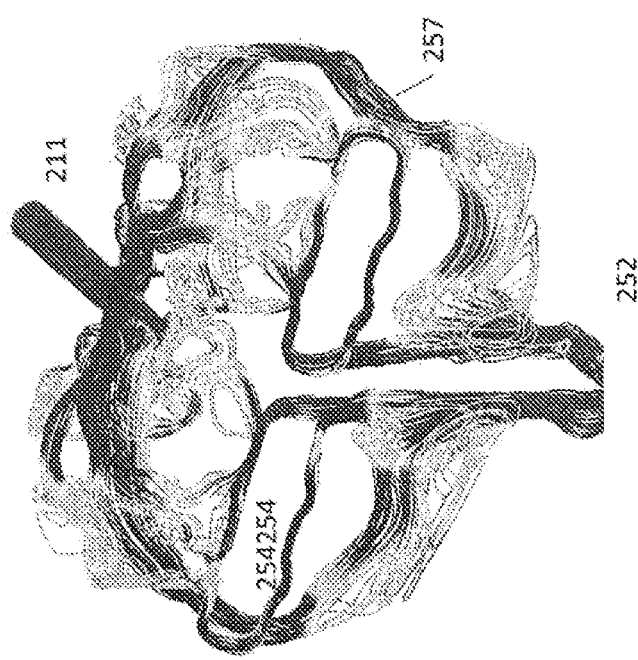
Figure 21C:
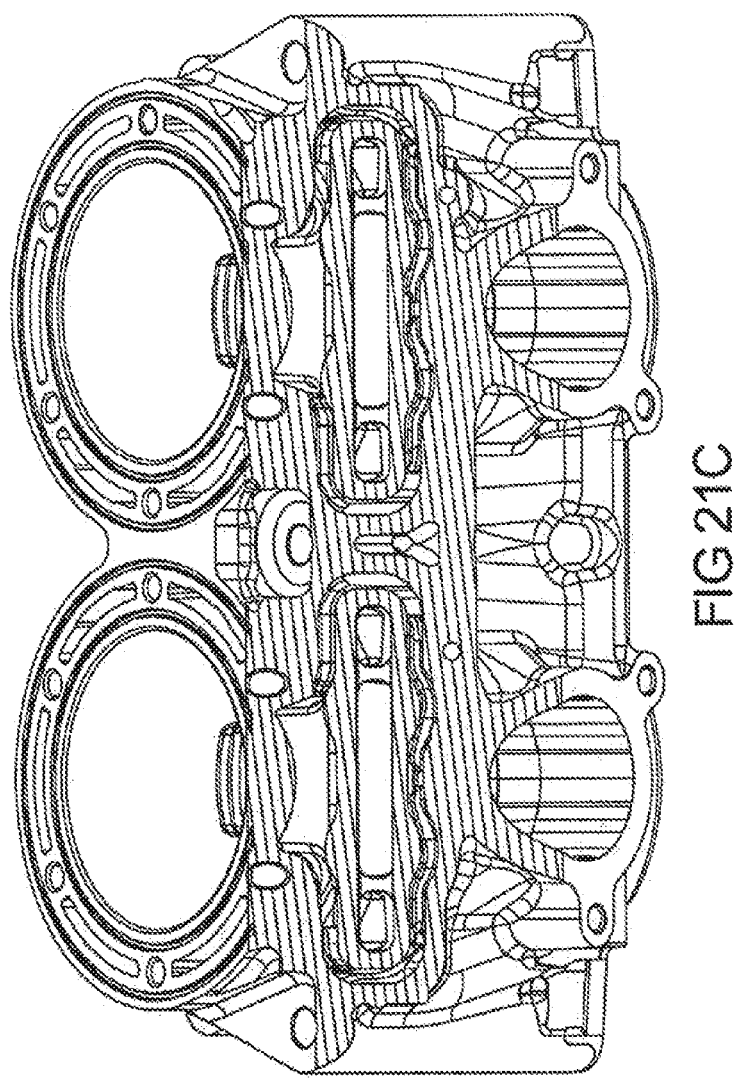
FIG. 21C is a sectional view of the cooling lines around the exhaust valves.
Figure 22:
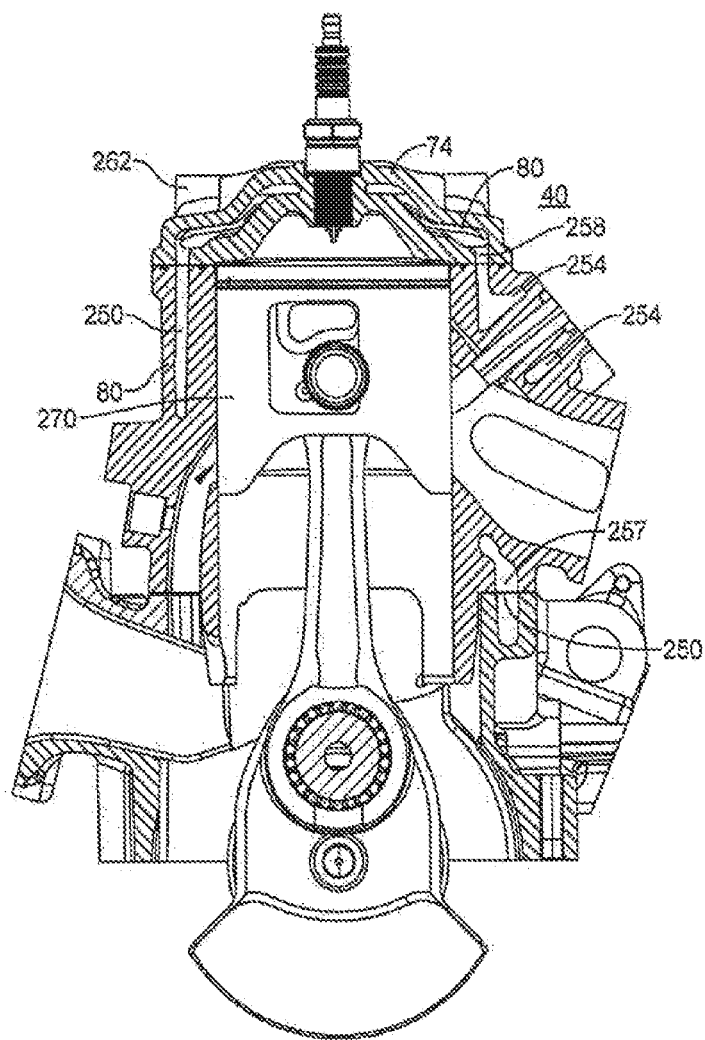
FIG. 22 is a side cross sectional view of the engine show in FIG. 20.

FIG. 20 is a perspective view of an engine 40 having improved cooling fluid flow according to the present teachings. FIGS. 21A, 21B and 21C represent front, rear and cross-sectional views of the flow of cooling fluid through the engine shown in FIG. 20. FIG. 22 is a cross sectional view of engine showing the cooling apertures within the engine show in FIG. 20. With reference to these figures, the engine assembly 40 having the engine block 80 and cylinder head 74 define interior cooling chambers 250 which accept flowing cooling fluid. The velocity of the fluid at the entrance into the engine is greater than 2.1 m/s and preferably between 2.1 and 3.0 m/s. Fluid velocities for a second series of passages 254 annularly disposed about the exhaust port 256 are most preferably greater than 2.4 m/s and preferable remain between 2.1 and 3 m/s. Temperatures for the cooled regions can be between 275 degrees F. and 350 degrees F.

As shown, cooling fluid from the bottle 202 passes through the water pump 49 and into a first portion of the engine block at 252. As this high velocity cooled fluid enters the engine block 80, a first portion of the flow passes directly into the second series of passages 254 annularly disposed about the exhaust port 256 which is coupled to the exhaust assembly 44. After cooling the engine components adjacent to the exhaust portion 256 this portion of the fluid flows into the cylinder head 74. A second portion 258 of the flow passes directly into a third series of passages 260 annularly disposed about the cylinders and pistons 76. After cooling the engine components adjacent to the cylinders this portion of the fluid flows into the cylinder head 74 and combines with the first portion of the fluid flow. This heated combined fluid flow exits the cylinder head 74, and becomes the source of heated engine cooling fluid 211.

D. Stator Cooling Assembly and Method

As discussed above in relation to FIG. 4, the engine assembly 40 includes various components, some of which move due to operation of the engine assembly 40. The crank shaft 102 is connected to the fly wheel 118. The fly wheel 118 includes various components, as discussed above, including the sensor interactors or teeth 124. As also discussed above, the engine assembly 40 may include components that interact with the fly wheel 118 including the sensors 122 that may sense or interact with the teeth 124. In addition, the fly wheel 118 includes a center or central connection region 1202. The connection region 1202 may connect with or be connected to a terminal end 1204 of the drive shaft 102. In various embodiments, a bolt or nut 1206 is connected to the terminal end 1204 of the crank shaft 102.

Given the connection of the fly wheel 118 to the crank shaft 102, upon rotation of the crank shaft 102, the fly wheel 118 also rotates. The fly wheel 118 rotates relative to the stator 120. The stator 120 is fixed relative to the crank case 100. In particular, the crank case 100 includes an end housing 1208 that is coupled with the external cover 126, the cover 126 may also be referred to as a stator or recoil cover. Covered by the cover 126 may be a generally known pull cord recoil system for starting the engine assembly 40. The stator 120 is fixed relative to the crank case 100 in the housing 1208 and is fixed relative to the fly wheel 118. Therefore, as the fly wheel 118 rotates relative to the stator 120, an alternating current, of various phases and/or selected phases, is generated. The generated current may be carried away from the stator 120 according to various embodiments, such as via a wiring or wiring harness assembly (not illustrated). The fly wheel 118 may also have connected therewith a magnet ring 1212 that, therefore, also rotates relative to the stator 120.

The operation of the engine assembly 40 may drive the crank shaft 102. Operation or movement of the fly wheel 118 relative to the stator 120 may generate a current as noted above. Further, the generation of the current from the stator 120 may also generate thermal energy. The thermal energy may be due to resistance of one or more wires, such as those in a winding 1216. The winding 1216 may include a plurality of windings 1216 formed on a core 1218 of the stator 120. The core 1218 may include one or more projections or fingers 1220 on which the windings 1216 are placed.

The core 1218 may be formed of selected materials, such as non-magnetic materials. Further, the core 1218 may be formed of two or more components including an internal metallic (e.g. metal or metal alloy) component and an external non-conductive sheath on which the windings 1216 are formed or placed. In various embodiments, due to a current through wire that forms the windings 1216 thermal energy may be generated. It is understood, however, that the windings 1216 may be formed of a metallic or non-metallic wire or other appropriate material. In various embodiments, the windings 1216 are formed of a copper wire.

Thermal energy within or at the stator 120 may be dissipated according to various embodiments, such as a flow of air, or airflow, over or through the windings 1216. The airflow may be caused or provided due to the one or more openings or throughbores 106 formed in the crank case 100. The crank case 100 may include the openings 106 that allow the housing 1208 to be exposed to or receive external airflow, such as external from the engine assembly 40 and/or the snowmobile 10.

The airflow may travel along an airflow path 1226 that is initiated or started external to the crank case 100 and passes through the openings 106. The air that initiates or starts from external to the crank case 100 may be substantially cooler than air that is within the engine assembly 40. Further the openings 106 may be formed in the crank case 100 at a position that is at or near a cool region of the engine assembly 40. A cool region of the engine assembly may be a region that is substantially positioned away from heat sources or other hot air or thermal sources, such as an exhaust manifold, evaporation fins or passages, or the like. Further, the cool region may be near or at a riding surface (e.g. ground) and/or near the skis 20. In various operating conditions, such as with snow cover on a riding surface, the riding surface may be substantially cooler than other areas. Thus, the region of the engine assembly 40 that is the coolest may be near the riding surface and away from heat sources, such as cylinders or exhaust manifold.

In various embodiments, as illustrated in FIG. 4 and the other figures above, the openings 106, also referred to as air vents or vent openings, may be positioned substantially at a side of the snowmobile 10 and near a bottom of the engine assembly 40, and generally in a cool region of the engine assembly 40, as noted above. In various embodiments, the openings 106 in the crank case 100 may be positioned substantially near a surface or area over which the snowmobile 10 is passing. Therefore, the air drawn through the vent openings 106 may be cooler than substantially any other air source or air volume adjacent or near the engine assembly 40.

Figure 23:
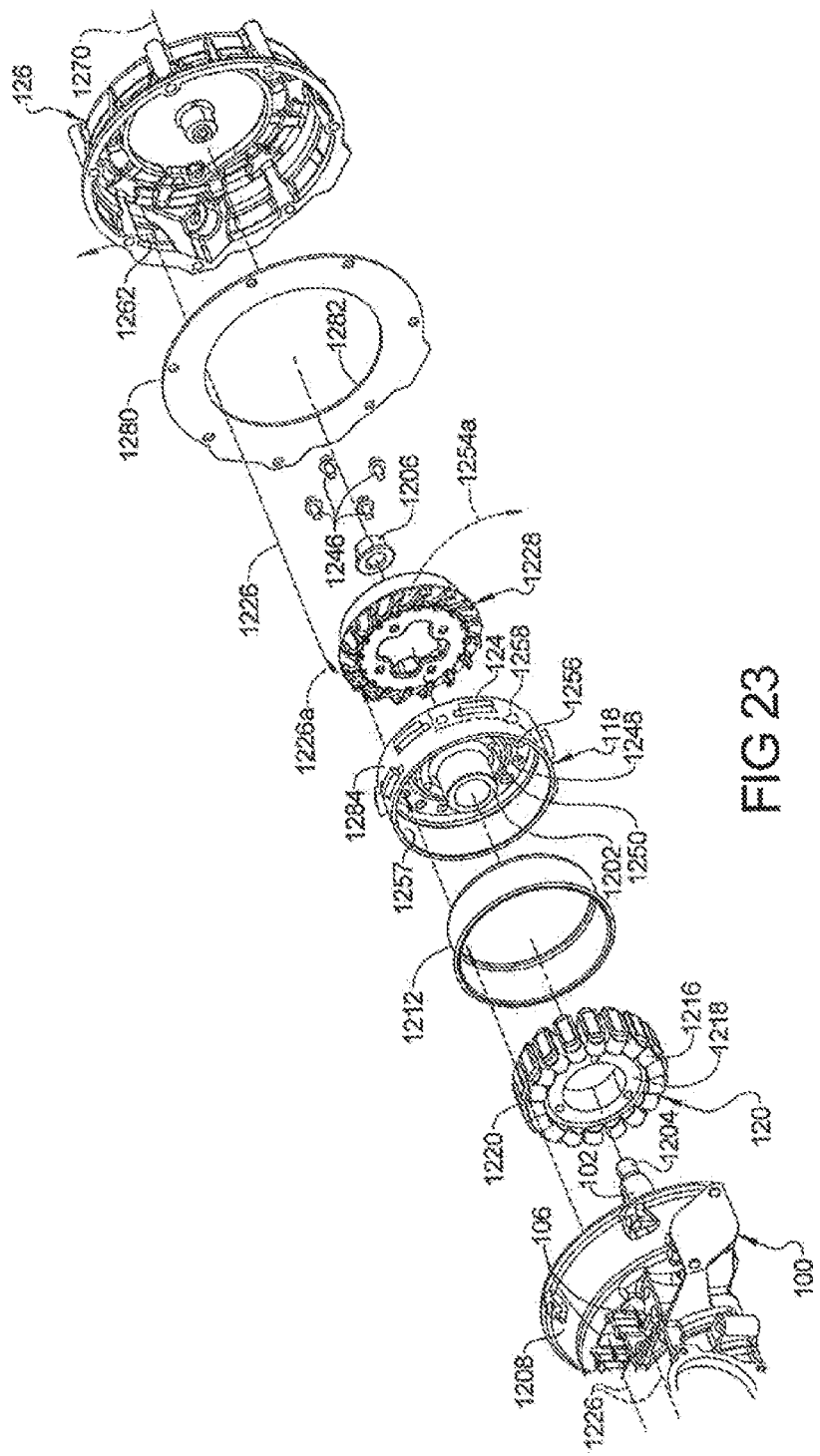
FIG. 23 is a detail exploded view of a generator portion of the engine assembly.

The airflow through the air vents or openings 106 may be caused by a fan portion or assembly 1228. With continuing reference to FIG. 23 and additional reference to FIG. 6, the fan assembly 1228 includes various features such as one or more cooling fins or veins 1230. The fins 1230 extend from a surface or body 1232. The fins 1230 may include an upper surface or contacting surface 1234. The contacting surface 1234 may be near and/or contact a face or surface 1248 of the fly wheel 118. The fan assembly 1228 may further include a contact or mounting surface 1236 from which the fins 1230 radially extend towards an outer edge or perimeter 1238 of the fan assembly 1228.

The mounting surface 1236 may be substantially solid or include a central opening or aperture 1240. The central aperture 1240 may be defined or formed by an interior wall 1242. In addition, one or more through bores 1244 may be formed through the mounting surface 1236. One or more mounting fasteners 1246, such as bolts or rivets, may pass through the apertures 1244 and engage the fly wheel 118. The fly wheel 118 may include the mounting surface or face 1248. The mounting surface 1248 may include a fastening passage 1250 that may receive or threadably engage the fasteners 1246. For example, the passages 1250 in the mounting face 1248 may be tapped or include threads to receive or engage the bolt 1246. It is understood that other appropriate fastening members, however, may be provided or used to fix the fan assembly 1228 to the fly wheel 1248.

Because the fan assembly 1228 is fixed to the fly wheel 118, such as via the mounting face 1248, the fan assembly 1228 rotates substantially in common or due to rotation of the fly wheel 118. Accordingly, when the fly wheel 118 rotates, the fan assembly 1228 also rotates. Rotation of the flywheel 118 is caused by the drive shaft 102 connected to the fly wheel 118. The engine assembly 40, including the drive shaft 102, therefore, causes rotation, and generally simultaneous rotation, of the flywheel 118 and the fan assembly 1228.

Formed between or defined between two adjacent fins 1230 may be an airflow or pocket area 1254 that may cause airflow generally in the direction of the air-path 1226, as illustrated in FIG. 23, and specifically in the direction of arrow 1226a. The air-path 1226 initiates through the vent openings 106, and passes through the stator 120, such as between the winding 1216. The air-path 1226 further continues through the magnetic ring 1212 that is positioned within the fly wheel 118. The air-path 1226 further extends through one or more flywheel vents passages or throughbores 1256.

The flywheel vent passages 1256 are formed in the mounting face 1248 and may not be the only passages through the fly wheel 118. For example, the flywheel 118 may include a second wall or annular member 1257 that extends substantially perpendicular to the face 1248. The second wall 1257, when assembled in the engine assembly 40, may encompass or surround the stator 120. Further, the second wall 1257 generally extends away from and one a side opposite the fan assembly 1228. Alternatively or in addition to the vent passages 1256, auxiliary or outer surface passages 1258 may be formed through the second wall 1257. The rotation of the fan assembly 1228 may cause a low pressure on or near an outer face of the mounting face 1248, generally in the downstream direction indicated by the air-path 1226.

The rotation of the fan assembly 1228 may cause the airflow or a flow of air generally in the direction of air-path 1226 through the vent openings 1256 and through the pockets 1254 due to the fins 1230 and associated structure and geometry, such as opening of the pocket 1254 at the outer edge 1238 of the fan assembly 1228. The air-path 1226, therefore, continues toward an outer edge or outer circumference 1238 of the fan assembly 1228. In other words, as illustrated in FIG. 23, the air-path 1226 may include a radial flow in the direction of arrow 1226a away from a central axis 1270 of the fan assembly 1228. The fan assembly 1228 by rotating and having the pockets 1254 direct air flow away form an axis of rotation of the fan assembly 1228. The pockets 1254, therefore, may include an airflow exit or exit passage for the air that is being moved by the fan assembly 1228. The flow may, therefore, not be straight and may move radially away from the center of the fan assembly and generally in a direction formed or defines by the pocket 1254. This direction may also direct the air toward an outer edge of the cover 126, as discussed herein.

The air-path 1226 may then pass through a vent opening 1262 in the cover 126. Accordingly, the air-path 1226 is formed through the housing 1208 of the crank case 100 by the air vents 106. The air-path 1226 passes through the stator 120, the mounting face 1248 of the fly wheel 118, past the fins 1230 of the fan assembly 1228, and out through the vent passages 1262 of the cover 126. The air flow along the air-path 1226 may be caused due to the fan assembly 1228, such as with the fins 1230, as discussed further herein.

Figure 24:
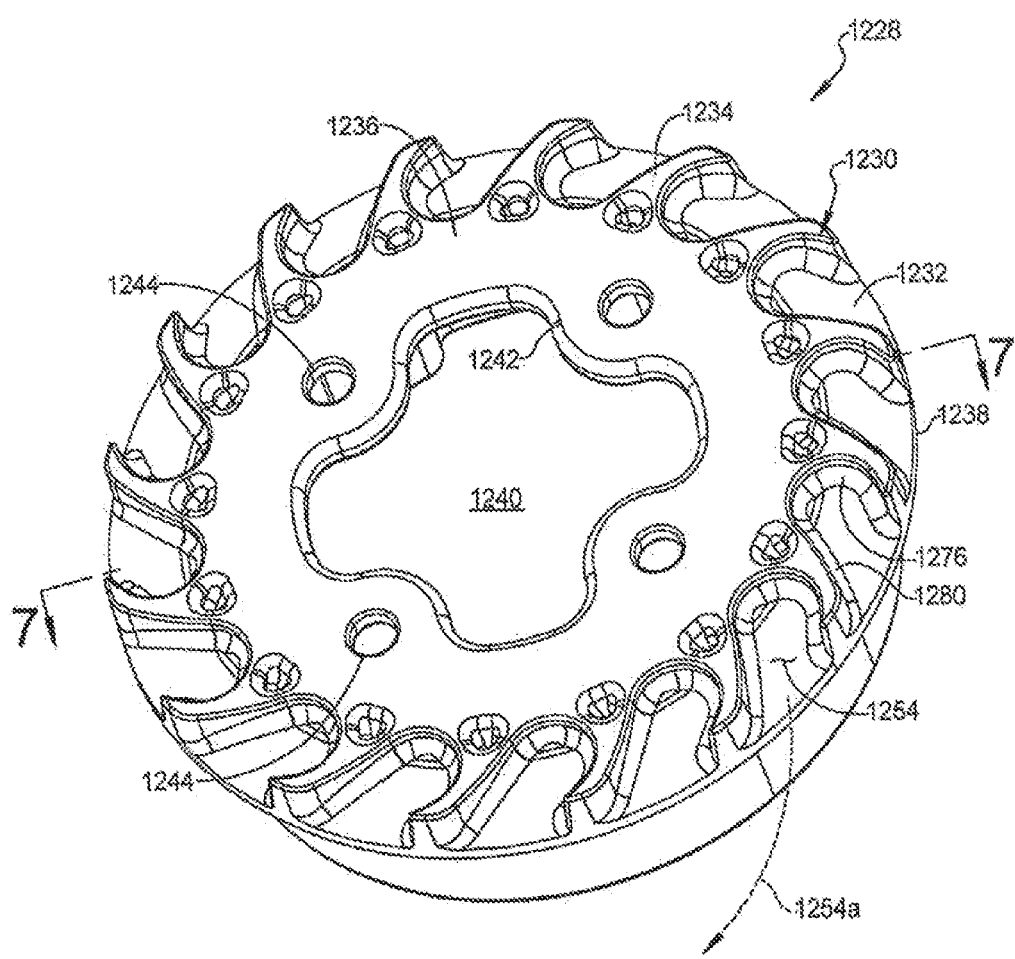
FIG. 24 is a perspective view of a fan assembly.
Figure 25:
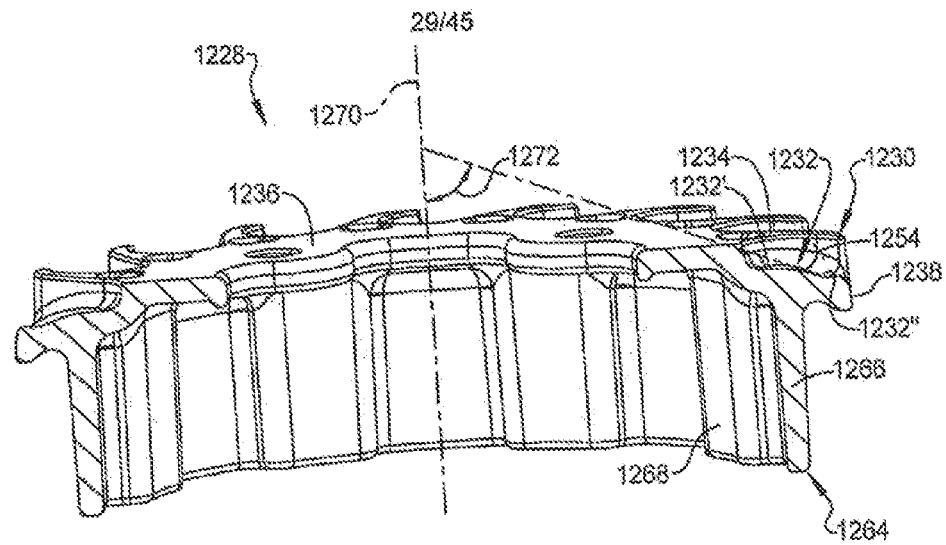
FIG. 25 is a cross-section view of the fan assembly along lines 7-7.
Figure 26:
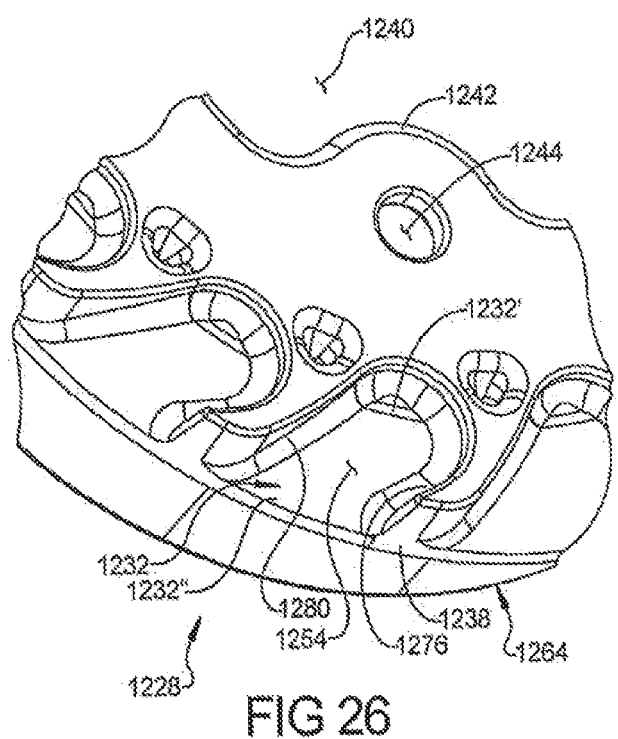
FIG. 26 is a detail view of a portion of the fan assembly of FIG. 24.

With continuing reference to FIG. 24 and additional reference to FIGS. 25 and 26, the fan assembly 1228 is discussed. The fan assembly 1228 may include an integrally formed recoil cup or holder 1264. The recoil cup 1264 may include an outer circumferential wall 1266 that includes a selected geometry, such as an array of internal projections 1268. The outer wall 1266 may engage a recoil assembly, such as pull cord recoil assembly, that may be used to initiate starting of the engine assembly 40. It is understood, however, that the recoil assembly need not be incorporated into the fan assembly 1228. For example, the fan assembly 1228 may include the fins 1230 and selected features, such as the surface member 1232, mounted to the recoil cup 1264 to form an integrated fan assembly 1228. In various embodiments, however, the fan assembly 1228, including the fins 1230 and related structures, and the recoil cup 1264 form as separate and distinct members. In various embodiments, the fan assembly 1228 may be formed as a single piece a casting including the fan portions and the recoil cup 1264. The single casting may be formed of a magnesium or magnesium alloy. The integrated or one piece casting may allow for a lightweight and substantially rigid structure to connect to the fly wheel 118. Nevertheless, one skilled in the art will understand that the various portions of the fan assembly 1228 may be formed separately and connected together such as with brazing or welding during a manufacturing process.

The fan assembly 1228 including the fins 1230 may form a vacuum on a selected side of the fly wheel 118, thereby causing air flow along the air-path 1226, due to a construction of the fan assembly portion. As discussed above, the fins 1230 extend from a surface 1232. The surface 1232 may be formed in the pocket 1254, as illustrated in FIG. 24. In the pocket 1254, a first region 1232' of the surface 1232 may be closer to the mounting plate surface 1236 near a central or rotational axis 1270 of the fan assembly 1228 than an outer surface or region 1232". The surface 1232, therefore, may be sloped or formed at an angle 1272 relative to the axis 1270. The angle 1272 of the surface 1232 may assist in forming, directing, or otherwise causing an airflow through the vent opening 106 and the crank case 100 and the passages 1256 of the fly wheel 118.

In addition to the angle 1272 of the surface 1232, the fins 1230 may include a curved or arcuate surface 1276. The curved surface 1276 of the fins 1230 may be substantially c-shaped having an inner curved portion or inner surface 1276 and a back or second surface 1280 of an adjacent fin 1230.

The pocket 1254 may be formed between the two surfaces 1276, 1280 and the surface 1232 between two adjacent fins 1230. The pocket 1254 and the respective fins 1230, including the surfaces 1276, 1280, and the base surface 1232 form the fan structure of the fan assembly 1228 to cause airflow along the path 1226.

Due to rotation of the fan assembly 1228, by being mounted to the fly wheel 118, the fan assembly 1228, given the structure as discussed above, may cause the airflow along the air-path 1226. Due to the airflow along the air-path 1226, the stator 120 may be cooled by removing the thermal energy generated by the stator 120, as discussed above. Thus, the stator 120 may be operated within a selected temperature range during operation of the engine assembly 40.

In various embodiments, a shroud or seal member 1280 may also, optionally, be mounted in the engine assembly 40. The shroud 1280 may be positioned to surround the fly wheel 118 and the mounted relative to the housing 1208 of the crank case 100. The shroud 1280 may be fixed between the cover 126 and the housing 1208. The shroud 1280 may have an internal opening 1282 that has a tight or close spaced tolerance relative to an outer surface 1284 of the fly wheel 118. The tolerance or spacing between the inner surface 1282 of the shroud 1280 and the outer surface 1284 of the fly wheel 118 may be in the appropriate dimension such as about 0.01 millimeters (mm) to about 5 mm and further including about 0.5 mm to about 3 mm, and further including about 0.2 mm to about 2 mm.

The shroud 1280 may block all or substantially all airflow other than along the air-path 1226. In other words, the shroud 1280 may stop or eliminate all or substantially all air flow around the shroud, other than through the stator 120. The shroud 1280 may be selectively installed to direct more or all of the air flow over or past the stator 120. Thus, as discussed herein, the shroud 1280 may be provided to increase efficiency of cooling of the stator 120 and other components of the engine assembly 40 by providing the selected airflow.

The shroud 1280 by being mounted to the housing 1208 and substantially covering the area between the housing 1208 and the surface 1284 of the fly wheel 118, may cause or direct substantially all of the air flow along the air-path 1226 through the vent 106, the stator 120, the air passages 1256 of the fly wheel 118, and through the air vents 1262 of the cover 126. The shroud 128, according to various embodiments, may increase a cooling efficiency and/or amount of cooling of the stator 120. The shroud 1280, when installed, may cause or assist in causing an increased cooling of about 2% to about 20%, further including about 5% to about 15%, and further including about 3% to about 5%. In various embodiments, a measured temperature change between including the shroud 1280 and not including the shroud 1280 may case a temperature change (i.e. decrease) of about 30 degrees Centigrade to about 5 degrees Centigrade, and further including about 5 degrees Centigrade to about 15 degrees Centigrade.

In various embodiments, a temperature differential was determined by placing a temperature sensor (e.g. a thermocouple) to measure a temperature at one or more of the windings 1216 of the stators 120. The engine assembly 40 was run at about 7000 rotations per minute until a measured temperature stabilized. Under selected test conditions, such as those exemplary discussed above, a temperature with the shroud 1280 and the fan assembly 1228 assembled, according to various embodiments, was measured to be about 208 degrees Centigrade as compared to 219 degrees centigrade with only the fan assembly 1228 installed (i.e. without the shroud 1280.

Accordingly the shroud 1280 may increase a cooling efficiency or effectiveness of the stator 120 with the fan assembly 1228, if selected. It is understood, however, the shroud 1280 is not required, but may be included in the engine assembly 40. According to various embodiments, the shroud 1280 may also be formed of appropriate materials including aluminum or aluminum alloys, magnesium or magnesium alloys, other metallic or metal alloys, and appropriate polymers. The shroud 1280, according to various embodiments, therefore, directs or assists in directing airflow of the air-path 1226.

Accordingly the fan assembly 1228 may operate with the engine assembly, such as being driven directly or indirectly by the driveshaft 120 to cause an airflow along the air-path 1226. The airflow along the air-path 1226 may appropriately cool or provide a selected operating temperature of the stator 120. The operating temperature of the stator 120 may, therefore, allow for efficient operation of the stator 120 and the associated electrical components of the snowmobile 10, including the engine assembly 40.

E. Vehicle Starter System and Method

Figure 27:
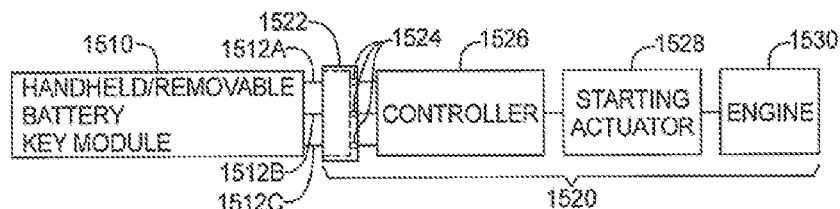
FIG. 27 is a block diagrammatic view of a handheld/removable battery key module in relation to the vehicle.

Referring now to FIG. 27, a handheld/removable battery key module 1510 is removably coupled to the vehicle 1520. The handheld/removable battery key module 1510 will be described in detail below. The handheld/removable battery key module 1510, in general, may be a lithium ion battery that includes the function of a key to enable the engine to start. The battery portion of the handheld/removable battery key module 1510 is used for starting the vehicle. The battery key module 1510 has electrical terminals 1512A-1512C, collectively, terminals 1512. The terminals 1512 may be used for providing power to a starting actuator for starting the vehicle. The terminals 1512 may also be used for charging the battery cells in a home or remote charger located away from the vehicle 1520.

Because the handheld/removable battery key module 1510 is handheld, portable or removable, the user of the vehicle 1520 may store the battery in a pocket or within a residence or other warm place so that the vehicle is easy to start using the handheld/removable battery key module 1510 that has an increased or higher temperature than that of the vehicle 1520. In this regard, ambient body heat will maintain or increase the power that can be delivered by the lithium ion battery cells.

The vehicle 1520 may include a receptacle 1522 for receiving the handheld/removable battery key module 1510. In fact, electrical terminals 1512 may couple to electrical terminals 1524 within the receptacle 1522. An engine controller 1526 receives the signals from the electrical terminals 1524 and ultimately are used to power a starting actuator 1528 which starts the engine 1530. The starting actuator 1528 may be a traditional starter motor that has a pinion gear engaging the crankshaft. The starting actuator 1528 may also power the stator with the battery key module 1510 to cause the stator to move back and forth and ultimately with fuel and spark cause the engine to start, as will be described further below. In general, once the engine controller 1526 verifies the identity of the handheld/removable battery key module 1510, power may be provided to the starting actuator 1528 to start the engine 1530. Details of the method for starting the engine 1530 are set forth in further detail below. Of course, various types and shapes of receptacles 1522 may be used for receiving the handheld/removable battery key module 1510. The receptacle 1522 and the terminals 1512A-1512C of the battery key module 1510 may be made to be weather resistant.

Figure 28:
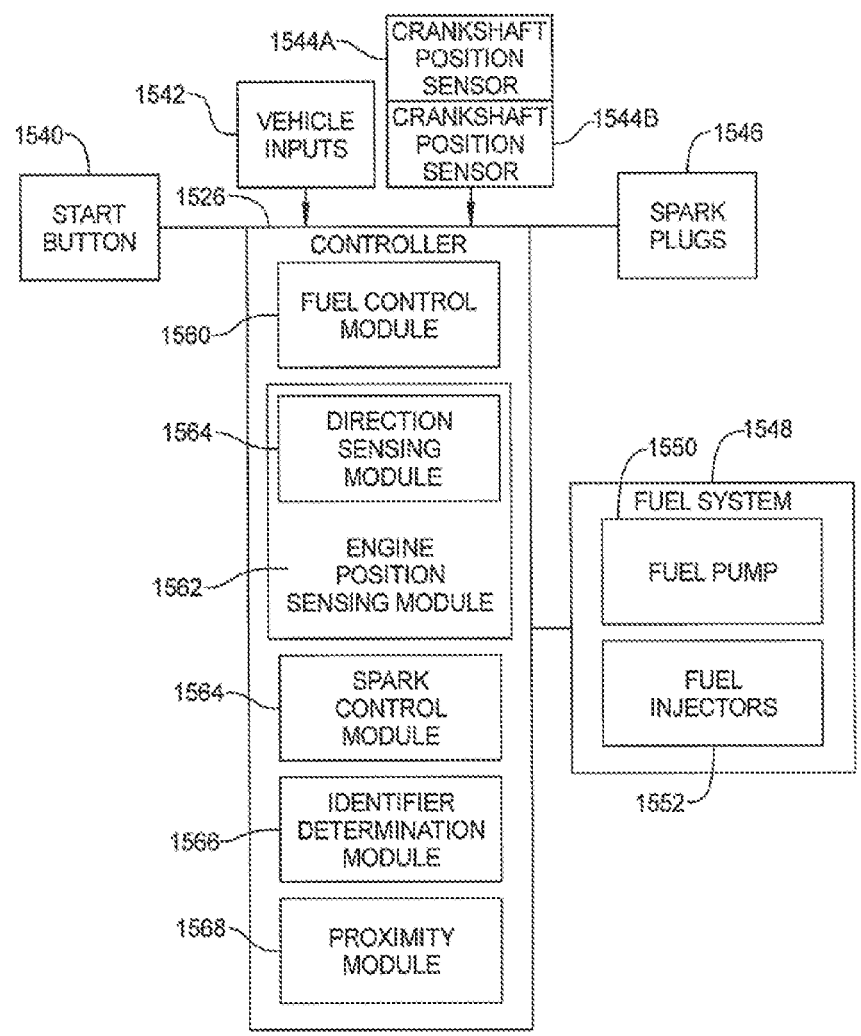
FIG. 28 is a block diagrammatic view of the vehicle controller illustrated in FIG. 27.

Referring now to FIG. 28, the engine controller 1526 is illustrated in further detail. The controller 1526 may be coupled to a start button 1540 located on the vehicle 1520 for starting the engine 1530. Various vehicle inputs 1542 may be in communication with the controller 1526. The vehicle inputs 1542 may depend upon the level of control desired, the type of vehicle and the various types of engines. In the present example, the engine 1530 may be a two-stroke engine. However, much of the teachings apply to a four-stroke engine as well. The vehicle inputs 1542 may include various sensors that provide signals for the speed of the vehicle and temperatures associated with the vehicle including the ambient temperature and the temperature of various fluids or air temperatures. The vehicle inputs 1542 may also include pressures such as intake pressures, exhaust pressures and the barometric pressure around the vehicle.

The vehicle 1520 may also have crankshaft position sensors 1544A and 1544B, such as the crankshaft position sensors 122 discussed above, coupled to the controller 1526. The crankshaft position sensors 1544A and 1544B allow the controller 1526 to time various events within the vehicle including the timing of the operation of the spark plugs 1546, such as spark plugs 70 described above, and the fuel system 1548 which may include the fuel pump 1550 and the fuel injectors 1552, such as the fuel injectors 86, as described above. Depending on the system, one or two crankshaft position sensors 1544 may be used. In the example set forth below, two crankshaft position sensors 1544 are provided. The crankshaft position sensors 1544 may be Hall effect sensors that sense the edges of the steel teeth on the flywheel.

The engine controller 1526 includes various modules including a fuel control module 1560, an engine position sensing module 1562 which may include a direction sensing module 1564 for sensing the direction of the rotation of the crankshaft based upon the crankshaft position sensors 1544A and 1544B as will be described in detail below. The engine controller 1526 may also include a spark control module 1564 for controlling the timing of the spark generated at the spark plugs 1546.

The engine controller 1526 may also include an identifier determination module 1566 that is used to determine the identity and compare the identity provided from the handheld/removable battery key module 1510. Details of the actions of the identifier determination module 1566 will be described below.

The engine controller 1526 may also include a proximity module 1568. The proximity module may be used to determine the proximity of the handheld/removable battery key module 1510 to the vehicle to initiate the starting of a heater to heat the battery cells within the handheld/removable battery key module 1510. The actions of the proximity module 1568 will also be described in further detail below.

Figure 29:
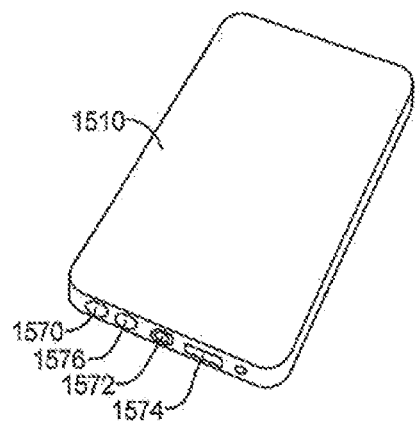
FIG. 29 is a perspective view of a handheld/removable battery key module.

Referring now to FIG. 29, the handheld/removable battery key module 1510 is illustrated in perspective view. A connector 1570 may include the electrical terminals 1512 for coupling to the vehicle. The handheld/removable battery key module 1510 may be sized to fit within a jacket pocket. For example, the size may be 5×2.8×5 inches. Other features such as a light 1572 and a charging point 1574 may be coupled thereto. A manual button 1576 may be used to manually power and depower the heater to warm the battery cells.

Figure 30:
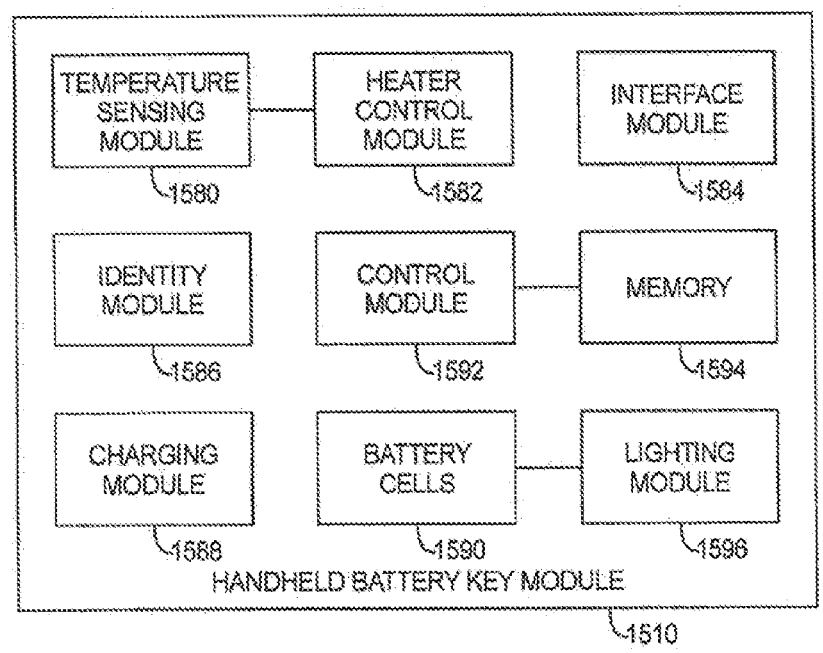
FIG. 30 is a block diagrammatic view of the handheld/removable battery key module.

Referring now to FIG. 30, a block diagrammatic view of the handheld/removable battery key module 1510 is illustrated in further detail. The handheld/removable battery key module 1510 may include a temperature sensing module 1580. The temperature sensing module 1580 may be coupled to a heater control module 1582. The temperature sensing module 1580 may sense the ambient temperature at the handheld/removable battery key module 1510 and control the heater control module 1582 should the temperature drop below a predetermined temperature threshold.

An interface module 1584 may provide electrical terminals that interface with electrical terminals within a vehicle or within a receptacle of the vehicle as described above. The interface module 1584 may also be used for communicating a key identifier or code from an identity module 1586 to the vehicle for security purposes when the handheld battery key module identifier corresponds to a saved identifier within the engine controller 1526.

A charging module 1588 may be coupled to battery cells 1590. The charging module 1588 may be used for charging the battery cells and monitoring the state of charge of the battery cells. The interface module 1584 may be used to provide power from an outside source for charging the battery cells 1590 until the control of the charging module 1588.

A control module 1592 is shown in communication with a memory 1594. The control module 1592 may be a microprocessor based control module or an application specific integrated circuit for controlling the various functions within the battery key module 1510. The interconnection of the control module 1592 with the various modules within the battery key module 1510 are not shown for simplicity.

A lighting module 1596 may also be coupled to battery cells 1590 to provide a flashlight function for convenience.

Figure 31:
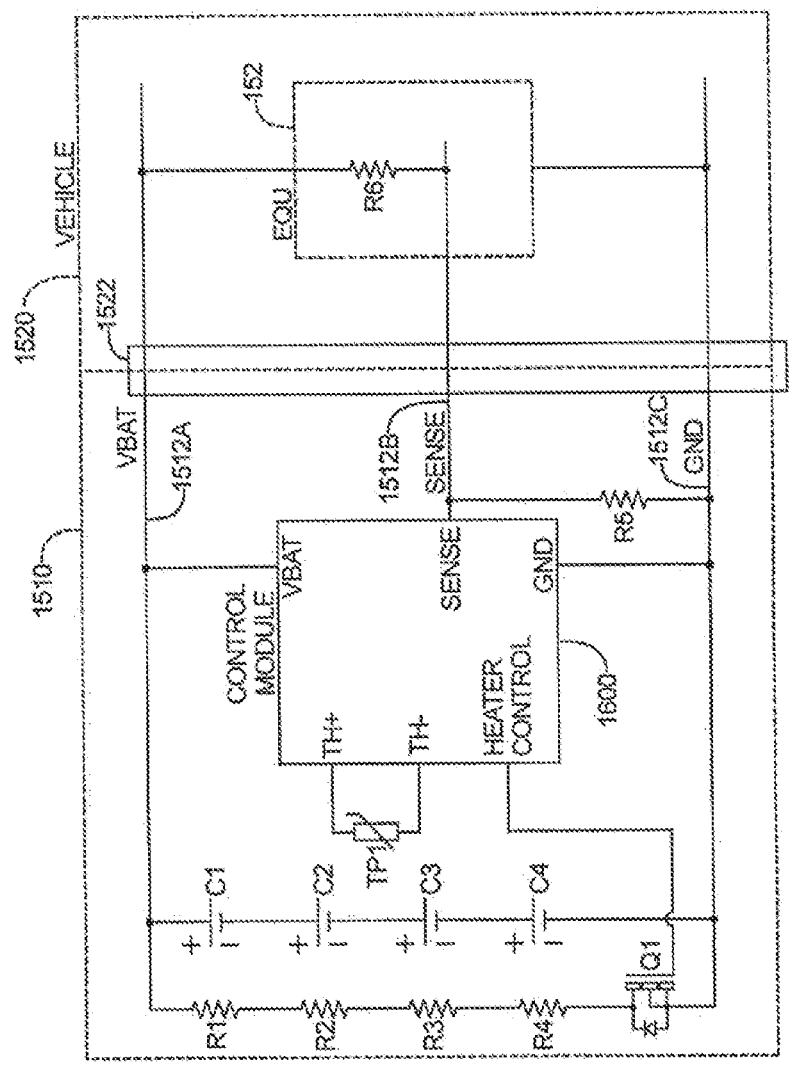
FIG. 31 is a schematic of the electrical circuit for the battery key module.

Referring now to FIG. 31, a detailed schematic view of the battery key module 1510 is illustrated. The battery key module 1510 is shown in relation to the vehicle 1520. As mentioned above, the receptacle 1522 may be used for coupling the vehicle 1520 with the battery key module 1510. A plurality of resistors are provided in series. The resistors are heating elements and correspond to the battery cells C1-C4. That is, resistor R1 corresponds to battery cell C1, resistor R2 corresponds to battery cell C2, resistor R3 corresponds to battery cell C3, and resistor R4 corresponds to battery cell C4. The battery cells C1-C4 may be made of various chemistries including lithium ion. A power transistor Q1 is used for controlling the elements. A power transistor Q1 is coupled to the series connection of the resistors R1-R4. The power transistor is also coupled to a HEATER CONTROL pin. A temperature sensor TR1 is coupled to a TH positive input and a TH negative input of the control module 1600. The temperature sensor TR1 is used to sense the temperature within the battery key module 1510. Battery power is provided to the control module 1600 through a VBAT pin. The battery voltage is provided to the resistor R1 and to the terminal 1512A. The terminal 1512B is coupled to a SENSE input of the control module 1600. The SENSE terminal may be in communication with the vehicle 1520 to provide a key identifier or a security code thereto. In the present example, the resistor R5 may be a fixed resistor that is sensed by the engine controller 1526 of the vehicle. A second resistor R6 used as a pullup resistor may be coupled between the battery terminal 1512A and the SENSE terminal 1512B. The resistor R5 may be a fixed resistor and one of several values to produce a different key. If a resistor R5 is not used, an electronic digital code may be communicated through the SENSE terminal 1512B.

The control module 1600, the battery cell C4, the resistor R5 and a ground terminal GND may all be coupled to ground or common through the terminal 1512C.

Figure 32:
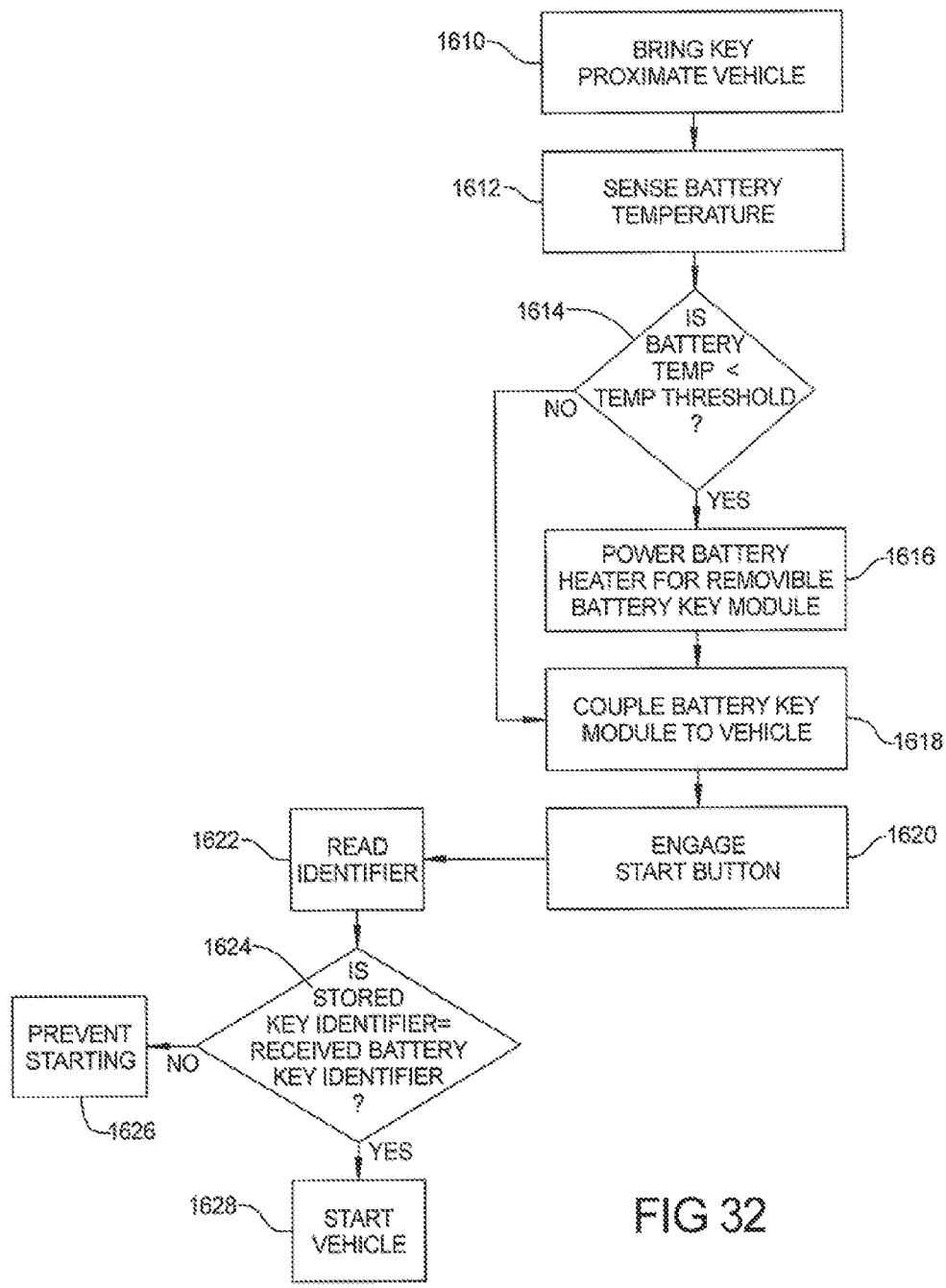
FIG. 32 is a flow chart of a method for starting a vehicle using the handheld/removable battery key module.

Referring now to FIG. 32, a method of starting the vehicle using the handheld/removable battery key module 1510 is set forth. In step 1610, an optional step of bringing the key within a proximity of the vehicle may be performed. The proximity of the vehicle will be sensed in various ways including an electrical field that is sensed at the controllers 1526 by the proximity module 1568. Another optional step 1612 may also be performed. In step 1612, the battery temperature is sensed. As mentioned above, a temperature sensor TR1 may be used to sense the battery temperature. In step 1614, if the battery temperature is less than a temperature threshold, in step 1616 the battery heater is powered by the battery cells of the removable battery key module. The battery heater corresponds to resistors R1-R4 of the handheld/removable battery key module 1510. To control the heating of the resistors, the switch Q1 may be operated.

Step 1618 may be performed when the temperature of the battery is not less than the temperature threshold or after step 1616. In step 1618, the battery key module is coupled to the vehicle. That is, the terminals 1512 may be coupled to the terminals 1524 in the receptacle 1522 as described above. In step 1620, the start button 1540 of the vehicle may be engaged. In step 1622, the key identifier of the identity module 1586 of the battery key module 1510 is read by the engine controller 1526. If the key identifier matches the identifier stored within the engine controller 1526, step 1624 determines whether the key identifier is correct. The vehicle 1520 is prevented from starting in step 1626 if the key identifier is not correct. In step 1624, if the key identifier is correct, the vehicle 1520 is started in step 1628. As will be mentioned further below, starting the vehicle 1520 may entail powering a starting actuator to rotate the crankshaft and providing fuel and spark to the engine 1530.

Figure 33:
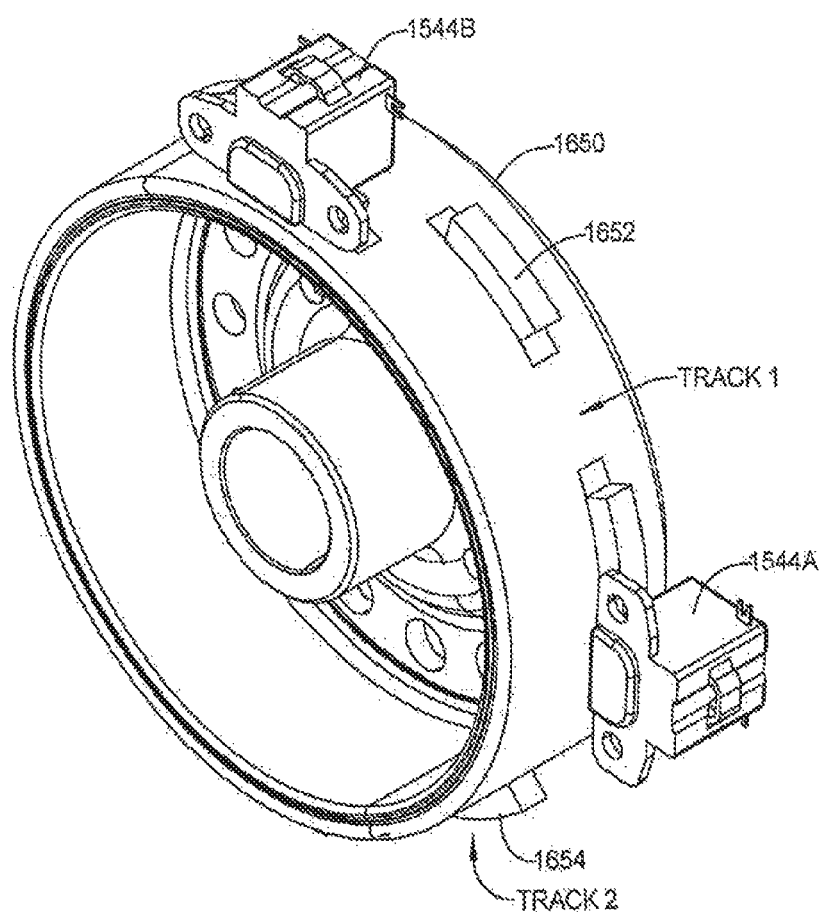
FIG. 33 is a perspective view of a flywheel according to the present disclosure.

Referring now to FIG. 33, a perspective view of a flywheel 1650 is illustrated. In this example, the flywheel 1650 has two tracks Track 1 and Track 2. Track 1 is axially spaced apart from Track 2 on the outside of the flywheel 1650. Track 1 comprises a first plurality of teeth 1652 spaced unequally around the circumference of the flywheel 1650. Track 2 comprises a second plurality of teeth 1654 also spaced unequally on the outside of the flywheel 1650. The teeth 1652, 1654 in both tracks comprise steel teeth which are illustrated as raised surfaces which are picked up by crankshaft position sensors 1544. The crankshaft position sensors 1544A and 1544B are located directly adjacent to each of the respective tracks, Track 1 and Track 2 to sense the teeth 1654.

Figures 34, 35:
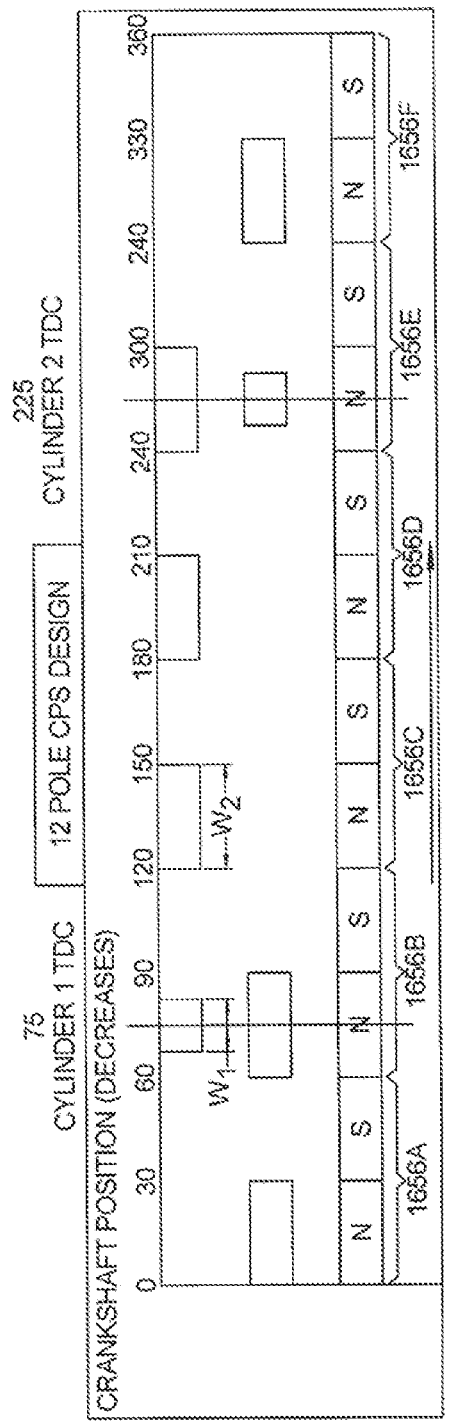
FIG. 34 is a linear view of the outside of the flywheel relative to the first track, second track and teeth all relative to the degree of rotation of the flywheel.
FIG. 35 is a flow chart for determining the direction of the tracks.
Figure 36:
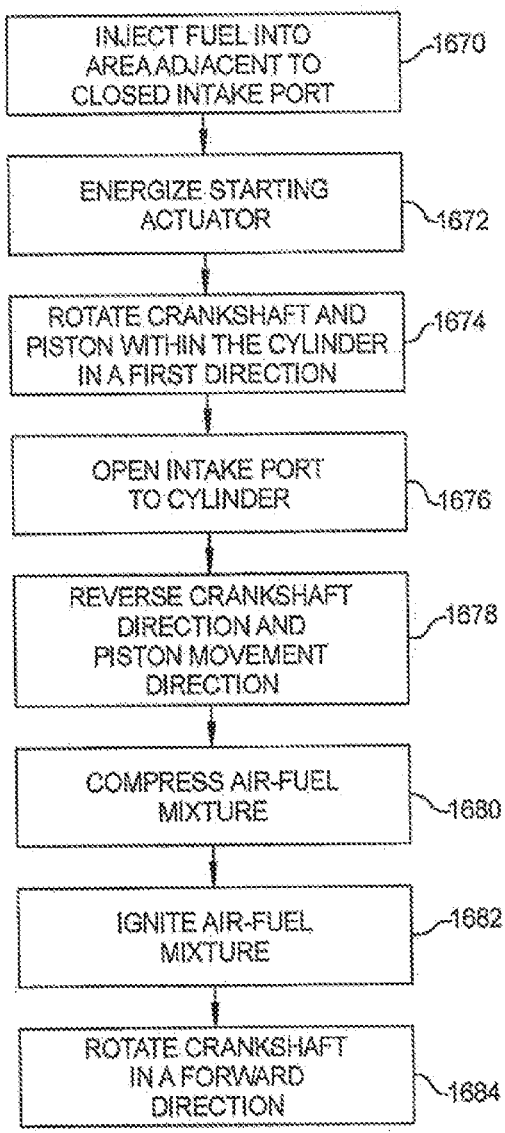
FIG. 36 is a flow chart of a method for starting a vehicle with a handheld battery without crossing top dead center.

Referring now to FIG. 34, a view of the first track Track 1 and the second track Track 2 and the teeth 1656 associated therewith are set forth in a linear manner relative to the position of the crankshaft. In this example, there are two cylinders, a first cylinder Cylinder 1 having a top dead center at 75 degrees and a second cylinder Cylinder 2 having a top dead center at 255 degrees. In the present example, twelve pole pairs 1656A-1656F are set forth. Each of the poles are 30 degrees of rotation of the crankshaft wide. In the present example, the top dead center position of the first cylinder has a width $W_1$ which is less than the width $W_2$ of the remaining teeth 1652B-1652D. Likewise, Track 2 tooth 1654A has the same width $W_1$ as tooth 1652A. Teeth 1654B-1654D have the same width $W_2$. It should be noted that tooth 1652A and 1654D from the respective first track and second track align with top dead center of Cylinder 1. Teeth 1652D and 1654A align with top dead center of Cylinder 2. In the present example, there are several geometric relationships of the teeth. The wider teeth are 180 degrees divided by P wide, where P is the pole count. The wide teeth are aligned with the north poles of the flywheel. The teeth of Track1 are between the top dead center of Cylinder 1 and top dead center of Cylinder 2 as the flywheel is rotated in a forward direction. That is, between 75 degrees and 255 degrees on center, Track 2's teeth are between 255 degrees and 75 degrees of the next rotation of the crankshaft. The position of the narrower teeth 1652A and 1654A may be set at a desired position before top dead center to provide optimal operation based upon experimentation. In the present example, the narrow tooth or Width $W_1$ is 15 degrees wide centered at top dead center. Also in the present example, the forward direction of the crankshaft is to the right as indicated by the increase in degrees as at the top of FIG. 34. Because the engine is always started in the forward direction, the first sensed tooth leading edge determines the next piston to reach top dead center. The crank direction is determined after each top dead center event. The combination of the last top dead center position and the track of the next leading edge detection determines the direction.

Referring now to FIG. 35, a chart illustrating the leading edge of Tracks 1 and 2 and the top dead center of Cylinder 1 and Cylinder 2 are used for direction determination. For Cylinder 1, a forward direction is determined if Track 1 is sensed or a reverse direction if Track 2 is sensed. For Cylinder 2, a reverse direction is determined when the top dead center of Track 1 is detected and the forward direction is determined when the top dead center of Track 2 is detected.

Figure 37A:
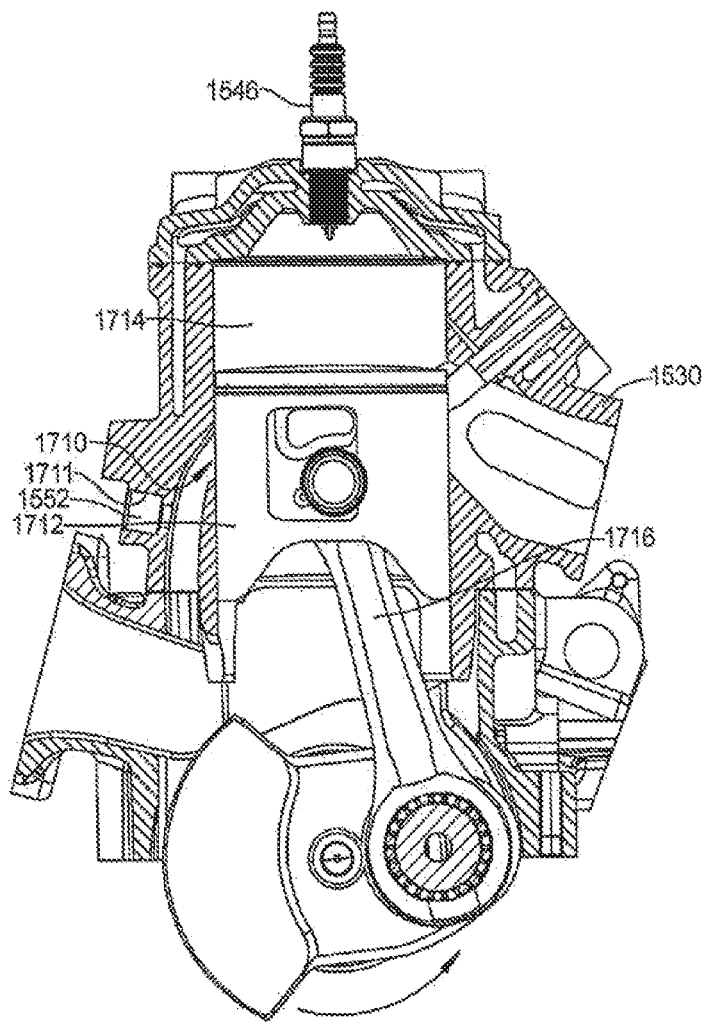
FIGS. 37A-37C are various stages of the engine during starting.
Figure 37B:
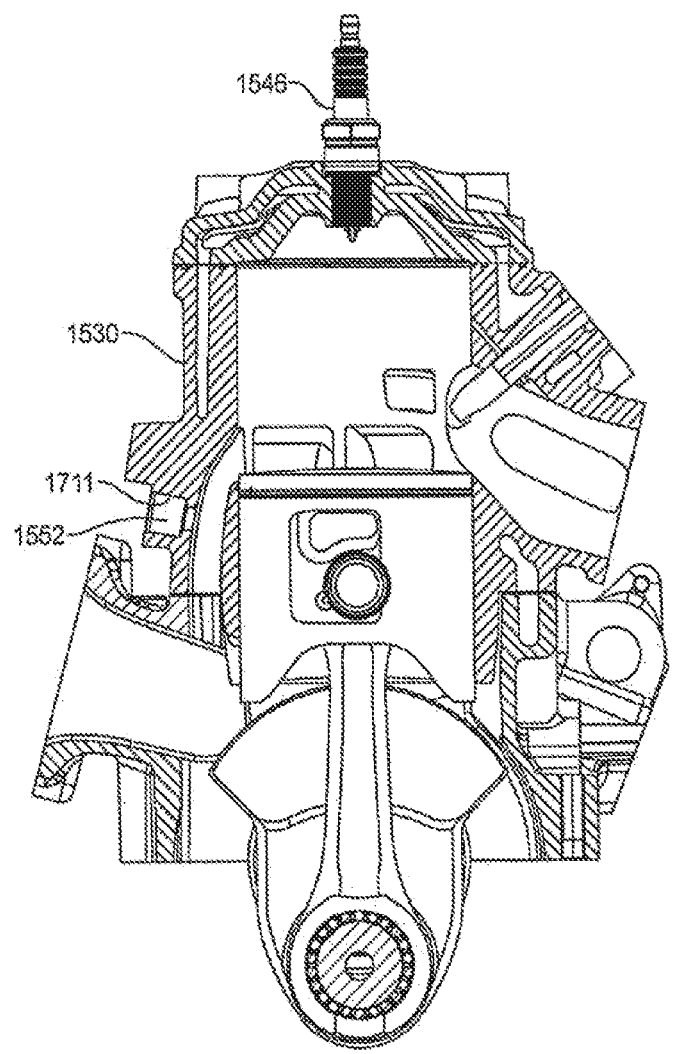
Figure 37C:
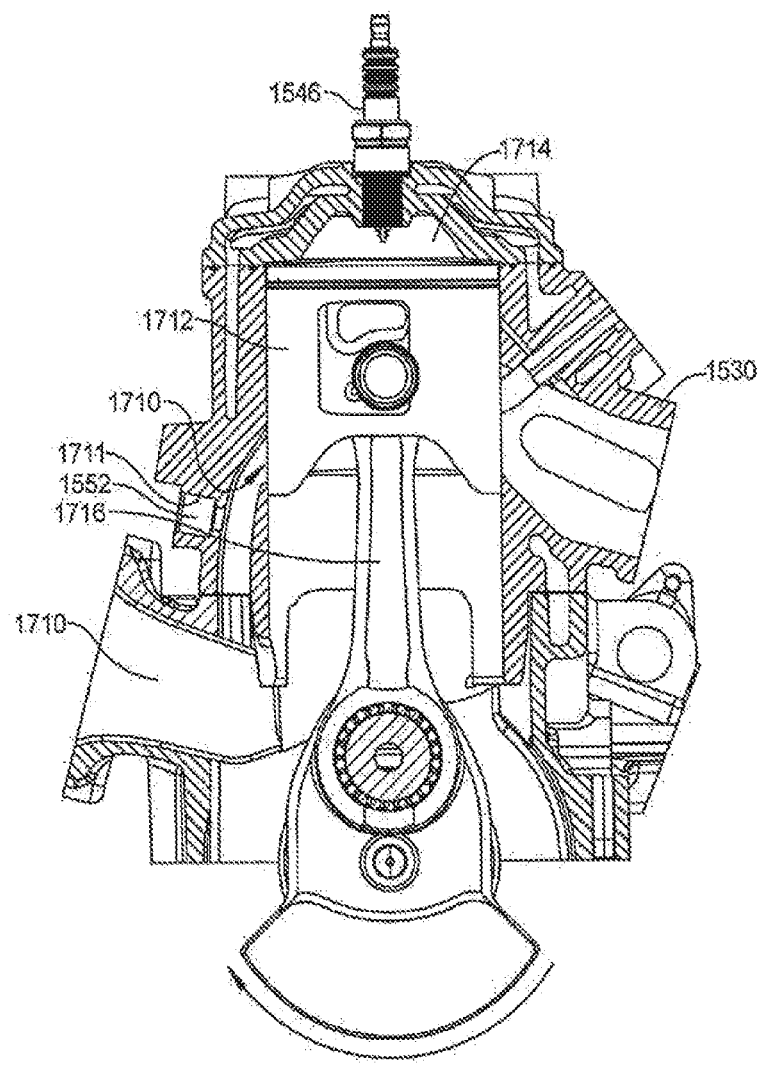

Referring now to FIG. 36 and FIGS. 37A-37C, in step 1670, fuel is injected into the closed intake port 1710 by a fuel injector 1552 disposed in a fuel injector port 1711. A starting actuator 1528 is electrically energized in step 1672. As mentioned above, a starter motor or other starting apparatus may be energized from the handheld/removable battery key module 1510 described above. In step 1674, the pistons 1712 are disposed within the cylinder 1714. By rotating the crankshaft 1718 connected to the connecting rod 1716 counterclockwise or in a first direction, the intake port 1710 to the cylinder 1714 is open in step 1676. This is illustrated in FIG. 27B. The crankshaft 1718 is then rotated in the forward direction, clockwise or first direction at step 1678. At step 1678, the crankshaft 1718 is reversed in direction without passing top dead center using the starting actuator. These are indicated by the feedback from the plurality of teeth as set forth in FIG. 34. The air/fuel mixture admitted into the cylinder is then compressed in step 1680. In step 1682, the air/fuel mixture is ignited using the spark plug 1546 to propel the crankshaft 1718 to continue along the forward direction. This is illustrated in FIG. 37C. In step 1684, the crankshaft 1718 is rotated in a forward direction and the engine is fully started.

F. Fuel Management System and Method

Figure 38:
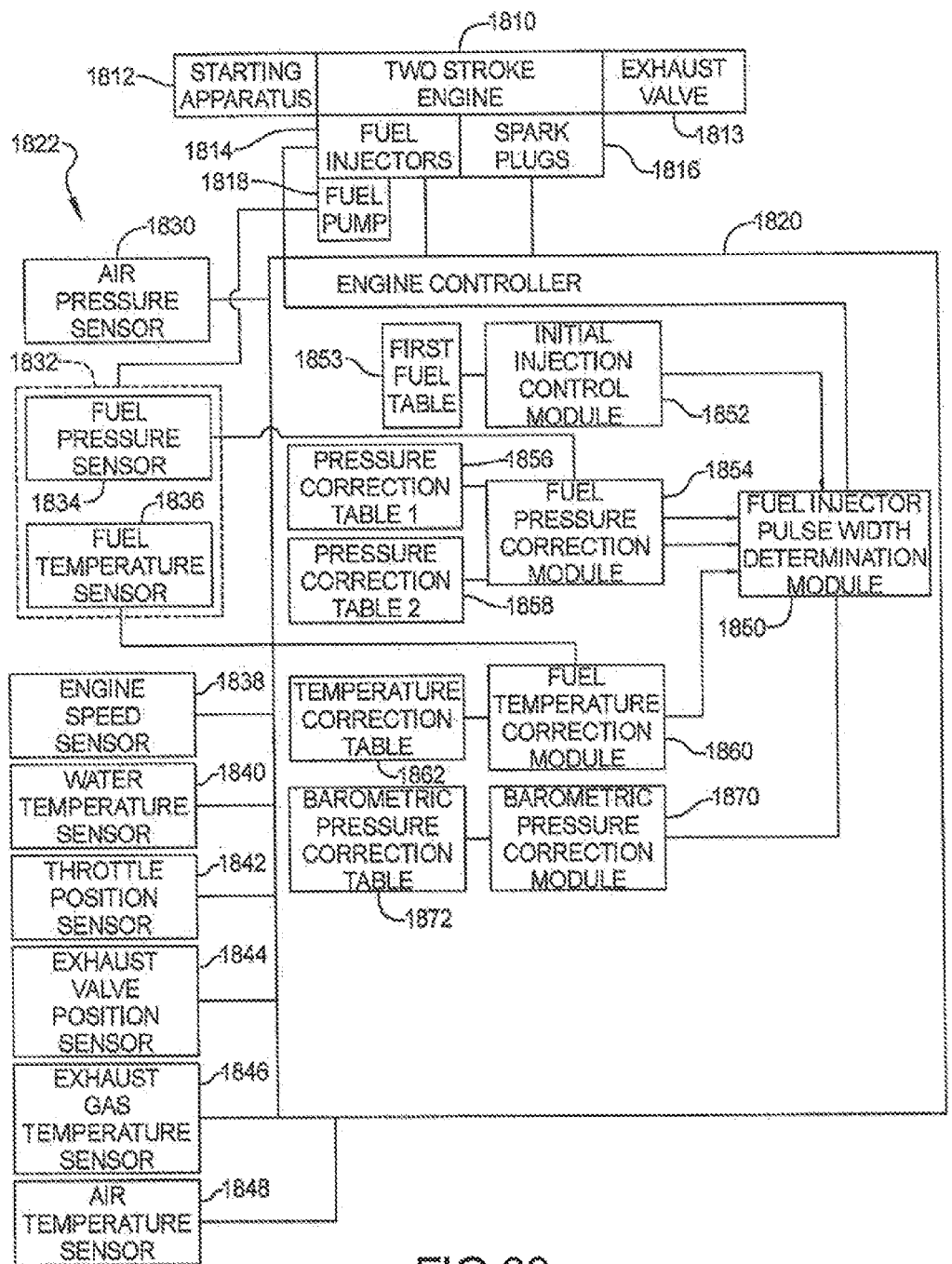
FIG. 38 is a block diagrammatic view of the engine controller relative to a plurality of sensors in the engine.

Referring now to FIG. 38, a simplified view of an engine 1810 is illustrated. The engine 1810 may be a two-stroke engine. However, teachings set forth herein may also apply to a four-stroke engine. The engine 1810 may be applied to various types of vehicles including but not limited to side-by-side vehicles, motorcycles and snowmobiles. The following disclosure is particularly suitable for snowmobiles.

The two-stroke engine 1810 is shown in a simplified view with a starting apparatus 1812 coupled thereto. The starting apparatus 1812 may include a battery starter, a pull starter or a stator for starting.

An exhaust valve 1813 or guillotine is used to control the size of the exhaust port. The position of the valve is controllable by way of an engine controller 1820.

The two-stroke engine 1810 may also include fuel injectors 1814, such as the fuel injectors 86 illustrated above. The fuel injectors 1814 operate to provide a pulse of fuel to the cylinders of the engine. The fuel injectors 1814 operate using an electrical pulse that has a pulse width that lasts for a duration of time. The duration corresponds directly to the amount of fuel injected to the engine. The air fuel mixture is drawn into a cylinder. Spark plugs 1816, such as the spark plugs 70 illustrated above, are used to ignite the air fuel mixture within the cylinder.

The engine control unit or controller 1820 is coupled to various sensors 1822 for controlling the combustion functions of the engine 1810 by controlling the fuel injectors 1814 and the spark plugs 1816. A fuel pump 1818, such as the fuel pump 112 illustrated above, is used to pressurize a fuel line 1819 and communicate fuel from the gas tank to the engine.

The sensors 1822 coupled to the engine controller 1820 provide various signals that are used for controlling the combustion processes in the engine 1810. The sensors 1822 include an air pressure sensor 1830 which generates an air pressure signal corresponding to the barometric pressure to the engine controller 1820.

A housing 1832 may include both a fuel pressure sensor 1834 and a fuel temperature sensor 1836. The fuel pressure sensor 1834 generates a fuel pressure signal corresponding to the pressure in the fuel line 1819. The fuel temperature sensor 1836 generates a signal corresponding to the fuel temperature within the fuel line 1819. The housing 1832, and thus both sensors, may be coupled to the fuel line 1819 leading to the engine 1810.

An engine speed sensor 1838 is also coupled to the controller 1820. The engine speed sensor 1838 generates a signal corresponding to the rotational speed of the engine. The rotational speed may correspond to the rotation of the crankshaft which may be in rotations per minute.

A water temperature sensor 1840 may also be in communication with the engine controller 1820. The water temperature sensor 1840 generates a signal corresponding to the coolant within the vehicle. Although the water temperature sensor 1840 is set forth as a "water" sensor, coolant such as ethylene glycol and other compounds may be used in place of or combined with water.

A throttle position sensor 1842, such as the throttle position sensor 92 illustrated above, is also in communication with the engine controller 1820. The throttle position sensor 1842 generates a signal corresponding to the throttle position. Typically, throttle position sensors are resistive in nature and provide an output voltage that corresponds to the throttle position as controlled by the vehicle operator. The throttle position sensor 1842 may correspond to the output of a floor-mounted pedal or a handle-mounted switch.

An exhaust valve position sensor 1844 may also be coupled to the engine controller 1820. The exhaust valve position sensor 1844 provides an output of the exhaust valve "guillotine" position to the engine controller. The exhaust port open timing is controlled by the controller 1820.

An exhaust gas temperature sensor 1846 provides a signal corresponding to the temperature of the exhaust gas.

An air temperature sensor 1848 generates a signal corresponding to the air temperature of air entering the engine.

The engine controller 1820 may have various modules used for adjusting the pulse width duration of the signal for controlling the fuel injectors. The electrical pulse width of the injectors corresponds to the amount of fuel injected into the engine with each pulse. As will be described in more detail below, a fuel injector pulse width determination module 1850 is used for determining the ultimate fuel injector pulse width used for each of the electrical pulses for the engine. The electrical pulses may vary based upon the various sensors input signals to the engine controller 1820. The fuel injector pulse width determination module 1850 receives a plurality of correction factors by way of signals to determine the ultimate pulse width duration applied to the fuel injectors 1814.

The fuel injection pulse width determination module 1850 receives signals from the initial injection control module 1852. The initial injection control module 1852 is used to control the initial or first injection of fuel into the system. This is particularly important for use in a batteryless vehicle. The first injection of fuel is important. But, because certain vehicles do not have a battery, the first pull of the vehicle takes some time to raise the chassis voltage and turn the fuel pump on. As will be further described below, the initial injection control module 1852 may monitor the fuel pressure and delay the initial injection of fuel until the fuel pressure raises above a fuel pressure threshold. By preventing the fuel injector from receiving electrical power when not enough fuel pressure is available, the system prevents the fuel injector from using electrical power for starting the engine. Thus, the initial injection control module 1852 commands the fuel injector pulse width determination module 1850 to delay the operation of the fuel injector.

Figure 39A:
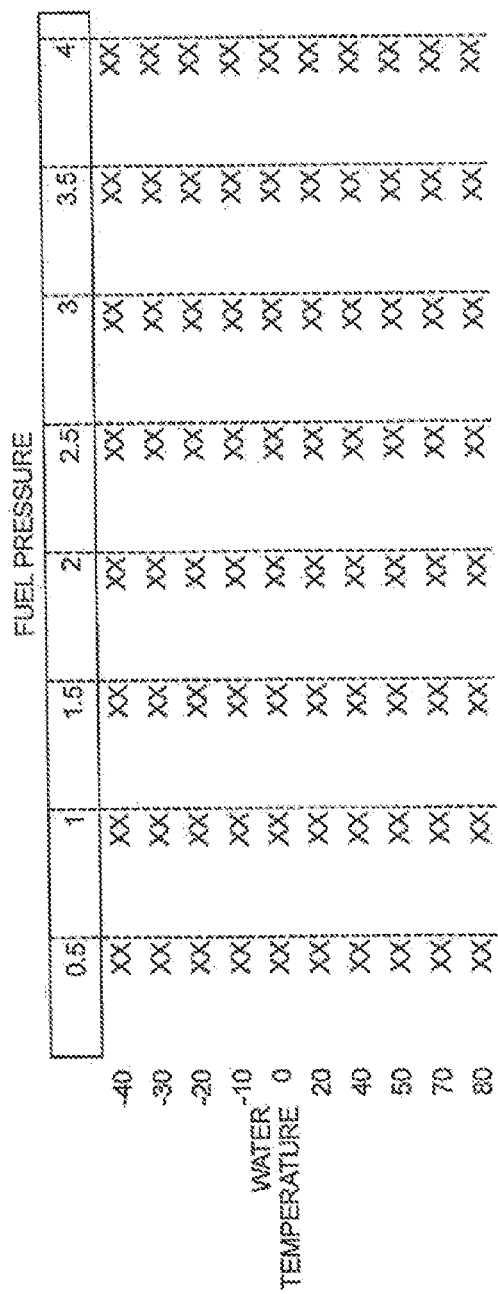
FIG. 39A is table of first pulse timing for fuel pressure versus water temperature of the engine.

The fuel pressure correction module 1854 generates a fuel pressure correction factor for use in the fuel injection pulse width determination module 1850. As will be further described below, the first injection of fuel is controlled by the initial fuel injection control module 1852. Thereafter, the pulse width duration of the injector is corrected based upon the fuel pressure, the fuel temperature and the barometric pressure. Each of these processes will be described in the modules below. The initial injection control module 1852 is in communication with a first fuel table 1853 that provides a first fuel value based upon water temperature and fuel pressure. That is, the initial pulse width is determined from a two-dimensional table with an axis of fuel pressure and a second axis of engine water temperature. Thus, the first pulse width is a function of the fuel pressure and the engine water temperature. An example two-dimensional table is illustrated in FIG. 39A. The X values would be replaced with actual values using experimentation in the field or on a dynamometer.

The fuel pressure correction module 1854 uses a first pressure correction table 1856 and a second pressure correction table 1858 to perform corrections based upon the fuel pressure signal from the fuel pressure sensor 1834. By controlling the duration of the pulse width based upon the fuel pressure, the fuel temperature and the barometric pressure, the system provides compensation to maintain stability margins at the edges of the operating range. As the vehicle operates in various altitudes, the stability at high elevations is maintained. Although two pressure correction tables 1856 and 1858 are illustrated, only one table may be provided. The table 1856 is a one-dimensional table that is used to replicate the pressure square root ratio correlation. The pulse width correction $PW_{corr}$ is:

$$PW_{Corr} = PW_{Base} * \sqrt{\frac{P}{P_{ref}}} * \frac{Trim_{(N,P)}}{100}$$

wherein the $PW_{Base}$ is the base pulse width calculated from the engine rpms and throttle position, P is the measure fuel pressure, $P_{ref}$ is the reference pressure and Trim is a desired amount of offset as a function of Pressure, P and the engine speed, N. Trim may be experimentally determined based on various operating engine speeds and pressures.

The second pressure correction table 1858 may take the form of a two-dimensional table having an access of the speed of the engine and fuel pressure. That is, a second pressure correction may have the ordinates of engine speed and the fuel pressure. The fuel pressure correction module provides a first correction from the pressure correction table 1 and the second pressure correction table 1858 to the fuel injector pulse width determination module 1850. Fuel injector voltage may also be an ordinate.

A fuel temperature correction module 1860 receives a fuel temperature sensor signal from the fuel temperature sensor. The fuel temperature sensor signal provides a temperature corresponding to the fuel temperature within a fuel line of the vehicle. A temperature correction table 1862 provides a two-dimensional table for determining a temperature correction. The temperature correction table has an axis of engine speed in rpms and the fuel temperature as a second axis. Again, the temperature correction table may provide a temperature correction factor that is used by the fuel injection pulse width determination module 1850.

Figure 39B:
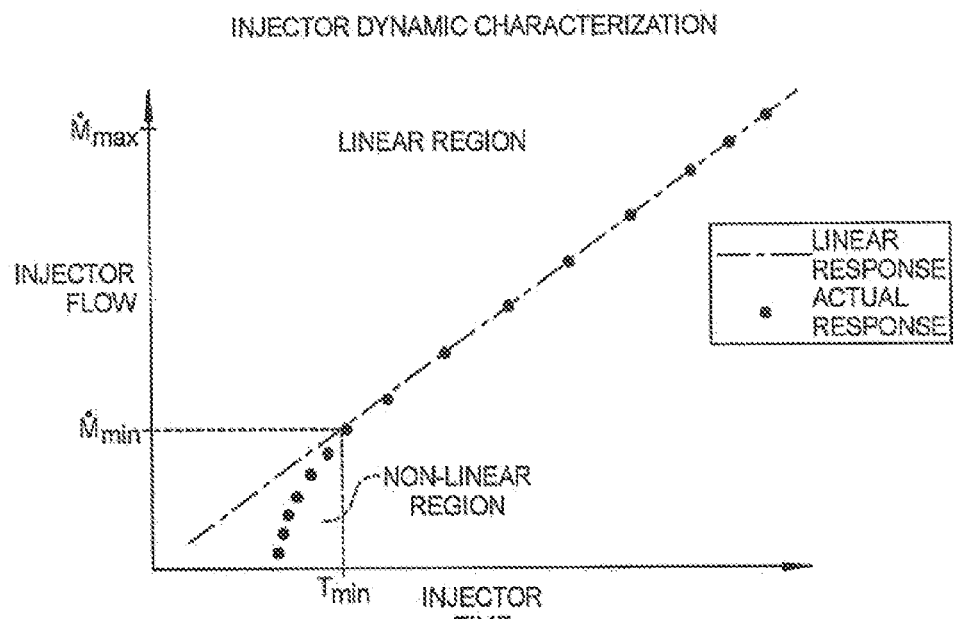
FIG. 39B is a plot of injector flow characteristics.

A barometric pressure correction module 1870 is used for determining a barometric pressure correction. The barometric pressure correction module 1870 is used for setting a minimum floor for the pulse width duration. When the pulse width duration is below a predetermined pulse width duration, the barometric pressure correction table or authority table 1872 is used for determining a new injection pulse width duration in the place of the minimum. Previously, the minimum calculated pulse width duration was the cutoff. However, it has been found that if the final corrected duration is less than the minimum duration characteristic of the injectors, the engine controller may calculate a commanded duration which overrules the calculation and uses a calibratable minimum injection in its place. As illustrated in FIG. 39B, the injector flow has a linear region and a non-linear region. The linear region corresponds to an injection time below $T_{min}$. In this area, the barometric pressure correction table 1872 may be calibrated based upon the barometric pressure to reduce the injector time below the previously calculated minimum.

Figure 39C:
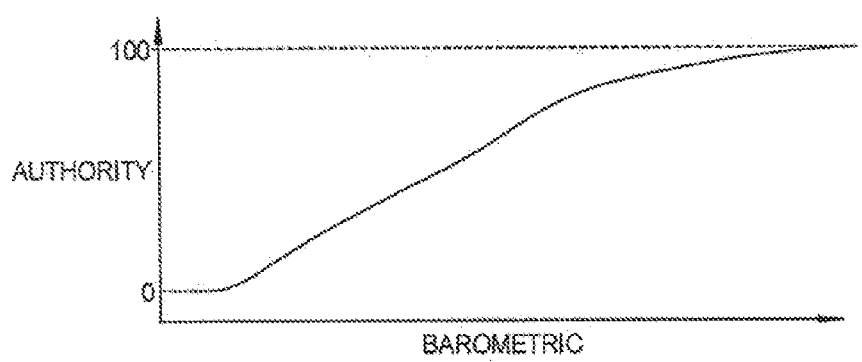
FIG. 39C is a plot of the correction authority determined in response to barometric pressure.

Referring now to FIG. 39C, one example of the barometric pressure correction table 1872 is set forth. An authority is shown plotted against the barometric pressure. As the barometric pressure rises, the amount of the correction factor or authority value increases. The final pulse width $T_{final}$ is equal to $T_c + A_{min}(T_{min} - T_c)$.

$T_c$ is the previously determined minimum correction factor. The determination of this will be described in further detail below.

Figure 40A:
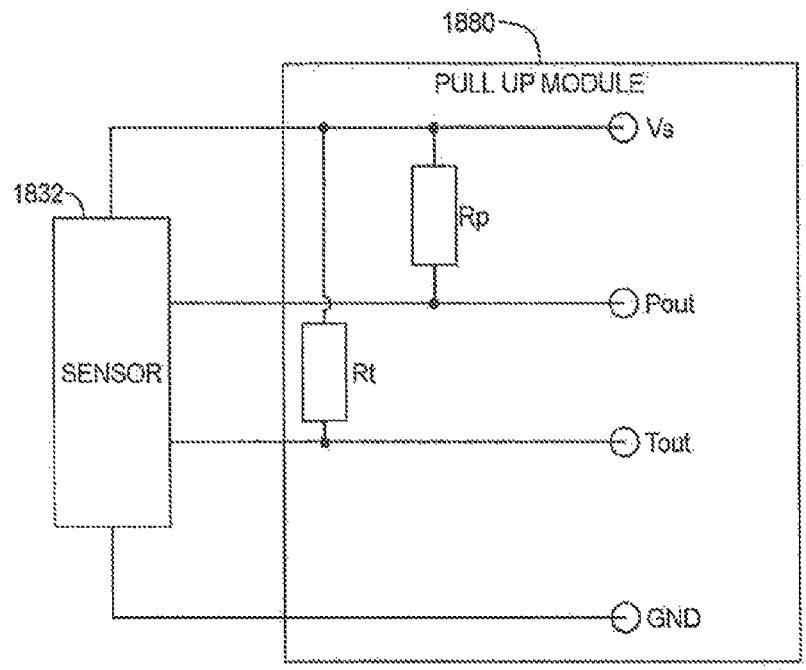
FIG. 40A is a schematic view of the temperature and pressure sensor.
Figure 40B:
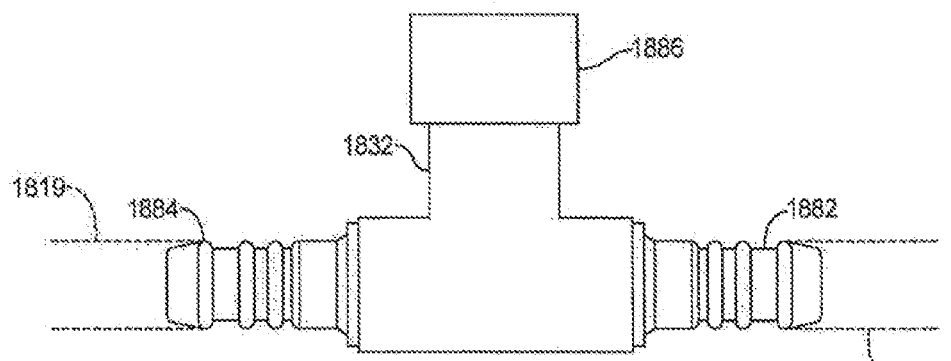
FIG. 40B is a side view of the temperature and pressure sensor shown with adjacent fuel line input and output.

Referring now to FIGS. 40A and 40B, the sensor housing 1832 is illustrated in further detail. That is, the sensor housing 1832 has both the fuel pressure sensor 1834 and the fuel temperature pressure 1836 illustrated in FIG. 38. A pull-up module 1880 may be disposed as a discrete component or as a component within the engine controller 1820. The pull-up module 1880 includes a pressure pull-up resistor Rp which is coupled between the supply voltage $V_s$ and the pressure voltage output signal $P_{out}$. A temperature pull-up resistor $R_t$ is coupled between the supply voltage $V_s$ and the temperature voltage signal $T_{out}$. A ground signal (GND) is also output from the pull-up module.

In FIG. 40B, the fuel line 1819 has an input 1882 and an output 1884 that passes fuel through the housing 1832. A connector 1886 is used for connecting the sensor to the engine control module.

Figure 41:
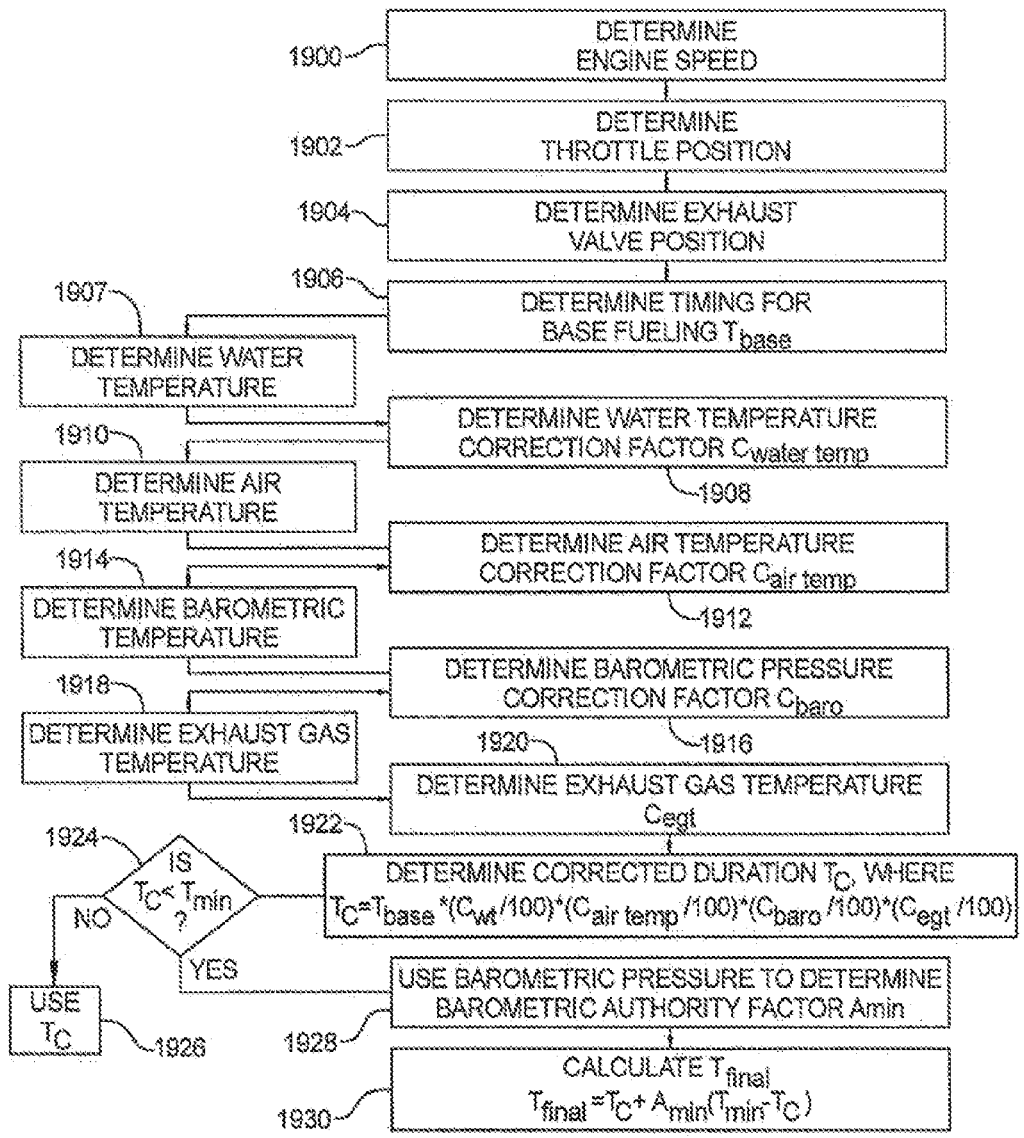
FIG. 41 is a flowchart of a method for correcting a minimum pulse width duration using barometric pressure.

Referring now to FIG. 41, a method for operating an engine and determining pulse width is set forth. In step 1900, the engine speed is determined. The engine speed may be determined in rotations per minute from the engine speed sensor 1838 illustrated above. In step 1902, the throttle position is determined using the throttle position sensor 1842 illustrated in FIG. 38. In step 1904, an exhaust valve position is determined. In step 1906, a timing for base fueling $T_{base}$ is determined using the engine speed, the throttle position sensor position and a valve position. In step 1907, a water temperature is determined for the coolant within the engine. This may be performed using the water temperature sensor 1840 illustrated in FIG. 38. In step 1908, a water temperature correction factor $C_{wt}$ is determined. The water temperature correction factor $C_{wt}$ is determined as a function of the water temperature and the speed of the engine. In step 1910, the air temperature of the intake air to the vehicle is determined by the air temperature sensor 1848 illustrated in FIG. 38. The air temperature is the intake air temperature to the engine. In step 1912, an air temperature correction factor $C_{airtemp}$ is determined. The air temperature correction factor is based on the engine speed and the air temperature. In step 1914, the barometric pressure around the vehicle is determined using the air pressure sensor 1830 illustrated in FIG. 38. In step 1916, the barometric pressure correction factor $C_{baro}$ is determined as a function of the barometric pressure and the engine speed. Each of the correction factors may be experimentally determined.

In step 1922, a corrected duration $T_c$ is determined where the base is multiplied by the correction factor of the water temperature, the air temperature correction factor, the barometric pressure correction factor and the exhaust gas temperature correction factor. In step 1924, it is determined whether the corrected duration $T_c$ is less than a minimum pulse width duration. If the correction duration is not less than the minimum, pulse width is set at $T_c$ in step 1926.

In step 1928, the barometric pressure determined in step 1914 is used to determine a barometric pressure authority factor $A_{min}$. This is performed using the barometric pressure correction table 1872 of FIG. 38. In step 1930, a final pulse width duration $T_{final}$ is determined using the formula described above in the barometric pressure correction module 1870.

It should be noted that FIG. 41 takes place during normal operation of the engine. FIG. 8 uses the barometric pressure to change the minimum duration of the pulse width.

Figure 42:
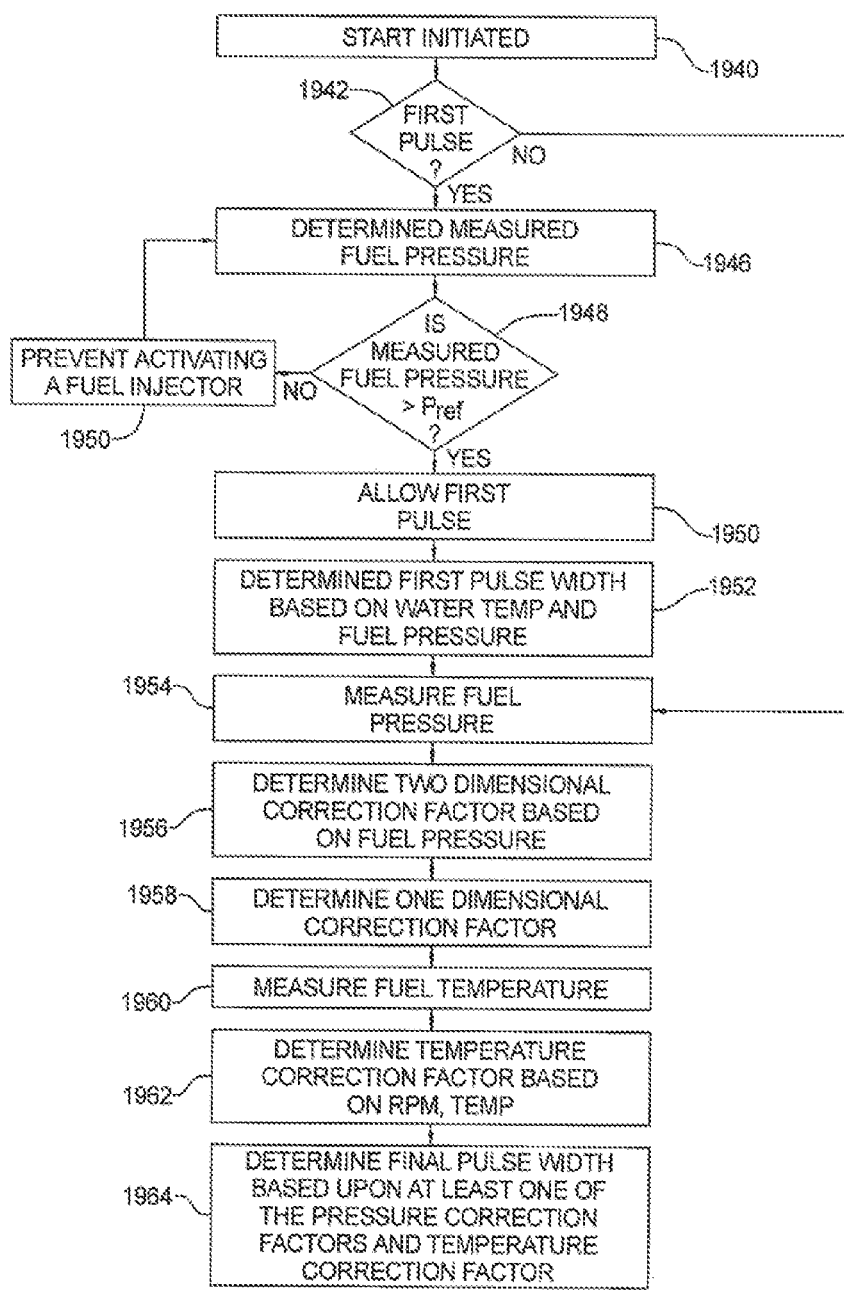
FIG. 42 is a flowchart of a method for starting the engine using a first pulse and then correcting for fuel pressure and fuel temperature.

Referring now to FIG. 42, the steps set forth take place during the initial starting of the engine and to correct for fuel and temperature pressure. In step 1940, starting is initiated. As mentioned above, starting may be initiated using a battery or pull starting the engine. In step 1942, it is determined whether the system is injecting the first pulse upon start-up. As the system becomes energized, the engine controller, the fuel pump and the injectors are becoming energized. The energization of the fuel injectors may be suppressed before the first pulse. This prevents the fuel injectors from using electrical power. In step 1946, the fuel pressure is determined using the fuel pressure sensor 1834. In step 1948, it is determined whether the measured fuel pressure is greater than a reference pressure. If the measured pressure from step 1946 is not greater than the reference pressure. The fuel injector is prevented from activating in step 1950. After step 1950, step 1946 is performed.

In step 1948, when the measured pressure is greater than the reference pressure, the first pulse is allowed in step 1950. In step 1952, the first pulse width is determined based upon the water temperature and the fuel pressure from the first fuel table 1853 illustrated in FIG. 38. In step 1954, the fuel pressure is measured. Step 1954 is also performed after the pulse is not the first pulse in step 1942. That is, after step 1942, the engine is started and the initial steps 1946-1952 do not need to be performed.

In step 1956, a two-dimensional correction factor based on the fuel pressure is determined based on the fuel pressure. This is obtained from the pressure correction table 1856. In step 1958, a one-dimensional pressure correction actor is also obtained from the pressure correction table 1858. In step 1960, the fuel temperature is measured. In step 1962, the temperature correction factor is determined from the temperature correction table 1862. In step 1964, the final pulse width is determined based upon the temperature correction factor and the pressure correction factor as determined above.

Among the advantages of delaying the start pulse is the better perception of quality of the engine starting process by the consumer. Better control is had by monitoring the furl temperature and pressure. The pistons run cooler and thus the life of the engine is increased.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of starting an engine of a vehicle comprising:
sensing a proximity of a battery key to the vehicle using an electric field sensed by a proximity module;
determining a battery temperature of the battery key when the battery key is proximate the vehicle in response to sensing;
when the battery temperature is below a predetermined temperature, powering a battery heater;

coupling the battery key to a controller of the vehicle, said battery key comprising a key identifier, said battery key comprising a battery cell disposed therein;

communicating a key identifier from the battery key to a controller of the vehicle, said controller having a stored identifier;

comparing the stored identifier and the key identifier; and in response to comparing, providing power from the battery cell of the battery key to an actuator to rotate a crankshaft of the engine.

2. The method of claim 1 wherein coupling the battery key comprises coupling the battery key to a receptacle.

3. The method of claim 1 wherein coupling a battery key comprises coupling a battery key having a temperature greater than an ambient temperature around the vehicle.

4. The method of claim 1 wherein prior to comparing the stored identifier engaging a start button.

5. A system for starting an engine of a vehicle comprising:

a proximity module sensing a proximity of a battery key to the vehicle using an electric field sensed by a proximity module of the vehicle;

a temperature sensor sensing a battery temperature of the battery key and generating a battery temperature signal when the battery key is proximate the vehicle in response to sensing;

a heater controlled in response to the battery temperature signal;

a controller disposed within the vehicle;

the battery key coupled to the controller of the vehicle, said battery key communicating a key identifier to the controller of the vehicle, said battery key comprising a battery cell disposed therein;

said controller having a stored identifier therein, said controller comparing the stored identifier and the key identifier; and said controller, in response to comparing, providing power from the battery cell of the battery key to an actuator to rotate a crankshaft of the engine.

6. The system as recited in claim 5 wherein a battery cell temperature of the battery key is higher than a vehicle temperature.

7. The system as recited in claim 5 wherein the battery cell comprises a plurality of battery cells.

8. The system as recited in claim 7 wherein the battery key comprising a plurality of heaters, each heater corresponding to a respective one of the plurality of battery cells.

9. The system as recited in claim 8 wherein the battery key further comprises a temperature sensor for controlling the plurality of heaters.

10. The system as recited in claim 5 wherein the battery key is removably coupled to a receptacle of the vehicle, said receptacle electrically coupled to the controller.

* * * * *